(12) United States Patent
Blum et al.

(10) Patent No.: US 12,055,715 B2
(45) Date of Patent: Aug. 6, 2024

(54) SEE-THROUGH NEAR EYE OPTICAL MODULE

(71) Applicant: NewSight Reality, Inc., Roanoke, VA (US)

(72) Inventors: Ronald Blum, Roanoke, VA (US); Ami Gupta, Roanoke, VA (US); Igor Landau, Boulder, CO (US); Rick Morrison, Longmont, CO (US); John Dorfman, Evanston, IL (US)

(73) Assignee: NewSight Reality, Inc., Ponte Vedra, FL (US)

( * ) Notice: Subject to any disclaimer, the term of this patent is extended or adjusted under 35 U.S.C. 154(b) by 334 days.

(21) Appl. No.: 16/855,964

(22) Filed: Apr. 22, 2020

(65) Prior Publication Data

US 2020/0319458 A1 Oct. 8, 2020

Related U.S. Application Data

(63) Continuation of application No. 16/289,623, filed on Feb. 28, 2019, now Pat. No. 10,634,912, which is a
(Continued)

(51) Int. Cl.
*G02B 27/01* (2006.01)
*G02B 3/00* (2006.01)

(52) U.S. Cl.
CPC ....... *G02B 27/0149* (2013.01); *G02B 3/0006* (2013.01); *G02B 3/0056* (2013.01);
(Continued)

(58) Field of Classification Search
CPC .... G02B 27/0149; G02B 3/0006; G02B 3/04; G02B 27/0172; G02B 2027/015; G02B 2027/0178; G02B 27/0176
See application file for complete search history.

(56) References Cited

U.S. PATENT DOCUMENTS 9,841,537 B2  12/2017 Luebke et al.
10,042,186 B2 * 8/2018 Chao .............. G02C 11/10
(Continued)

OTHER PUBLICATIONS

Related co-pending U.S. application for applicant NewSight Reality, Inc., U.S. Appl. No. 16/571,248.
(Continued)

*Primary Examiner* — Wen Huang
(74) *Attorney, Agent, or Firm* — Woods Rogers Vandeventer Black PLC; Nathan A. Evans

(57) ABSTRACT

A see-through transparent (or semi-transparent) near eye optical module includes a transparent sparsely populated near eye display comprising a plurality of pixels or pixel patches and a sparsely populated micro-lens array comprising a plurality of micro-lenses positioned in optical alignment with the plurality of pixels or pixel patches of the sparsely populated transparent near eye display. The sparsely populated transparent near eye display has a pixel fill factor capable of rendering the near eye display at least partially transparent. Light rays originating from outside the transparent sparsely populated near eye module pass through the transparent sparsely populated near eye display and sparsely populated micro-lens array of the transparent near eye module to an eye of a user to form a real image perceived by the user. The transparent sparsely populated near eye display further produces light rays generated by way of active pixels which pass through aligned micro-lenses to form a virtual image perceived by the eye of the user. The combination of the real image with the virtual images as perceived by the eye of a user causes the perception of Augmented Reality or Mixed Reality for the user. Light rays being projected away from the eye of the user are reduced or blocked by the transparent near eye display.

22 Claims, 62 Drawing Sheets

Related U.S. Application Data continuation-in-part of application No. 16/008,707, filed on Jun. 14, 2018, now Pat. No. 10,466,487, which is a continuation-in-part of application No. 15/994,595, filed on May 31, 2018, now Pat. No. 10,884,246.

(60) Provisional application No. 62/848,636, filed on May 16, 2019, provisional application No. 62/847,427, filed on May 14, 2019, provisional application No. 62/796,388, filed on Jan. 24, 2019, provisional application No. 62/796,410, filed on Jan. 24, 2019, provisional application No. 62/794,779, filed on Jan. 21, 2019, provisional application No. 62/793,166, filed on Jan. 16, 2019, provisional application No. 62/790,514, filed on Jan. 10, 2019, provisional application No. 62/790,516, filed on Jan. 10, 2019, provisional application No. 62/788,993, filed on Jan. 7, 2019, provisional application No. 62/788,995, filed on Jan. 7, 2019, provisional application No. 62/788,275, filed on Jan. 4, 2019, provisional application No. 62/787,834, filed on Jan. 3, 2019, provisional application No. 62/785,284, filed on Dec. 27, 2018, provisional application No. 62/783,603, filed on Dec. 21, 2018, provisional application No. 62/783,596, filed on Dec. 21, 2018, provisional application No. 62/780,396, filed on Dec. 17, 2018, provisional application No. 62/780,391, filed on Dec. 17, 2018, provisional application No. 62/778,960, filed on Dec. 13, 2018, provisional application No. 62/778,972, filed on Dec. 13, 2018, provisional application No. 62/775,945, filed on Dec. 6, 2018, provisional application No. 62/774,362, filed on Dec. 3, 2018, provisional application No. 62/771,204, filed on Nov. 26, 2018, provisional application No. 62/770,210, filed on Nov. 21, 2018, provisional application No. 62/769,883, filed on Nov. 20, 2018, provisional application No. 62/756,542, filed on Nov. 6, 2018, provisional application No. 62/756,528, filed on Nov. 6, 2018, provisional application No. 62/755,626, filed on Nov. 5, 2018, provisional application No. 62/755,630, filed on Nov. 5, 2018, provisional application No. 62/754,929, filed on Nov. 2, 2018, provisional application No. 62/753,583, filed on Oct. 31, 2018, provisional application No. 62/752,739, filed on Oct. 30, 2018, provisional application No. 62/739,907, filed on Oct. 2, 2018, provisional application No. 62/739,904, filed on Oct. 2, 2018, provisional application No. 62/732,138, filed on Sep. 17, 2018, provisional application No. 62/732,039, filed on Sep. 17, 2018, provisional application No. 62/728,251, filed on Sep. 7, 2018, provisional application No. 62/720,116, filed on Aug. 21, 2018, provisional application No. 62/720,113, filed on Aug. 20, 2018, provisional application No. 62/717,424, filed on Aug. 10, 2018, provisional application No. 62/711,669, filed on Jul. 30, 2018, provisional application No. 62/703,909, filed on Jul. 27, 2018, provisional application No. 62/703,911, filed on Jul. 27, 2018, provisional application No. 62/700,621, filed on Jul. 19, 2018, provisional application No. 62/700,632, filed on Jul. 19, 2018, provisional application No. 62/694,222, filed on Jul. 5, 2018, provisional application No. 62/648,371, filed on Mar. 26, 2018, provisional application No. 62/638,789, filed on Mar. 5, 2018, provisional application No. 62/626,660, filed on Feb. 5, 2018, provisional application No. 62/624,201, filed on Jan. 31, 2018, provisional application No. 62/619,752, filed on Jan. 20, 2018, provisional application No. 62/613,313, filed on Jan. 3, 2018, provisional application No. 62/607,582, filed on Dec. 19, 2017, provisional application No. 62/546,473, filed on Aug. 16, 2017, provisional application No. 62/542,168, filed on Aug. 7, 2017, provisional application No. 62/530,638, filed on Jul. 10, 2017, provisional application No. 62/522,866, filed on Jun. 21, 2017, provisional application No. 62/513,828, filed on Jun. 1, 2017.

(52) U.S. Cl.
CPC ..... *G02B 27/0172* (2013.01); *G02B 27/0176* (2013.01); *G02B 2027/015* (2013.01); *G02B 2027/0178* (2013.01); *G02B 2027/0187* (2013.01)

(56) References Cited

U.S. PATENT DOCUMENTS

| | | | |
|---|---|---|---|
| 10,659,757 B2 | 5/2020 | Motta et al. | |
| 2013/0300636 A1* | 11/2013 | Cunningham | G10L 13/02 345/8 |
| 2016/0313558 A1* | 10/2016 | Gutierrez | G06F 3/013 |
| 2016/0320621 A1* | 11/2016 | Biteau | G02C 11/10 |
| 2017/0115486 A1* | 4/2017 | Border | G02B 17/008 |
| 2017/0227779 A1* | 8/2017 | Kato | G02B 27/02 |
| 2018/0196265 A1* | 7/2018 | Bouchier | G02B 3/0006 |

OTHER PUBLICATIONS

Related co-pending U.S. application for applicant NewSight Reality, Inc., U.S. Appl. No. 16/859,092.
Related co-pending U.S. application for applicant NewSight Reality, Inc., U.S. Appl. No. 16/868,504.
Related co-pending U.S. application for applicant NewSight Reality, Inc., U.S. Appl. No. 16/902,003.
Related co-pending U.S. application for applicant NewSight Reality, Inc., U.S. Appl. No. 15/994,595.
Related co-pending U.S. application for applicant NewSight Reality, Inc., U.S. Appl. No. 16/008,707 (Issued U.S. Pat. No. 10466487).
Related co-pending U.S. application for applicant NewSight Reality, Inc., U.S. Appl. No. 16/600,056 (Issued U.S. Pat. No. 10684494).
Related co-pending U.S. application for applicant NewSight Reality, Inc., U.S. Appl. No. 16/289,623 (Issued U.S. Pat. No. 10634912).
Related co-pending U.S. application for applicant NewSight Reality, Inc., U.S. Appl. No. 16/449,395 (Issued U.S. Pat. No. 10634921).
Related co-pending European application for applicant NewSight Reality, Inc., U.S. Appl. No. 18/809,269A.
Related co-pending Japanese application for applicant NewSight Reality, Inc., Application No. 2019-566685 (see PCT/US2018/037561).
PCT Application Search Report for PCT/US18/35424.
PCT Application Search Report for PCT/US18/37561.
PCT Application Search Report for PCT/US19/020168.
PCT Application Search Report for PCT/US19/038624.
PCT Application Search Report for PCT/US19/55735.
TW Patent No. I689751, Original Document and English Version.
Related co-pending TW application for applicant NewSight Reality, Inc., Application No. 108123133.
Related co-pending TW application for applicant NewSight Reality, Inc., Application No. 108107329.

* cited by examiner

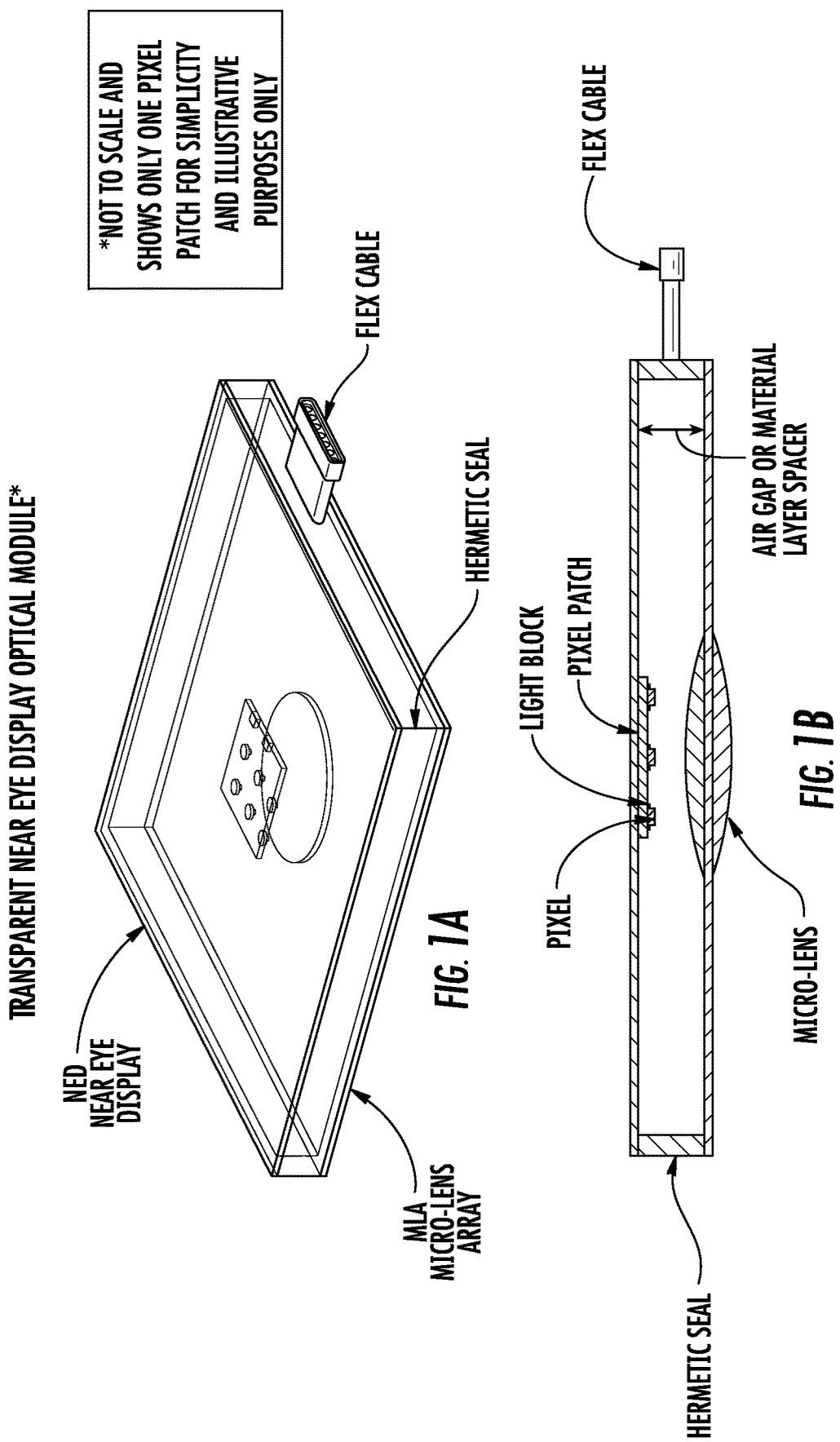

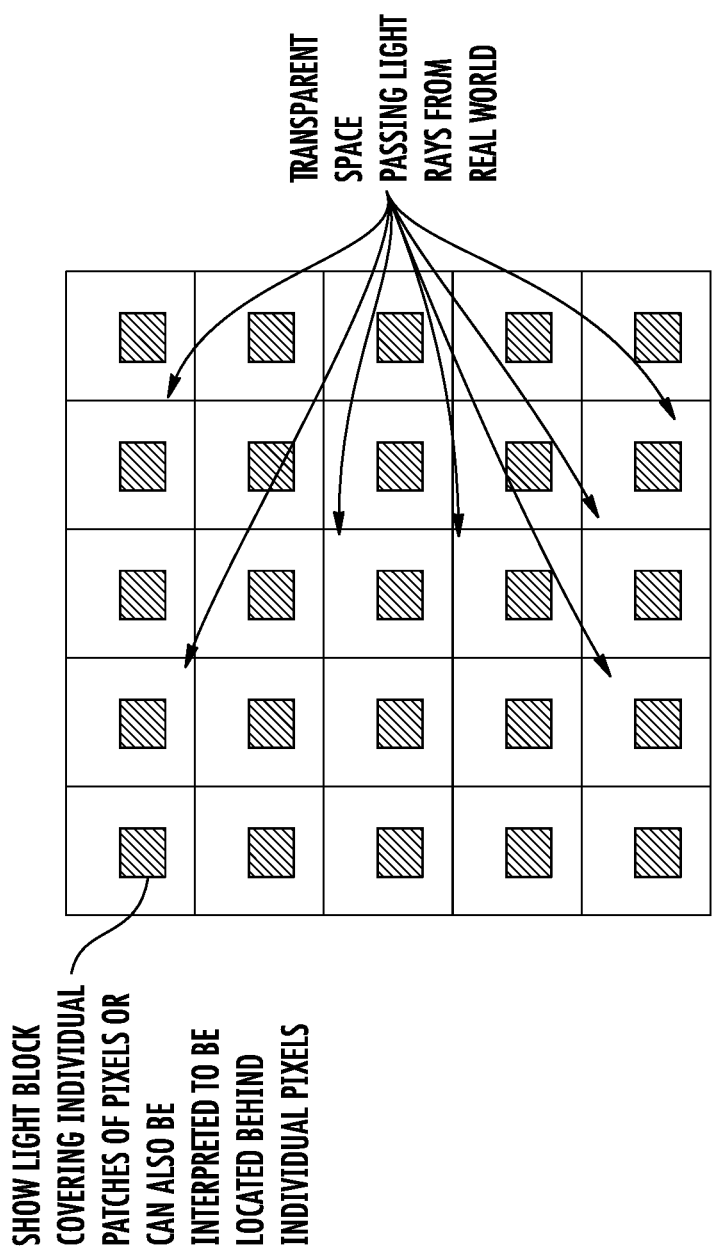
FIG. 8 AMENDED

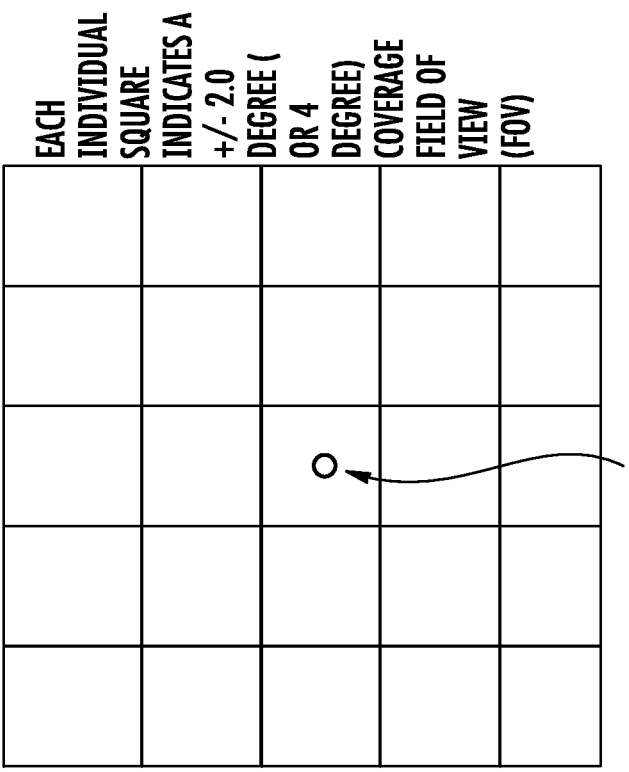
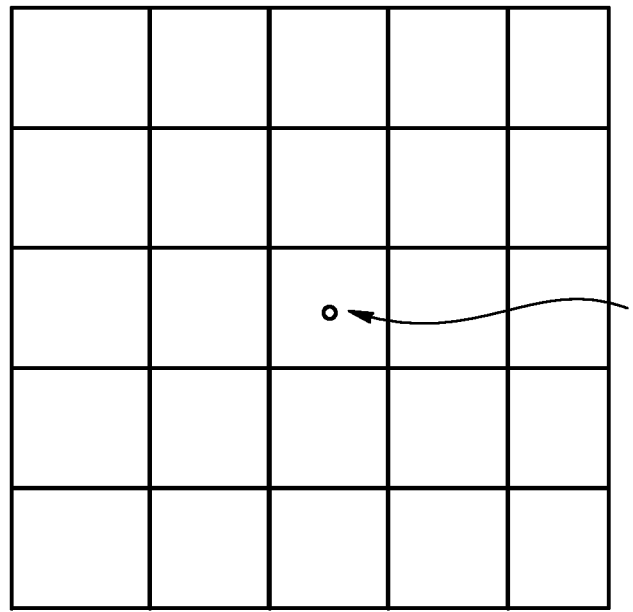
FIG. 12A

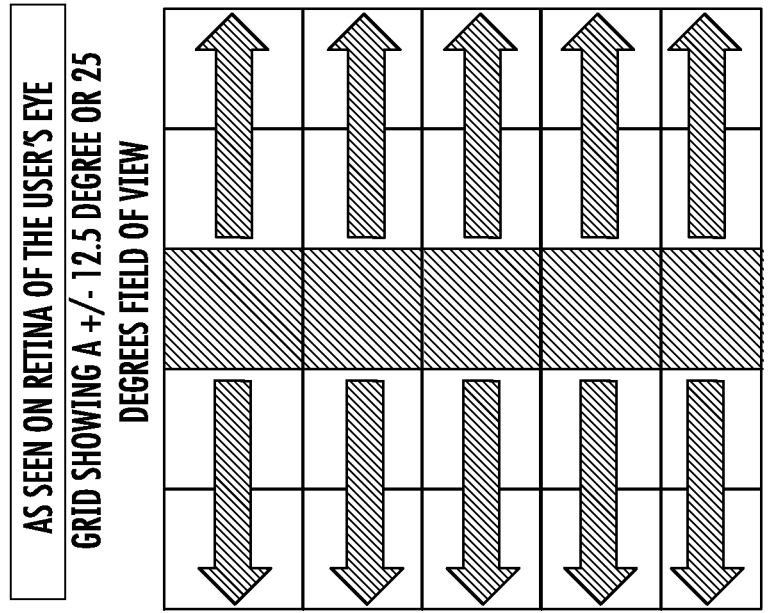
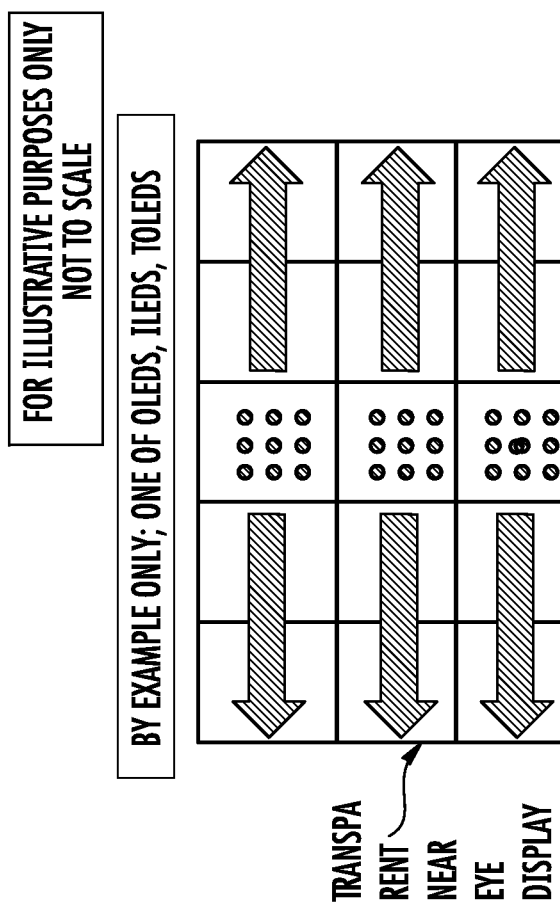
FIG. 12B

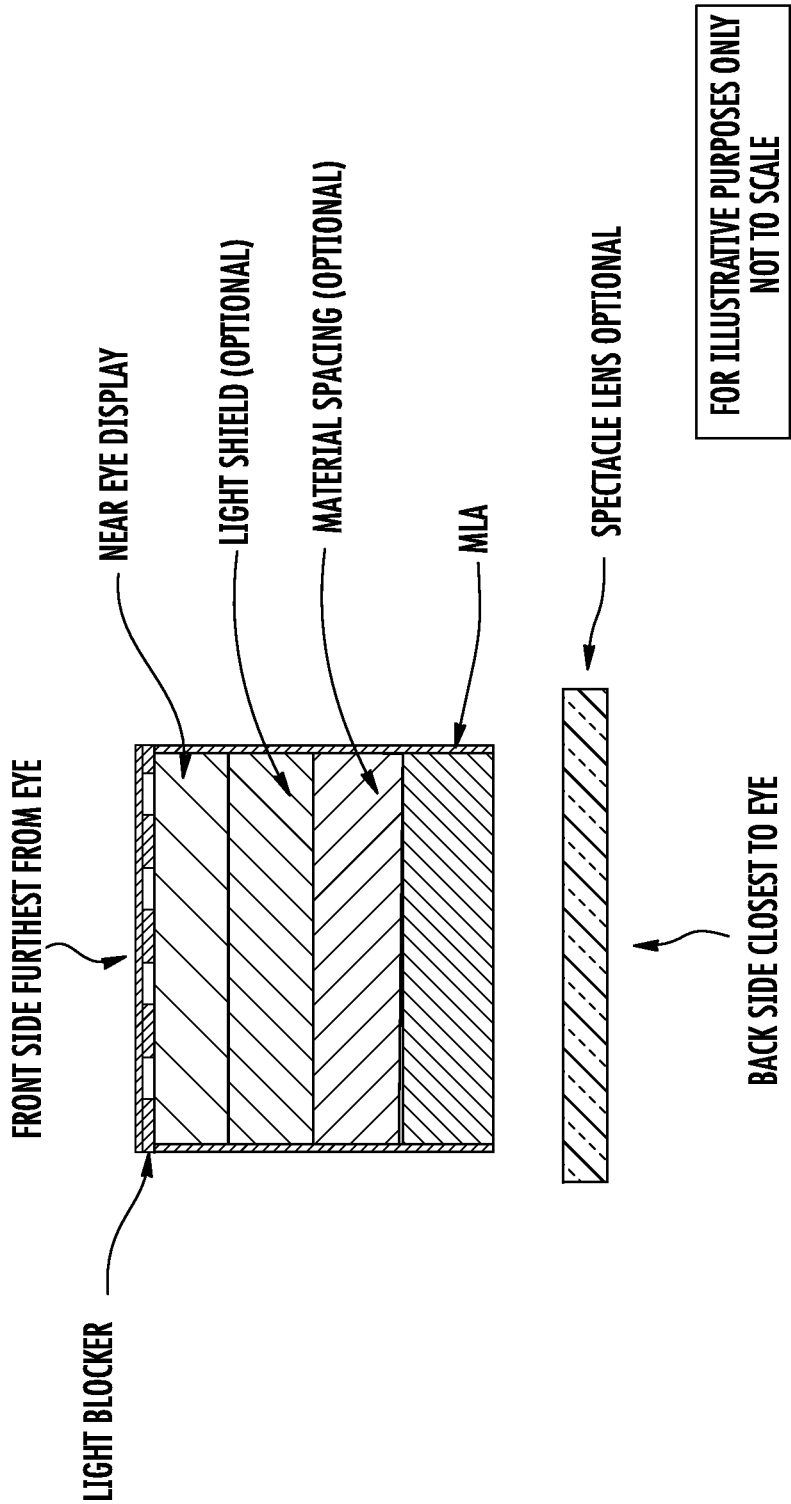

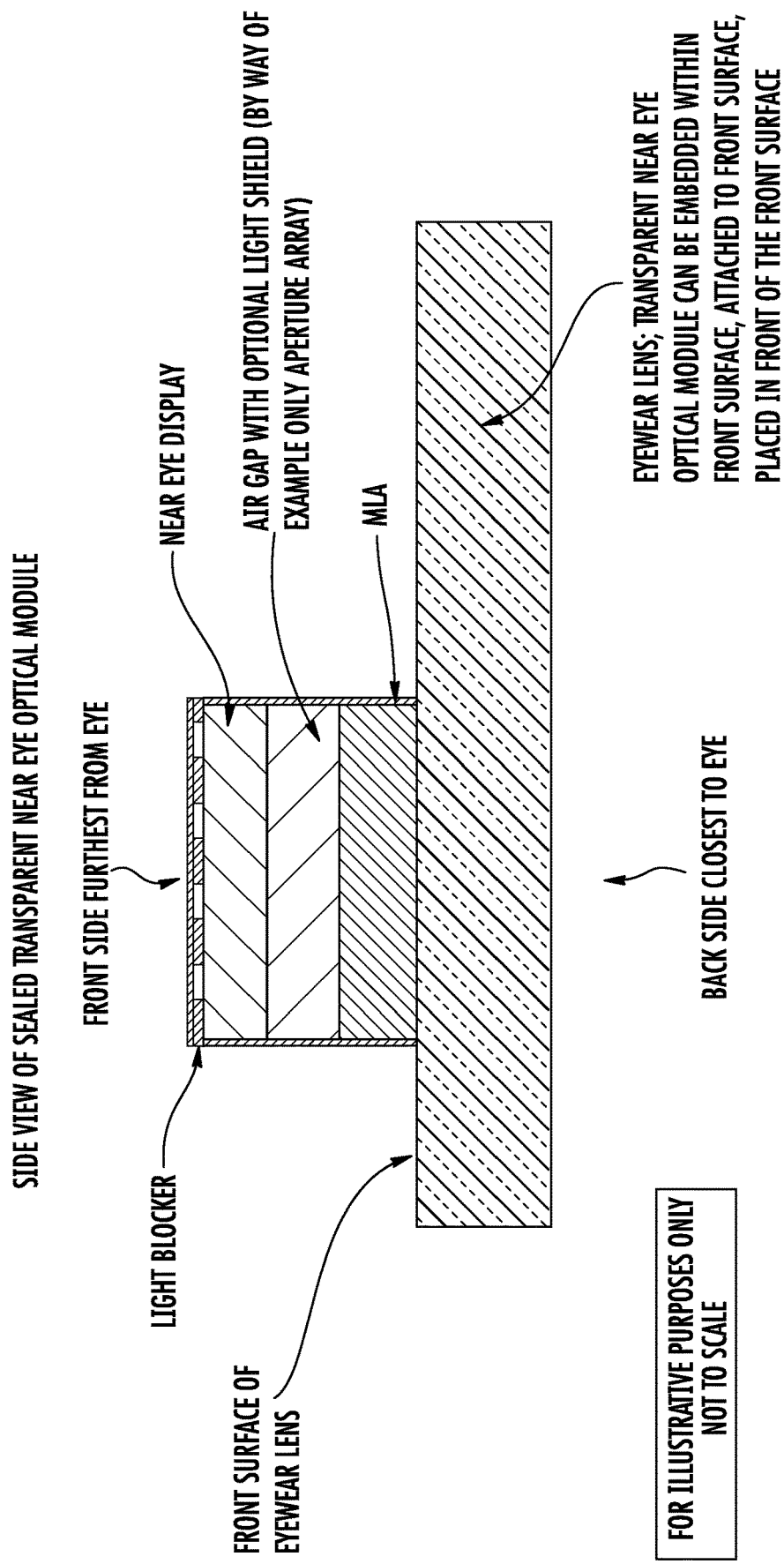

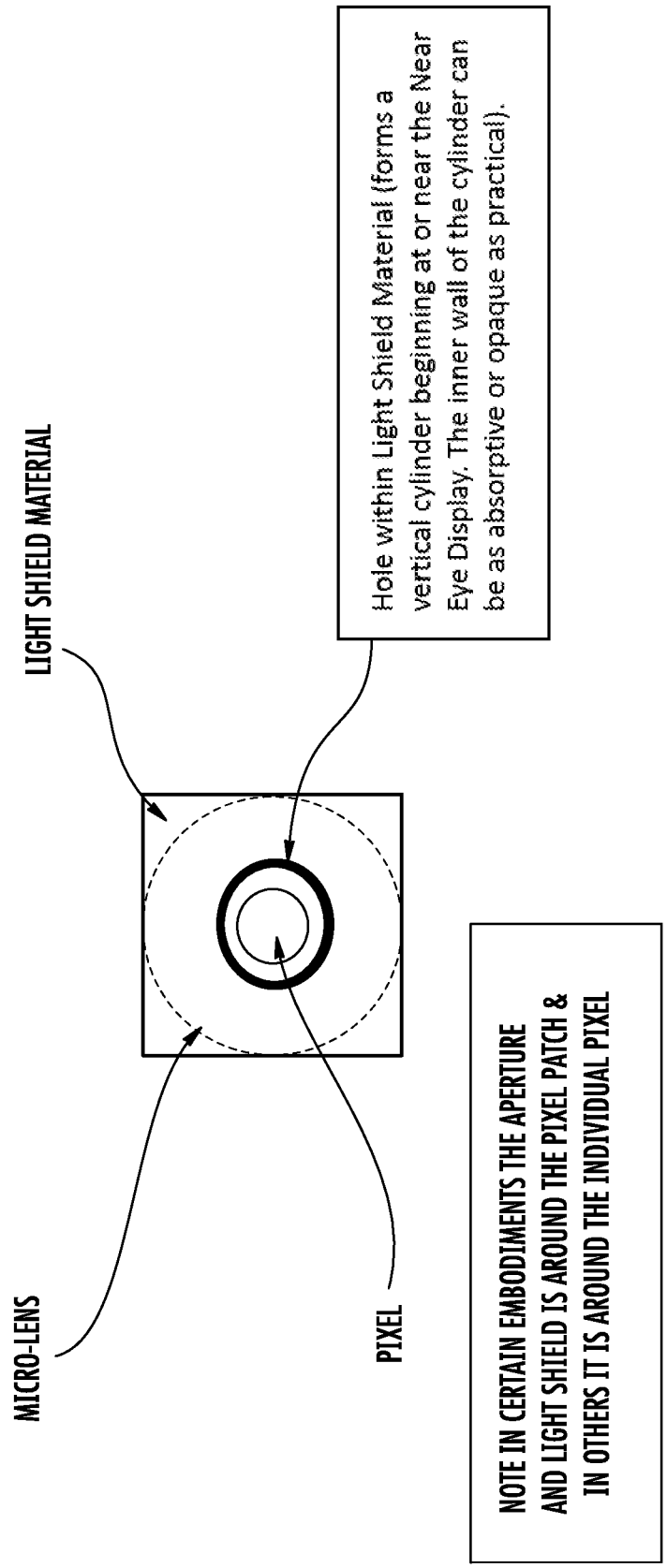
FIG. 17B AMENDED

| PROPERTY | VALUE |
|---|---|
| OLED DISPLAY | |
| PATCH AREA | 200 x 200 microns |
| PATCH PITCH (CENTER TO CENTER) | 750 microns |
| PIXEL PITCH (CENTER TO CENTER) | 3 microns |
| PIXELS/PATCH | 64 x 64 |
| LIGHT EMITTING AREA | 7% |
| MLA OPTICS | |
| MAGNIFICATION | 7.14 x |
| LENSLET DIAMETER | 500 micron |
| LENSLET PITCH (CENTER TO CENTER) | 650 micron |
| AIRY DISK DIAMETER | 45 microns |
| LENSLET BACK FOCAL DISTANCE | 2.m mm (2mm AIR, 0.5mm GLASS) |
| LENLETS PER RETINAL IMAGE PATCH | 3 x 3 |
| MLA CIRCULAR LENSLET AREA | 46% |
| EYEBOX | 1.95 mm |
| PUPIL BRIGHTNESS | X NITS |
| RETINAL IMAGE | |
| RESOLVED SPOT ANGULAR SEPARATION | 0.77 degrees 4.6 arc minute |
| PATCH ANGULAR EXTENT | 5 degrees |
| IMAGE ANGULAR EXTENT | 25 degrees |
| OVGA SPATIAL RESOLUTION | 320 x 240 PIXELS |
| MLA LENSLET SURFACE AREA | 46% |
| PATCHES FORMING QVGA IMAGE | 5 x 5 |
| SPOTS/PATCH | 64 x 64 PIXEL SUBIMAGE |
| FULL RETINAL IMAGE SIZE | 7.2 mm LATERAL |

FIG. 24

| PROPERTY | VALUE |
|---|---|
| LENSLET DIAMETER | 500 micron |
| LENSLET PITCH | 650 micron |
| MAGNIFICATION | 7.15 |
| PIXEL SET PITCH | ~750 micron |
| FRACTION MLA SURFACE COVERED BY LENSES | 46% (HALF OLED, HALF WORLD VIEW) |
| PATCHES | 5 x 5 |
| FULL RESOLUTION | 320 x 240 (QVGA) FOR 3 microns OLED PIXEL |
| AIRY DISK DIAMETER | 45 microns |
| PIXELS/PATCH | 210 x 210 microns ON OLED, 70x70 SUBIMAGE FOR 3 micron OLED PIXEL, 5 PATCHES ACROSS PRODUCE 350 PIXELS |
| PATCH OPTICS / PUPIL EYE BOX SIZE | 3 x 3 / 1.95 mm LATERAL |
| DISPLAY RETINAL SIZE | 7.5 mm HORIZONTAL |

FIG. 25

| TYPES OF NEAR EYE DISPLAYS (COVERED BY INVENTION) (BY EXAMPLE ONLY) |
|---|
| OLED |
| TOLED |
| ILED ALSO CALLED MICRO-LED |
| PHOLED (PHOSPHORESCENT OLED) |
| WOLED (WHITE OLED) |
| FOLED (FLEXIBLE OLED) |
| ELED (ELECTROLUMINESCENT DISPLAY) |
| TFEL (THIN FILM ELECTROLUMINESCENT) |
| TDEL (THICK DIELECTRIC ELECTROLUMINESCENT) |
| QUANTUM DOT LASER |
| ANY COMBINATION OF THE ABOVE |

FIG. 26

| TYPES OF LENSING MLAS COVERED BY INVENTION BY WAY OF EXAMPLE ONLY |
|---|
| PLANO-CONVEX |
| BI-CONVEX |
| CONVEX |
| CONCAVE |
| ASPHERIC |
| ACHROMATIC |
| DIFFRACTIVE |
| REFRACTIVE |
| FRESNEL LENS |
| GABOR SUPER LENS |
| GRIN LENS |
| PRISMATIC OPTIC |
| PATTERNED ELECTRODE |
| LIQUID LENS; ELECTRO WETTING & MECHANICAL |
| ANY COMBINATION OF THE ABOVE |

FIG. 27

| NEAR EYE DISPLAY (NED) | MICRO-LENS ARRAY (MLA) |
|---|---|
| TRANSPARENT (FULLY POPULATED) | SWITCHABLE FULLY POPULATED MLA |
| TRANSPARENT (FULLY POPULATED) | SWITCHABLE SPARSELY POPULATED MLA |
| TRANSPARENT (FULLY POPULATED) | SPARSELY POPULATED MLA |
| TRANSPARENT (SPARSELY POPULATED) | SWITCHABLE FULLY POPULATED MLA |
| TRANSPARENT (SPARSELY POPULATED) | SWITCHABLE SPARSELY POPULATED MLA |
| TRANSPARENT (SPARSELY POPULATED) | SPARSELY POPULATED MLA |
| OPAQUE (SPARSELY POPULATED WITH TRANSPARENT SECTIONS) | SWITCHABLE FULLY POPULATED MLA |
| OPAQUE (SPARSELY POPULATED WITH TRANSPARENT SECTIONS) | SWITCHABLE SPARSELY POPULATED MLA |
| OPAQUE (SPARSELY POPULATED WITH TRANSPARENT SECTIONS) | SPARSELY POPULATED MLA |

*FIG. 28*

| EXAMPLES ONLY, OF WAYS TO PRODUCE A SWITCHABLE MICRO-LENS ARRAY |
|---|
| LIQUID CRYSTAL ENABLED WAVEPLATE LENSES |
| LIQUID CRYSTAL ENABLED REFRACTIVE LENSES OR OPTICS |
| LIQUID CRYSTAL ENABLED DIFFRACTIVE LENSES OR OPTICS |
| LIQUID CRYSTAL ENABLED FRESNEL LENSES |
| MECHANICALLY ENABLED LIQUID LENSES |
| PIEZO ENABLED LIQUID LENSES |
| BLUE PHASE LIQUID CRYSTAL ENABLED MICRO-LENS ARRAY |
| PATTERNED ELECTRODES MIMICKING A LENS OR OPTIC |

FIG. 29

| CHARACTERISTIC | RANGE |
|---|---|
| PIXEL | 1.5 MICRONS – 10 MICRONS |
| PITCH | 3 MICRONS – 100 MICRONS |
| PIXEL PATCH AREA | 15 MICRONS X 15 MICRONS – 750 MICRONS X 750 MICRONS |
| # OF PIXELS IN A PATCH | 3 PIXELS X 3 PIXELS - 64 PIXELS X 64 PIXELS |
| SPARSELY POPULATED DISPLAY FILL FACTOR | 1% - 50% PIXEL FILL FACTOR OF DISPLAY |
| FULLY POPULATED DISPLAY FILL FACTOR | 75% - 100% PIXEL FILL FACTOR OF DISPLAY |
| MICRO-LENS DIAMETER | 20 MICRONS – 800 MICRONS |
| MICRO-LENSES PER PIXEL PATCH | 1 MICRO-LENS – 6 MICRO-LENSES PER PIXEL PATCH |
| SPARSELY POPULATED MICRO-LENS ARRAY | 1% - 50% FILL FACTOR OF MICRO-LENS ARRAY |
| FULLY POPULATED MICRO-LENS ARRAY | 75% - 100% FILL FACTOR OF MICRO-LENS ARRAY |
| IMAGE MAGNIFICATION FACTOR | 5X – 10X |
| RETINAL IMAGE RESOLUTION | 25 – 100 LINES PAIR PER MM |
| DISPLAY RESOLUTION | 50 X 50 PIXELS – 320 PIXELS X 240 PIXELS OVER 4 DEGREE FOV |
| AIRY DISK DIAMETER | 10 MICRONS – 100 MICRONS |
| AIR GAP BETWEEN NEAR EYE DISPLAY AND MLA | 0.50 MICRON – 5 MM |
| MATERIAL SPACING BETWEEN NEAR DISPLAY AND MLA (ALTERNATE TO AIR GAP) | 1.0 MICRON – 5 MM |

FIG. 30

| DEVICE | MODULATION (RANGE) | DUTY CYCLE (RANGE) |
|---|---|---|
| NEAR EYE DISPLAY | 30 HZ – 100 HZ | 1% - 50% (TIME ON) |
| MICRO-LENS ARRAY | 30 HZ – 100 HZ | 1% - 50% (TIME ON) |

FIG. 31

TRANSPARENT NEAR EYE OPTICAL MODULES (NOT TO BE LIMITING)

EXAMPLES OF MODULES DESIGNS

MODULE* DESIGNS (EXAMPLES ONLY) FROM FRONT TO BACK (FRONT FURTHEST FROM EYE OF WEARER)

NEAR EYE DISPLAY > AIR GAP > MLA

NEAR EYE DISPLAY > AIR GAP WITH LIGHT SCATTER RESTRICTING HOLES > MLA

NEAR EYE DISPLAY > SPACING MATERIAL > MLA

NEAR EYE DISPLAY > SPACING MATERIAL WITH LIGHT SCATTER RESTRICTING HOLES > MLA

NEAR EYE DISPLAY > AIR GAP & COLOR INTEGRATOR> MLA

NEAR EYE DISPLAY > SPACING MATERIAL WITH COLOR INTEGRATOR > MLA

NEAR EYE DISPLAY > SPACING WITH LIGHT SCATTER RESTRICTING STRUCTURE AND COLOR INTEGRATOR > MLA

NEAR EYE DISPLAY > SPACING WITH LIGHT SCATTER RESTRICTING STRUCTURE > MLA

NEAR EYE DISPLAY > COLOR INTEGRATOR > SPACING (EITHER AIR OR MATERIAL) > MLA

NEAR EYE DISPLAY > LIGHT SCATTER RESTRICTING STRUCTURE > SPACING (EITHER AIR OR MATERIAL) > MLA

*MODULE CAN BE HERMETICALLY SEALED TO MAKE IT MOISTURE, SWEAT AND ENVIRONMENTALLY RESISTANT

*FIG. 32*

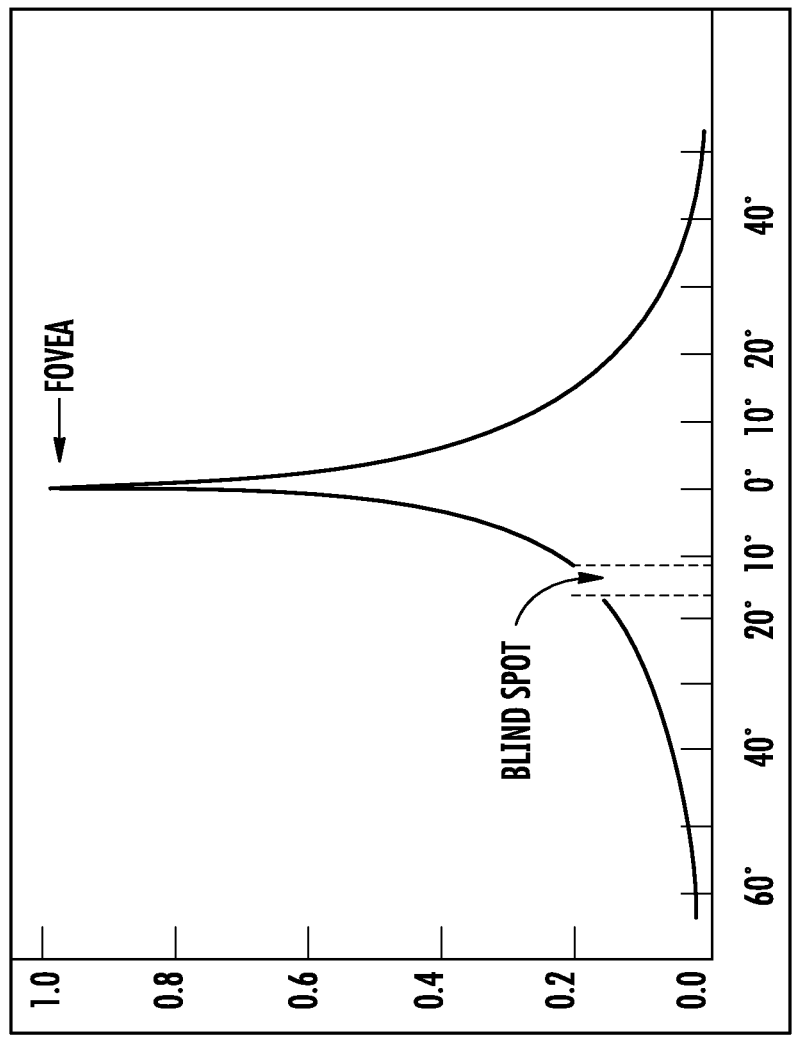

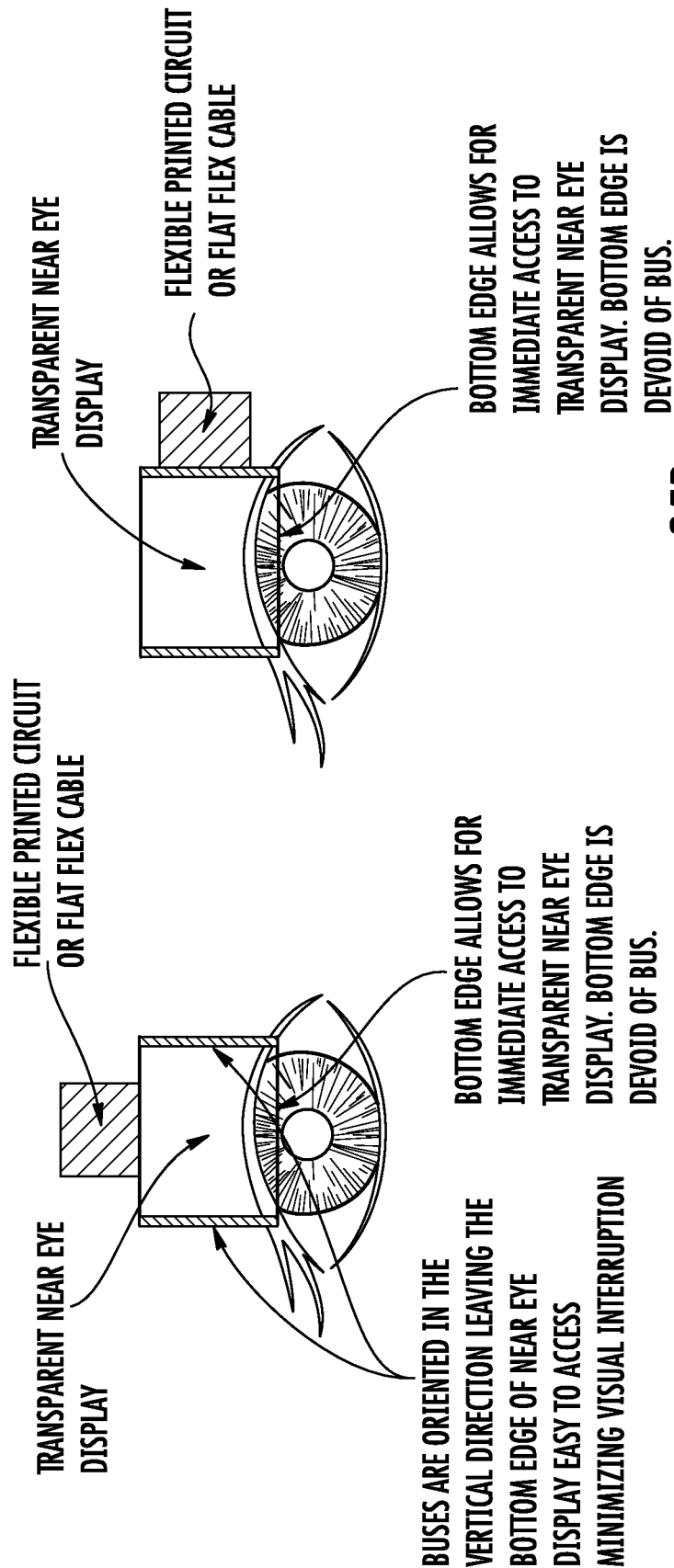

SEE-THROUGH NEAR EYE OPTICAL MODULE

CROSS-REFERENCE TO RELATED APPLICATIONS

The present application relies on the disclosures of and claims priority to and the benefit of the filing dates of U.S. patent application Ser. No. 16/289,623 filed Feb. 28, 2019, which claims priority to U.S. patent application Ser. No. 16/008,707 filed Jun. 14, 2018, which claims priority to U.S. application Ser. No. 15/994,595 filed May 31, 2018, as well as the following U.S. Provisional Patent Applications, with filing dates and titles, the disclosures of which are hereby incorporated by reference herein in their entireties.

62/847,427 filed May 14, 2019: Enhancing the AR Image
62/848,636 filed May 16, 2019: Further Enhanced AR Image The present application is further related to U.S. patent application Ser. No. 16/449,395 filed Jun. 22, 2019, and Ser. No. 16/600,056 filed Oct. 11, 2019. The disclosures of each of these applications are further incorporated by reference herein in their entirety.

BACKGROUND OF THE INVENTION

Field of the Invention

The present invention relates to the fields of augmented reality and mixed reality. More particularly, the present invention relates to a transparent near eye optical module which provides both a real and virtual image to the user.

Description of Related Art

Today's augmented and/or mixed reality systems in most cases have a large form factor and are clunky, heavy, power hungry, fashion limited and expensive. For these systems to have an increased level of adoption a major transformational technology change is needed. The innovation disclosed herein teaches such a transformational breakthrough for the AR (augmented reality) & MR (mixed reality) eyewear/headwear systems.

SUMMARY OF THE INVENTION

According to embodiments of the invention, a transparent near eye optical module includes a transparent near eye display comprising a plurality of pixels, sometimes arranged in patches of pixels across the near eye display, and a micro-lens array spaced apart from and positioned in optical alignment with one or more pixels (or pixel patches) of the near eye display. The transparent near eye optical module is a see-through transparent near eye optical module. A light block is optionally placed behind each pixel and located on the side furthest away from the eye of a user. The transparent near eye optical module may be sealed. The transparent near eye optical module is enabled by way of an electrical connection, by way of example only, a thin flex cable or printed circuit. The transparent near eye optical module can optionally also contain, by way of example only, one or more of: electrical connector, sensors, material spacer, air gap, light blocks, light shield apertures, nanoholes, optical elements around the base of pixels or pixel patches, additional lenslets or optical, such as by way of example only, tiles of pixel patches or pixels.

As used herein a transparent near eye display is that of, by way of example only, a transparent near eye micro-display. In certain embodiments the transparent optical module comprises four sides which affix to the near eye display at or near one end and the micro-lens array at or near the opposite end. When the transparent optical module comprises four sides the transparent near eye optical module can be sealed. In certain embodiments the transparent near eye optical module can be hermetically sealed. The sealing can cover the entire transparent near eye optical module. In certain other embodiments the transparent near eye optical module has two sides and in other embodiments the transparent optical module is devoid of sides.

The transparent near eye optical module is see-through. In certain embodiments the transparent near eye display is see-through. In certain embodiments the transparent near eye display when modulated off is see-through. In certain embodiments the micro-lens array is see-through. In certain embodiments the micro-lens array when switched off is see through. In certain embodiments the near eye display having a transparent substrate or transparent backing that supports a plurality of pixels or pixel patches can utilize, by way of example only, OLEDs and/or iLEDs (microLEDs) having a pixel fill factor capable of rendering the near eye display at least partially transparent. In other embodiments the transparent near eye display having a transparent substrate or transparent backing that supports a plurality of pixels or pixel patches can utilize, by way of example only, TOLEDs capable of rendering the near eye display at least partially transparent.

As used herein a sparsely populated near eye display can be one whereby the pixel density to the area of the near eye display is less than if it was fully populated with pixels. As used herein a sparsely populated near eye display can be that of a fully populated near eye display after being modified or altered in such a manner that the number of active pixels is 5% or less than that of the number of active pixels of a fully populated identical near eye display. By active pixels it is meant pixels capable of being illuminated. By modified or altered it is meant, by way of example only, a hardware or software fix. As used herein a gap is a space that can be void of material or filled with material. A gap can be that of an air gap or a material spacer in the form of, by way of example only, a material layer. The material layer can be that of a low refractive index material.

As used herein a fully populated near eye display can be modified to that of a sparsely populated near eye display by turning off a plurality of pixels to cause the near eye display when used to function as a sparsely populated near eye display, thus for the purposes of this patent application becomes a sparsely populated near eye display. Meaning at any given time when the near eye display is in use there are a plurality of areas of the display "not" capable of being lit, or not lit, thus making it sparsely populated as it relates to actual active pixels of the near eye display compared to the total possible near eye display area that could contain active pixels. Active pixels are pixels that are capable of being lit and are not programed or controlled to remain constantly off.

As used herein a sparsely populated micro-lens array is a micro-lens array whereby the micro-lens or lenslet density to the area of the micro-lens array is less than if it was fully populated with micro-lenses.

As used herein a near eye display can be comprised of one or more of, by way of example only; OLED, TOLED, iLED (micro-LED), PHOLED (Phosphorescent OLED), WOLED (White OLED), FOLED (Flexible OLED), ELED (Electroluminescent display), TFEL (Thin Film Electroluminescent), TDEL (Thick dielectric electroluminescent), or Quantum Dot Laser.

As used herein a micro-lens array (MLA) can be comprised of one or more of, by way of example only, an optic that is; plano-convex, bi-convex, convex, concave, aspheric, achromatic, diffractive, refractive, Fresnel lens, Gabor Super Lens, GIN Lens, prism, patterned electrode, electro-active lenslet, electro-active lens, electro-active optic, or liquid lens (electro wetting and/or mechanical). Such a micro-lens array can be made, by way of example only, of a plastic material, glass material or a combination of both.

In certain embodiments the transparent near eye display can be comprised of tiles having pixels and/or one or more-pixel patches thereupon. These tiles are then spread across the transparent near eye display. In certain embodiments the transparent near eye display can be devoid of tiles but comprised of pixels or pixel patches spaced apart spread across the transparent near eye display. The pixels or pixel patches can be aligned with micro-lenses of a micro lens array and distant separated therebetween.

In certain embodiments the transparent near eye display is sparsely populated with pixels. In certain embodiments the transparent near eye display is fully populated with pixels. In certain embodiments an opaque material or element (light block) is positioned behind (further from the eye of the user) the pixels (or patch of pixels) to reduce and if possible, eliminate the amount of outward light from the pixels away from the eye of the user. One light block can be located behind pixel patch or a light block can be located behind a pixel. Thus, a plurality of light bocks may be part of the transparent near eye display. Such material can be, by way of example only, an opaque material or element. In other embodiments, by way of example only, when a TOLED is utilized as the near eye display, this opaque material or element blocks both outward light rays (light block) and inward light rays from the real world that without this opaque material or element could travel through a transparent patch of pixels, then through an aligned micro-lens of the micro-lens array.

In all such embodiments, when such an opaque material or element (light block) is utilized the size of the material or element can be, by way of example only, the size of that of the pixel patch or slightly larger, or larger such as the size of the micro-lens that is in alignment with the pixel patch or slightly larger. The outer perimeter shape of the opaque material or element, by way of example only, can be that of the shape of the pixel, pixel patch or the micro-lens that is in alignment with the pixel patch. One opaque material or element (light block) can be distant separated from the next closest opaque material or element (light block). Thus, by utilizing a plurality of opaque material or elements (light blocks) separated from one another and shaped, sized and aligned with their respective pixel patches (patches of pixels) and further aligned with the micro-lenses (which, in preferred embodiments, are aligned with the pixel patches) it is possible to maintain a high degree of transparency of the transparent optical module.

In a certain embodiment the transparent near eye display is sparsely populated with pixels and the micro-lens array is sparsely populated with micro-lenses of the micro-lens array. In these embodiments the micro-lenses of the micro-lens array are aligned with the pixels or pixel patches of the transparent near eye display. In this embodiment the micro-lenses of the micro-lens array are static (meaning always have optical power). Thus, the micro-lens array is static.

In a certain embodiment the transparent near eye display is fully populated with pixels and the micro-lens array is fully populated with micro-lenses of the micro-lens array. In these embodiments the micro-lenses of the micro-lens array are aligned with the pixels or pixel patches of the transparent near eye display. In these embodiments the micro-lenses of the micro-lens array are electronic switchable on and off. Thus, the micro-lens array is dynamic.

In a certain embodiment the transparent near eye display is sparsely populated with pixels and the micro-lens array is fully populated with micro-lenses of the micro-lens array. In these embodiments the micro-lenses of the micro-lens array are aligned with the pixels or pixel patches of the transparent near eye display. In these embodiments the micro-lenses of the micro-lens array are electronic switchable on and off. Thus, the micro-lens array is dynamic.

In a certain embodiment the transparent near eye display is fully populated with pixels and the micro-lens array is sparsely populated with micro-lenses of the micro-lens array. In these embodiments the micro-lenses of the micro-lens array are aligned with the pixels or pixel patches of the transparent near eye display. In these embodiments the micro-lenses of the micro-lens array are electronic switchable on and off. Thus, the micro-lens array is dynamic.

In a certain embodiment the transparent near eye display is sparsely populated with pixels and the micro-lens array is sparsely populated with micro-lenses of the micro-lens array. In these embodiments the micro-lenses of the micro-lens array are aligned with the pixels or pixel patches of the transparent near eye display. In these embodiments the micro-lenses of the micro-lens array are electronic switchable on and off. Thus, the micro-lens array is dynamic.

As used herein a sparsely populated transparent near eye display can have different levels of sparseness. Mild sparseness of a sparsely populated transparent near eye display is that having a pixel fill factor of the transparent near eye display of less than 100% down to 75%. Medium sparseness of a sparsely populated transparent near eye display is that having a pixel fill factor of the transparent near eye display of less than 75% down to 50%. Significant sparseness of a sparsely populated transparent near eye display is that having a pixel fill factor of the transparent near eye display of less than 50% down to 25%. Extreme sparseness of a sparsely populated transparent near eye display is that having a pixel fill factor of the transparent near eye display of less than 25% to just slightly greater than 0% (e.g., above 0.1%).

As used herein a sparsely populated micro-lens array can have different levels of sparseness. Mild sparseness of a sparsely populated micro-lens array is that having a micro-lens (lenslet) fill factor of the micro-lens array of 95% down to 75%. Medium sparseness of a sparsely populated transparent near eye display is that having a micro-lens (lenslet) fill factor of the micro-lens array of less than 75% down to 50%. Significant sparseness of a sparsely populated micro-lens array is that having a micro-lens (lenslet) fill factor of the micro-lens array of less than 50% down to 25%. Extreme sparseness of a sparsely populated micro-lens array is that having a micro-lens (lenslet) fill factor of the micro-lens array of less than 25% to just slightly greater than 0% (e.g., above 0.1%).

The transparent near eye display is a see-through near eye display. The transparent near eye display utilizes a transparent substrate. The transparent substrate supports the pixel(s) or light emitters of the transparent near eye display. The conductors of the transparent near eye display are transparent. The conductors are made of by way of example only, ITO. The transparent near eye display can transmit light rays through the near eye display originating from a distance in front of the transparent near eye module (furthest away from the eye of the user) to an eye of a user of the transparent near eye module to form a real image perceived by the user. Such light rays that form the real image pass through both the near eye display and the micro-lens array. The near eye display is further capable of generating light rays generated by way of active pixels of the near eye display to form a virtual image perceived by the user. Light rays that form the virtual image are given off by way of the near eye display and further pass through one or more micro-lenses of the micro-lens array before entering an eye of the user.

The transparent near eye display can be that of a dynamic transparent near eye display. By dynamic transparent near eye display it is meant that the display can, by way of example only be one or more of the following; modulated, have a duty cycle on and off, provide lateral and/or vertical modulation of pixels on and off, or turn off certain pixels and/or pixel patches. The dynamic aspect of the display can be controlled, by way of example only one or more of; controller, driver, processor, or software.

In an embodiment two transparent near eye displays (used for one of XR, AR, or MR) can control the convergence of the user's eyes. By altering the distance between active pixels used by each of the two transparent near eye displays (one located in front of each eye) it is possible to cause the user's eyes to converge. By way of example only, should the user have a distance IPD (inter pupillary distance) of 63 mm for far and 59 mm for near, two transparent near eye displays can provide the distance between corresponding active pixels (or pixel patches) of the two near eye displays being 63 mm for looking at a virtual image placed at (by way of example only) infinity, and then the software operating the controller/driver can alter the distance between the corresponding active pixels (or pixel patches) of the two transparent near eye displays to be at 59 mm for seeing a virtual image to be seen (by way of example only) at 2 feet. Thus, with this embodiment the two transparent near eye displays can control the convergence of the eyes of the user.

This is, in ways, opposite of an eye tracker whereby the eye moves, and the eye tracker tracks the eye and then alters the image on the display. In this case the transparent near eye display or displays is causing the fixation of the user's eye or eyes on the corresponding virtual image to change the direction of their line of sight. Thus, by way of example only, should video or still content comprising an image of a bird have an annotation associated with it that indicates that the bird should be displayed as a virtual image at a distance of 20 feet from the eye, then two transparent near eye displays will provide for a distance between the identical active pixels (or pixel patches) of the two transparent near eye displays such that the gaze directions corresponding to the location of the pixels relative to the center of the pupils provide a convergence at the required distance of 20 feet from the eye. If on the other hand, by way of example only, should an image of a cup cake have an annotation that indicates that the cupcake should be displayed as a virtual image at 2 feet, the two near eye displays will provide for a distance between the identical active pixels (or pixel patches) of the two transparent near eye displays providing a convergence of the two gaze directions at 2 feet from the eyes, closer to that of the user's near IPD. The IPD can be measured and established for each user at various distances (from far to intermediate to near) and then programed into the memory of the AR system for a specific user. In certain cases, causing convergence of the user's eyes for a near or closer virtual image can utilize corresponding active pixels (or pixel patches) of the two transparent near eye displays that are lower and closer together, whereas convergence for a further image can utilize pixels of the two transparent near eye displays that are higher and further apart.

This software embodiment when utilized with the appropriate hardware allows for moving the perceived virtual image forward and backward at any distance along the Z axis from an eye or both eyes of the user. In certain cases, the IPD can be set for as the default of between 55 mm and 60 mm for near for women and 60 mm and 65 mm for men for large Eye box. In other cases, the IPD can be customized to the exact IPD of the user.

In another embodiment where the perception of depth (for XR, AR, or MR) is important for the use case, two transparent near eye displays are used (as in the previous embodiment) to control the convergence of the two eyes of the user). However in this embodiment the corresponding active pixels (or pixel patch) of the transparent near eye display for the right eye and the corresponding active pixels (or pixel patch) of the near eye display for the left eye are not activated so as to establish the same precise distance of convergence for the eyes of the user. In other words, the distance of convergence to different parts of the same virtual image is deliberately set at a different distance in order to enhance depth perception for stereo vision. The active pixels (or pixel patch) of one near eye display is purposely slightly misaligned in terms of relative location of the corresponding active pixels (or pixel patch) of the other display. Such a misalignment causes the right eye of the user and the left eye of the user to converge and see the virtual image at slightly different distances. The amount/degree of misalignment provides for the two eyes of the user to be misaligned but to remain within the user's Panum's fusion zone thus providing depth perception of the virtual image seen by the eyes of the user.

In yet another embodiment (like, by way of example only, that of a 3D hologram) where enhanced depth perception is desired, a first image is presented to the right eye, by way of a first transparent near eye display (in front of the right eye) and a different image is presented to the left eye by way of the second transparent near eye display (being in front of the left eye). The features of the two images are designed to be summed/merged to form a 3D like holographic image or a significant 3D image. The way the images are summed or merged together is, by way of example only, by modulating the image displayed by the right transparent near eye display faster than the right eye of the user can perceive the modulation and modulating the image displayed by the left transparent near eye display also faster than the left eye of the user can perceive the modulation. Thus, the eyes of the user are unable to perceive any modulation and the brain merges the two images together such to form one enhanced image having significant depth and stereo vision. In still another embodiment by using temporal modulation of the right and left displayed images, such that one is delayed within 50 milliseconds to 150 milliseconds to that of the other, significant depth perception can be achieved.

In certain embodiments software having associated cues can be used to prompt a controller/driver as where to orient the virtual image with respect to that of the user's eyes. By of example only, a certain cue associated with the image of, by way of example only, a child, can locate the virtual image of the child at a near distance. A different cue associated with the image of, by way of example only, a child, can locate the virtual image of the child at an intermediate distance. And still a different cue associated with the image of, by way of example only, a child, can locate the virtual image of the child at a far distance. In other embodiments, certain software having associated cues can prompt a first transparent near eye display to modulate the virtual image at a certain duty cycle while the software prompts a second transparent near eye display to modulate at the same duty cycle but in such a manner that the second display's duty cycle is slightly time delayed to that of the first display's duty cycle. In certain embodiments software having a specific cue can align the virtual image at a distance along the Z axis from the eye (or eyes) of a user. In certain embodiments software having a specific cue can cause the virtual image as seen by the eyes of the user to have depth. In certain embodiments software having a specific cue can cause the virtual image as seen by the eyes of the user to have the perception of depth. In certain embodiments software having a specific cue can cause the virtual image as seen by the eyes of the user to have the perception of significant depth. In certain embodiments software having a specific cue can cause the virtual image as seen by the eyes of the user to have the perception of a hologram.

In another embodiment a further stereoscopic and accommodative cue is provided by image magnification. In one embodiment, the micro-lens array has a fixed image magnification, designed to project the virtual image at a fixed distance, as an example only, 20 feet. In another embodiment, the micro-lens array has a variable magnification, provided by, as examples, lenslets with dynamic focusing elements, or the distance between the near eye display and the micro-lens array, in order to vary the stereoscopic distance of the virtual image, when combined with the virtual image formed by the near eye display placed in front of the companion eye. The location of the activated pixels in the two displays ensure a convergence distance that equals the stereoscopic distance cued by the image magnification of the virtual image in both eyes.

In yet another embodiment that can be used for the visually impaired, the magnification resulting from the distance of the micro-lens array from the near eye display can be adjusted to provide increased or reduced levels of magnification of the virtual image on the eye of the user. By way of example only, a narrower space/gap or distance between the micro-lens array and the near eye display will result in a higher magnification of the virtual image on the retina of the eye of the user and a larger space/gap or distance between the micro-lens array and the near eye display will result in a lesser magnification of the virtual image on the retina of the eye of the user. Thus, it is possible to provide a desired level of magnification of a displayed virtual image for an assisted vision device (low vision device) to help the visually impaired see better.

In certain embodiments disclosed herein the micro-lens array is that of a dynamic switchable (on-off) micro-lens array. In other embodiments disclosed herein the micro-lens array is a static (always on) micro-lens array. In certain embodiments the micro-lens array is fully populated with micro-lenses. In other embodiments the micro-lens array is partially populated with micro-lenses. In certain embodiments (which utilize infinite conjugate optics) disclosed herein the micro-lenses of the micro-lens array collimate the light rays that pass through the micro-lenses of the micro-lens array causing the rays of light to be parallel to each other when striking the cornea of the user's eye. When this occurs the user's eye's optical structures focus the light on the fovea of the user's eye (assuming the user's eye is emmetropic). And if not, corrective lenses, by way of example only, (eyeglasses or contact lenses) would be worn.

When infinite conjugate optics are used the image, as seen by the eye of the user, is right side up. In other embodiments (which utilize finite conjugate optics) disclosed herein the micro-lenses of the micro-lens array focus the light rays that pass through the micro-lenses of the micro-lens array causing the rays of light to converge and form an image in front of the eye of the user. The formed image is seen by the eye in front of the eye, however the image formed on the retina is inverted/upside down. If the user is not emmetropic corrective lenses, by way of example only, (eyeglasses or contact lenses) would be worn. When finite conjugate optics are utilized the image as seen by the eye of the user is upside down. Therefore, in these embodiments utilizing finite conjugate optics the near eye display is programmed to present an inverted image so that the resultant image as seen by the user's eye is properly oriented as opposed to being inverted. The light rays making up the real image are not inverted upon reaching the eye as they do not pass through the finite conjugate optics of the micro-lens array. It should further be pointed out that light rays that form the real image (as seen by the eye of a user) pass through the entire transparent optical module. Light rays that form the virtual image (as seen by the eye of a user) only pass through part of the transparent optical module.

By altering one or more features (by way of example only), pixel size, pixel pitch, thickness, MLA micro-lens optical power, or gap distance (either air gap or material spacer), the transparent near eye optical module as taught herein can be utilized, by way of example only, with, attached to, or embedded within, any near eye display device utilized near the eye of the user. By way of example only, 1) All forms of eyewear (by example; sports eyewear, shooting eyewear, biking eyewear, safety eyewear, industrial eyewear, space goggles, dress eyewear, military eyewear, low vision eyewear; and/or 2) All forms of headwear, by example only; helmets, face shields, etc.; and/or 3) Medical Instruments. In certain cases of the above, an eye tracker or eye trackers working in association with sensors that sense eye movement and eye location are utilized.

The transparent near eye display optical module can be utilized monocularly for one eye or bioptic or binocularly when two such modules are used; one for each eye. In certain embodiments the level of brightness of the virtual image needs to be controlled relative to that of the outdoor real-world ambient light. The transparent near eye display can use light emitters, by way of example only, OLEDs, TOLEDs, or micro-LEDS. One or more light sensors can be utilized to measure the level of ambient light (outdoor or indoor). In such an embodiment the transparent near eye display brightness outdoors is controlled up and down to maintain being within the range of +/−25% of the outdoor real-world light ambient brightness. In such an embodiment the transparent near eye display brightness outdoors is controlled up and down to maintain being within the range of +/−25% of the indoor light ambient brightness. In certain cases, the transparent near eye display when used outdoors is modulated with a duty cycle above that of 50% but below that of 100% in order to reduce the brightness intensity of the transparent near eye display. In certain embodiments the level of brightness of the virtual image needs to be controlled relative to that of the indoor ambient light. In such an embodiment the transparent near eye display brightness outdoors is controlled up and down to maintain being within the range of +/−25% of the indoor light ambient brightness. In certain cases, the transparent near eye display when used indoors is modulated with a duty cycle below that of 50% in order to reduce the brightness intensity of the transparent near eye display module. In certain embodiments the near eye display optical module can alter the percentage of transmission of light from the real-world that passes through the transparent near eye display module. This can be accomplished by way of the forward substrate or a coating thereon (furthest away from the eye of the user) being by way of example only, photochromatic, electrochromic, or thermochromic.

Various Aspects of the invention are provided below.

Aspect A1. A transparent near eye display optical module, wherein the module comprises a sparsely populated transparent near eye display, spaced apart from one or more optically aligned micro-lens array(s), wherein the active pixel density (by way of example only, OLEDs and/or iLEDs) of the sparsely populated near eye display represents less than 50%, less than 35%, less than 25%, less than 15%, less than 10%, or less than 5% of the area of the transparent near eye display, wherein light rays from the real world that form a real image (as seen by the eye of a user) pass through the see through near eye display, the space between the near eye display and the micro-lens array and the micro-lens array (which can be that of an air gap or a material spacer), wherein light rays that form a virtual image (as seen by the eye of a user) are generated by way of the active pixels of the sparsely populated near eye display that travel through the space between the near eye display and the micro-lens array and then one or more micro-lenses of the micro-lens array. The near eye display can be optionally constructed to reduce outward light emitting away from the eye of the wearer. When the eye of the user looking at infinity requires corrective optical power to focus light on its retina, such a corrective lens is located between the eye of the user and the micro-lens array. The use of the words "active pixels" as used herein is meant to be (a pixel or pixels) that are capable of emitting light at any one time. By this it is meant that the pixels can light up when displaying an image and have not been deliberately turned off or programed to be turned off in order for the transparent near eye display to be that of a transparent sparsely populated near eye display.

Aspect 2, In other embodiments involving transparent pixels, such as by way of example only, TOLEDs, the pixel density can either be that of a sparsely populated transparent near eye display (an amount less than 100% of a fully populated transparent near eye display) or that of a fully populated transparent near eye display that limits the active pixels of such a fully populated near eye display at any one time to cause the fully populated near eye display to act/mimic that of a sparsely populated near eye display. By way of example only, by limiting the number of active pixels of a TOLED display the appropriate amount of light rays from the real world can be transmitted through the TOLED display so to form a real image as seen by the eye of the user, while permitting the TOLED display to provide/generate the appropriate amount of light rays for forming the virtual image as seen by the eye of the user.

Aspect 3, In still other embodiments, a transparent near eye display can be modulated and have a duty cycle of on and off, so as to permit the real image to be seen for only a period of time (when no pixels are generating light) and the virtual image to be seen for only a period of time (when the majority of pixels are generating light). This then continues to repeat itself over and over. Such a duty cycle can be within the range of 1.0% to 50%. When such an embodiment is utilized the associated aligned micro-lens array can also be modulated, so to have a duty cycle (off and on) that mimics and is simultaneous with the duty cycle of the near eye display. When the micro-lens array is turned off and has little to no optical power light rays from the real world can pass through largely altered.

Aspect A5. A transparent near eye display optical module, wherein the module comprises a transparent near eye display and one or more optically aligned micro-lens array(s), wherein the "active pixel density" of the near eye display represents less than 25%, less than 20%, less than 15%, less than 10%, or less than 5% of the area of the transparent near eye display, wherein light rays from the real world that form a real image pass through the see through near eye display, wherein light rays that form a virtual image are generated by way of the lighted pixels of the near eye display and wherein the near eye display is constructed such to reduce light emitting away from the eye of the wearer.

Aspect A6. The micro-lens array of any preceding Aspect, wherein the micro-lens array is modulated so that a plurality of micro-lenses pass light rays from a plurality of active pixels of the sparsely populated transparent near eye display forming the virtual image less than 50% of the time.

Aspect A7. The micro-lens array of any preceding Aspect, wherein the micro-lens array is modulated so that a plurality of micro-lenses pass light rays from a plurality of active pixels of the sparsely populated transparent near eye display forming the virtual image less than 25% of the time.

Aspect A8. The transparent near eye display optical module of any preceding Aspect, wherein the module is that of a photonic optical module.

Aspect A9. The optical module of any preceding Aspect, wherein the module is attached to an eyewear frame and wherein such attachment is by way of a track on or in one of the eyewear's front, bridge, temple.

Aspect A10. The sparsely populated transparent near eye display of any preceding Aspect, wherein the sparsely populated transparent near eye display comprises a TOLED display.

Aspect A11. The transparent near eye display of any preceding Aspect, wherein the transparent near eye display comprises a see-through micro-LED display.

Aspect A12. The transparent near eye display of any preceding Aspect, wherein the transparent near eye display comprises a see-through OLED display.

Aspect A13. The sparsely populated transparent near eye display of any preceding Aspect, wherein the sparsely populated transparent near eye display comprises a plurality of distance separated patches of pixels.

Aspect A14. The sparsely populated transparent near eye display of any preceding Aspect, wherein the sparsely populated transparent near eye display comprises a plurality of distance separated tiles of pixels.

Aspect A15. The sparsely populated transparent near eye display of any preceding Aspect, wherein the sparsely populated transparent near eye display comprises a plurality of distance separated tiles or patches of pixels and wherein the distance between the tiles or patches of pixels is within the range of 150 microns to 500 microns.

Aspect A16. The pixels of any preceding Aspect, wherein the pixels have a size within the range of 1 micron-5 microns.

Aspect A17. The micro-lens of any preceding Aspect, wherein the micro-lens has a size within the range of 25 microns-750 microns.

Aspect A18. The micro-lens array of any preceding Aspect, wherein one micro-lens of the micro-lens array communicates optically with a plurality of pixels.

Aspect A19. The micro-lens array of any preceding Aspect, wherein one micro-lens of the micro-lens array communicates optically with a specific patch of pixels.

Aspect A20. The micro-lens array of any preceding Aspect, wherein one micro-lens of the micro-lens array communicates optically with a specific tile(s) or patch(es) of pixels.

Aspect A21. The micro-lens array of any preceding Aspect, wherein each micro-lens of the micro-lens array is located within the range of 75 microns to 1 mm from each other.

Aspect A22. A patch or tile of pixels of any preceding Aspect, wherein a patch or tile of pixels includes numbers of pixels within the range of 625-10,000 pixels.

Aspect A23. The patches or tiles of pixels of any preceding Aspect, wherein each pixel within the patches or tiles of pixels are located within the range of 1 mm microns to 5 microns from each other.

Aspect A24. The patch or tiles of pixels of any preceding Aspect, wherein each patch or tile of pixels measures within the range of 150 microns×150 microns-750 microns×750 microns.

Aspect A25. The sparsely populated transparent near eye display of any preceding Aspect, wherein the sparsely populated transparent near eye display comprises a plurality of distance separated patches or tiles and wherein 16-36 patches or tiles can be seen at one time by an eye of the wearer at any one time.

Aspect A26. The sparsely populated transparent near eye display of any preceding Aspect, wherein an eye tracker is utilized in association with the sparsely populated transparent near eye display and wherein as the eye moves across the near eye display certain active pixels are turned off.

Aspect A27. The sparsely populated transparent near eye display of any preceding Aspect, wherein an eye tracker is utilized in association with the sparsely populated transparent near eye display and wherein as the eye moves across the near eye display certain active pixels are turned on.

Aspect A28. The sparsely populated transparent near eye display of any preceding Aspect, wherein the sparsely populated transparent near eye display provides a magnification of the virtual image between the range of 1-10 times.

Aspect A29. The module of any preceding Aspect, wherein the module is curved to the front base curve of the eyeglass lens to which it is in optical communication with.

Aspect A30. The module of any preceding Aspect, wherein the module is curved in the horizon direction to that of the horizontal curve of the eyeglass lens to which it is in optical communication therewith.

Aspect A31. The transparent near eye display of any preceding Aspect, wherein the transparent near eye display comprises patches or tiles of pixels that are faceted or tilted such to allow for the line of sight of the wearer to be within zero to 10, 15, 20, or 25 degrees of the perpendicular when looking through a section of a patch or a tile of pixels as the wearer's eye's line of sight moves horizontally across a section of the transparent near eye display.

Aspect A32. The module of any preceding Aspect, wherein the module comprises an air gap cavity.

Aspect A33. The module of any preceding Aspect, wherein the module is located in front of an eyewear lens and wherein there is an gap (air gap or material spacer) between the module and the front of the eyewear lens.

Aspect A34. The gap (material spacer or air gap) of any preceding Aspect wherein the spacing (air gap or material spacer) thickness is within the range of 25 microns and 2.0 mm.

Aspect A35. The gap (material spacer or air gap) of any preceding Aspect, wherein the spacing (air gap or material spacer) thickness is within the range of 50 microns and 150 microns.

Aspect A36. The micro-lens array of any preceding Aspect, wherein the micro-lens array thickness is within the range of 0.3 mm and 2.0 mm.

Aspect A37. The micro-lens array of any preceding Aspect, wherein the micro-lens array thickness is within the range of 0.5 mm and 1.0 mm.

Aspect A38. The transparent near eye display of any preceding Aspect, wherein the transparent near eye display thickness is within the range of 0.3 mm and 2.0 mm.

Aspect A39. The transparent near eye display of any preceding Aspect, wherein the transparent near eye display thickness is within the range of 0.35 mm and 1.0 mm.

Aspect A40. The transparent near eye display module of any preceding Aspect, wherein the transparent near eye display module has a thickness within the range of 1.0 mm and 4.0 mm.

Aspect A41. The transparent near eye display of any preceding Aspect, wherein the transparent near eye display is a faceted display.

Aspect A42. The transparent near eye display of any preceding Aspect, wherein the transparent near eye display has multiple patches or tiles of pixels that are tilted.

Aspect A43. The transparent near eye display of any preceding Aspect, wherein the transparent near eye display has multiple patches or tiles of pixels that are faceted.

Aspect A44. The transparent near eye display of any preceding Aspect, wherein the transparent near eye display has pixels that are sparsely populated, tilted and faceted.

Aspect A45. The transparent near eye display of any preceding Aspect, wherein the transparent near eye display has a plurality of integrators that integrate the color from a plurality of colored pixels.

Aspect A46. The transparent near eye display of any preceding Aspect, wherein the transparent near eye display is monochromatic.

Aspect A47. The transparent near eye display of any preceding Aspect, wherein the transparent near eye display provides multiple colors.

Aspect A48. The transparent near eye display of any preceding Aspect, wherein the transparent near eye display is QVGA.

Aspect A49. The transparent near eye display of any preceding Aspect, wherein the transparent near eye display is greater than a QVGA.

Aspect A50. The transparent near eye display of any preceding Aspect, wherein the transparent near eye display is a full VGA.

Aspect A51. The transparent near eye display module of any preceding Aspect, wherein the transparent near eye display module causes a time sequenced modulation of a virtual image with that of a real image.

Aspect A52. The transparent near eye display module of any preceding Aspect, wherein the transparent near eye display module causes the virtual image and the real image to be seen at the same time.

Aspect A53. The transparent near eye display module of any preceding Aspect, wherein the transparent near eye display module can be releaseably attachable to a plurality of different eyewear frames.

Aspect A54. The transparent near eye display module of any preceding Aspect, wherein the bottom edge of the transparent near eye display module can be located at or above the upper edge of the pupil of the eye(s) of the wearer.

Aspect A55. The transparent near eye display module of any preceding Aspect, wherein the transparent near eye display module can be adjustable relative to a pupil of the eye of a wearer.

Aspect A56. The transparent near eye display module of any preceding Aspect, wherein the transparent near eye display module can modulate the virtual image.

Aspect A57. The transparent near eye display module of any preceding Aspect, wherein the transparent near eye display module can illuminate the pupil of the eye of a user with 1-15 nits.

Aspect A58. The near eye display of any preceding Aspect, wherein the near eye display is a micro-OLED display.

Aspect A59. The near eye display of any preceding Aspect, wherein the near eye display is a micro-iLED display.

Aspect A60. The near eye display of any preceding Aspect, wherein the near eye display is comprised of OLEDs or TOLEDs.

Aspect A61. The near eye display of any preceding Aspect, wherein the near eye display is comprised of iLEDS.

Aspect A60. The near eye display of any preceding Aspect, wherein the near eye display has a transparent electrode section.

Aspect A63. The near eye display of any preceding Aspect, wherein the near eye display has transparent or translucent sections between patches or tiles of pixels.

Aspect A64. The near eye display of any preceding Aspect, wherein the near eye display has transparent or translucent sections between patches or tiles of pixels.

Aspect A65. The near eye display of any preceding Aspect, wherein the near eye display has transparent or translucent sections between pixels.

Aspect A66. The near eye display of any preceding Aspect, wherein the near eye display has transparent or translucent sections between patches or tiles of pixels opaque on the side away from the eye of the wearer.

Aspect A67. The near eye display of any preceding Aspect, wherein the near eye display has transparent or translucent sections between patches or tiles of pixels opaque on the side away from or near the eye of the wearer.

Aspect A68. The near eye display of any preceding Aspect, wherein the near eye display has a fill factor of 50%, 40%, 30%, 20%, 10%, 5%, or less pixels.

Aspect A69. The near eye display of any preceding Aspect, wherein the near eye display has a fill factor or 10% or less pixels.

Aspect A70. The near eye display of any preceding Aspect, wherein the near eye display has a fill factor of 20% or less pixels patches.

Aspect A71. The near eye display of any preceding Aspect, wherein the near eye display has a fill factor or 5% or less pixels patches.

Aspect A72. The micro-lens array of any preceding Aspect, wherein the micro-lens array has a fill factor of 75% or 50% or less.

Aspect A73. The micro-lens array of any preceding Aspect, wherein the micro-lens array has a fill factor of 50% or less.

Aspect A74. The near eye display of any preceding Aspect wherein the near eye display is a TOLED display.

Aspect A75. The near eye display of any preceding Aspect, wherein the near eye display is an OLED display.

Aspect A76. The near eye display of any preceding Aspect wherein the near eye display is an iLED or micro-LED display.

Aspect A77. The near eye display of any preceding Aspect, wherein section(s) of the near eye display behind a pixel or patches of pixels on the side of the pixel or patches of pixels furthest from the eye of the wearer is opaque and wherein the sections between the pixels and/or patches of pixels is transparent.

Aspect A78. The near eye display of any preceding Aspect, wherein section(s) of the near eye display behind a pixel or patches of pixels on the side of the pixel or patches of pixels furthest from the eye of the wearer is opaque and wherein the sections between the pixels and/or patches of pixels is semi-transparent.

Aspect A796. The near eye display of any preceding Aspect, wherein the electronic bus(es) of the near eye display are oriented in the vertical direction.

Aspect A80. The near eye display of any preceding Aspect, wherein the electronic bus(es) of the near eye display are oriented in the horizontal direction and located in the superior region of the near eye display.

Aspect A81. The near eye display of any preceding Aspect, wherein the line of sight can access the near eye display without crossing an electronic bus.

Aspect A82. The near eye optical module of any preceding Aspect wherein said optical module comprises an micro-lens array.

Aspect A83. The micro-lens array of any preceding Aspect wherein said micro-lens array comprises a plurality of micro-lenses and wherein the micro-lenses collimate light from the near eye display.

Aspect A84. The near eye display of any preceding Aspect, wherein the near eye display provides inverted image to that which is seen right side up by the eye of the wearer/user.

Aspect A85. The micro-lens array of any preceding Aspect wherein said micro-lens array comprises a plurality of micro-lenses and wherein the micro-lenses focus light from the near eye display.

Aspect A86. The near eye display of any preceding Aspect, wherein the near eye display has an properly oriented image to that which is seen right side up by the eye of the wearer/user.

Aspect A87. The micro-lens array of any preceding Aspect, wherein the micro-lens array is sparsely populated with micro-lenses.

Aspect A88. In certain embodiments the transparent near eye display is sparsely populated with pixels. In certain embodiments the transparent near eye display is fully populated with pixels. In certain embodiments material or element is positioned behind (further from the eye of the user) the pixels (or patch of pixels) to reduce and if possible, eliminate the amount of outward light from the pixels away from the eye of the user. Such material can be, by way of example only, an opaque material or element. In other embodiments, by way of example only, when a TOLED is utilized as the near eye display, this opaque material or element blocks both outward light and inward light from the real world that without this opaque material or element could travel through a transparent patch of pixels, then through an aligned micro-lens of the micro-lens array.

Aspect A89. In embodiments, when such an opaque material or element is utilized the size of the material or element can be, by way of example only, the size of that of the pixel patch or slightly larger, or the size of the micro-lens that is in alignment with the pixel patch or slightly larger. The outer perimeter shape of the opaque material or element, by way of example only, can be that of the shape of the pixel patch or the micro-lens that is in alignment with the pixel patch. One opaque material or element can be distant separated from the next closest opaque material or element. Thus, by utilizing a plurality of opaque material or elements shaped, sized and aligned with their respective pixel patches (patches of pixels) and further aligned with the micro-lenses (which are aligned with the pixel patches) it is possible to maintain a high degree of transparency of the transparent optical module.

Aspect B1. An AR module comprising a transparent near eye display, air gap and micro-lens array, wherein the micro-lens array is aligned with the near eye display, wherein the near eye display comprises a fill factor of pixels of less than 50%, less than 40%, less than 30%, less than 20%, less than 10% or less than 5% and wherein micro-lens array collimates light rays coming from the transparent near eye display towards the eye of the wearer.

Aspect B2. The AR module of Aspect B1, wherein the AR module is transparent.

Aspect B3. The AR module of Aspects B1 or B2, wherein the AR module is independent of the spectacle lens.

Aspect B4. The AR module of any one of Aspects B1-B3, wherein the AR module can be attached to the front surface of an eyewear lens, embedded within the front surface of an eyewear lens, distanced separated and aligned in front of the front surface of an eyewear lens.

Aspect B5. The near eye display of any one of Aspects B1-B4, wherein the near eye display comprises a plurality of pixel patches emitting light rays, wherein the light rays from each pixel patch are transmitted through an aligned micro-lens, and wherein each pixel patch which can form a virtual image on the retina of the wearer's eye.

Aspect B6. The near eye display of any one of Aspects B1-B5, wherein the near eye display has a transparency of greater than 60%, 70%, 80%, 90%.

Aspect B7. The near eye display of any one of Aspects B1-B6, wherein the near eye display has a transparency of greater than 90%.

Aspect B8. The AR module of any one of Aspects B1-B7, wherein the AR module causes a magnification of the image formed by a pixel patch of, 30×, 20×, 10×, or less on the retina of the eye of the wearer.

Aspect B9. The AR module of any one of Aspects B1-B8, wherein the AR module provides for a plus or minus 12.5 degree to 25-degree field of view.

Aspect B10. The AR module of any one of Aspects B1-B9, wherein the AR module provides of QVGA resolution on the retina of the eye of the wearer.

Aspect B11. The AR module of any one of Aspects B1-B0, wherein the AR module is hermetically sealed.

BRIEF DESCRIPTION OF THE DRAWINGS

The accompanying drawings illustrate certain aspects of embodiments of the present invention and should not be used to limit the invention. Together with the written description the drawings explain certain principles of the invention.

FIG. 1a is a schematic diagram showing a top view of a sealed transparent near eye module according to an embodiment.

FIG. 1b is a schematic diagram showing a side view of a transparent near eye module according to an embodiment.

FIG. 8 is a back-view diagram of an embodiment showing a plurality of distance separated light blocks as seen from the eyes of someone looking towards the eye of a user of the sealed transparent near eye optical module showing how light from the real world passes between the light blocks.

FIG. 12a is a diagram showing a single pixel light and how the single point light is magnified on the retina of the eye of a user after passing through a micro-lens.

FIG. 12b is a diagram of an embodiment of 25 tiles (5×5) each having 9-pixel patches passing light through a micro-lens array and the resultant image coverage of +/−12.5 degrees or 25 degrees of retina.

FIG. 15e is a side view diagram of an embodiment of a sealed transparent near eye optical module comprising certain elements.

FIG. 15g is a side view diagram of an embodiment of a sealed transparent near eye optical module comprising certain elements.

FIG. 17b is a front view diagram of an embodiment of small section limited to that of a single pixel of the sealed transparent near eye optical module which comprises a light shield aperture having a vertical hole located between the pixel and distant separated micro-lens.

FIG. 24 is a table regarding various aspects of an OLED display.

FIG. 25 is a table regarding various aspects of the micro-lens array and near eye display.

FIG. 26 is a table of example near eye displays and/or light emitters.

FIG. 27 is a table of example lenslets or micro-lenses.

FIG. 28 is a table of various example combinations of near eye displays and associated aligned micro-lens arrays.

FIG. 29 is a table of different example switchable micro-lens arrays (on and off) and different example enabling means.

FIG. 30 is a table of different characteristics and ranges thereof.

FIG. 31 is a table of example embodiments of the modulation range and duty cycle range of the near eye display and separately of a switchable on/off micro-lens array should one be used.

FIG. 32 is a table of example embodiments of transparent near eye display modules each comprising different components.

FIG. 34 is an illustration showing cone density as a function of angular separation from the fovea.

FIG. 35a is an illustration of an example embodiment of the transparent near eye display having vertically aligned and separated buses as part of the transparent near eye optical module having a flex cable or flat printed circuit superiorly and vertically oriented.

FIG. 35b is another illustration of an example embodiment of the transparent near eye display having vertically aligned and separated buses as part of the transparent near eye optical module having a flex cable or flat printed circuit temporally and horizontally oriented.

DETAILED DESCRIPTION OF VARIOUS EMBODIMENTS OF THE INVENTION

Figure 2A:
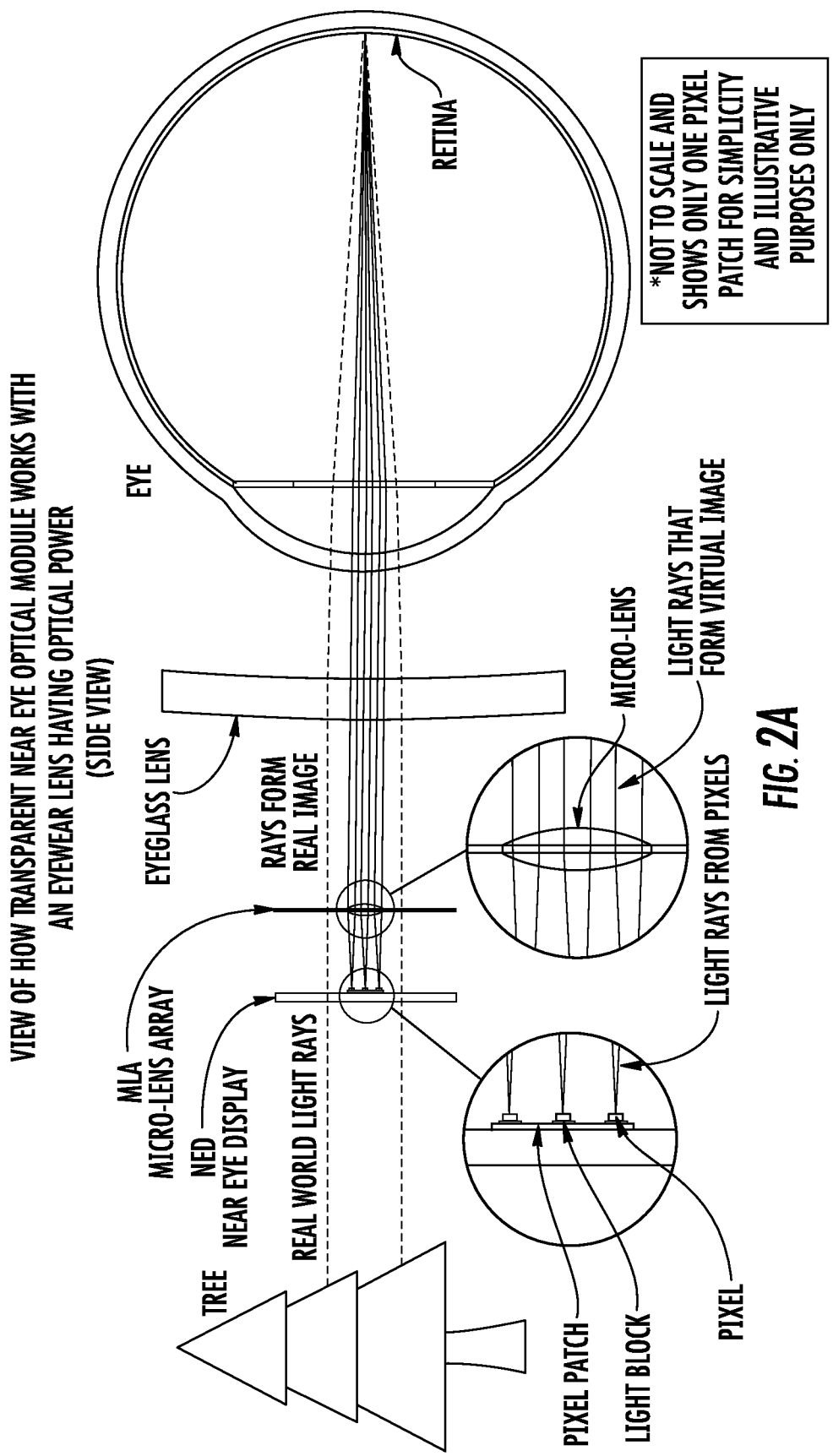
FIG. 2a is a schematic diagram showing a side view of how the populated transparent near eye module works comprising a pixel patch, light block for individual pixel, pixel and distance separated aligned micro-lens, eyewear lens having optical power and eye retina according to another embodiment.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

According to embodiments of the invention (see FIGS. 1a and 1b), a transparent near eye optical module includes a transparent near eye display comprising a plurality of pixels, sometimes arranged in patches of pixels across the near eye display, and a micro-lens array spaced apart from and positioned in optical alignment with one or more pixels (or pixel patches) of the near eye display. A light block is optionally placed behind each pixel and located on the side furthest away from the eye of a user. The transparent near eye optical module may be sealed. The sealing can be way of example only, one or more of, hermetically sealed, embedded within the eyewear lens and over coated, embedded within the eyewear lens resin and cured to be continuous with the lens matrix. By way of example only, a multilayered coating can be applied to the transparent near eye optical module as needed for providing the hermetic seal. Such a coating can be by way of example only, a sealer such as multiple layers of paralyne-C and SiOx deposited alternately. Typically, 5-12 layers are applied providing a total thickness of around 25 microns [range 10-30 microns]. The hermetic seal can cover the entire outer surface area of the transparent near eye optical module or a portion thereof. The sealer can also play a role in reducing light reflection from the external surfaces of the transparent near eye display optical module. The transparent near eye optical module is enabled by way of an electrical connection, by way of example only, a thin flex cable or printed circuit. The transparent near eye optical module can optionally also contain, by way of example only, sensor(s), electrical connector, material spacer, air gap, light shield apertures, nanoholes, optical elements around the base of a pixel or pixel patches, additional lenslets or optical, such as by way of example only, tiles of pixel patches or pixels.

In this disclosure, near eye display (NED) is defined as an electronic or mechanical display that is placed at a distance from the principal plane of the optical system of the eye wherein the retinal image generated of the NED is blurred regardless of the eye's ability to accommodate, such that the image is blurred beyond the threshold of image recognition. As utilized herein a NED is generally a transparent electronic micro display. (The term as used herein of transparent is intended to include semi-transparent).

By way of example only, any of the following light sources or light emitters can be utilized with or as the near eye display: OLED micro-display, iLED (micro-LED), TOLED (transparent organic light emitting diode), PHOLED (Phosphorescent OLED), FOLED (Flexible OLED), WOLED (white OLED), ELD (electroluminescent display), TFEL (thin film electroluminescent), TDEL (thick dielectric electroluminescent) or a combination of any of the above.

The transparent near eye display is a see-through near eye display. The transparent near eye display utilizes a transparent substrate. The transparent substrate supports the pixels or light emitters of the transparent near eye display. The conductors of the transparent near eye display are transparent. The conductors are made of by way of example only, ITO. The transparent near eye display can transmit light rays through the near eye display originating from a distance in front of the transparent near eye module (furthest away from the eye of the user) to an eye of a user of the transparent near eye module to form a real image perceived by the user. Such light rays that form the real image pass through both the near eye display and the micro-lens array. The near eye display is further capable of generating light rays generated by way of active pixels of the near eye display to form a virtual image perceived by the user. Light rays that form the virtual image are given off by way of the near eye display and further pass through one or more micro-lenses of the micro-lens array before entering an eye of the user.

The transparent near eye display can comprise transparent pixels and/or pixels with light blocked or reduced on the side furthest away from the eye of a wearer and having transparent or semi-transparent sections of the display between the pixels and/or pixel patches that will allow the real-world light rays to pass through. The pixels or pixel patches are supported by a transparent substrate. In certain embodiments an opaque feature called a light block is utilized to reduce light from being projected away from the eye of the user of the transparent near eye display. The light block can be located on the side of the pixel or pixel patch furthest from the eye of the user. A light block can be located behind a pixel. A light block can be located behind a pixel patch. One light block can be distant separated from the adjacent light block to permit light from the real world to pass through thus making the transparent near eye display transparent.

In certain embodiments the pixels of the near eye display can be transparent. In certain embodiments the pixels of the near eye display can be opaque however the space between the pixels can be transparent. In certain embodiments the transparent near eye display can comprise patches of pixels each having a light block that is opaque located behind the pixel patch on the side of the pixel patch furthest from the eye of the user, with sections of the transparent near eye display being transparent between adjacent light blocks. In other embodiments the near eye display can comprise pixels each having a light block that is opaque located behind the pixel on the side of the pixel furthest from the eye of the user, with sections of the transparent near eye display being transparent between adjacent light blocks. The near eye display can be translucent. The near eye display can be transparent. The near eye display can be semi-transparent. The transparent near eye display can be made of a passive matrix or an active matrix.

In a certain embodiment the transparent near eye display can have its pixels or its pixel patches positioned within optical wells located on or in the transparent near eye display facing the eye of the user. The pixels or its pixel patches are recessed within the wells. The shape of the wells causes the light rays to be projected towards the eye of the user in a mostly collimated manner. In another embodiment the transparent near eye display can have its pixels or its pixel patches positioned within optical wells located on or in the transparent near eye display facing the eye of the user. The pixels or its pixel patches are recessed within the wells. A micro-lens covering of each well can cause the light rays to project towards the eye of the user in a collimated manner. In another embodiment the transparent near eye display can have its pixels or its pixel patches positioned within optical wells located on or in the transparent near eye display facing the eye of the user. The pixels or its pixel patches are recessed within the wells. An aligned micro-lens array that is attached (directly or indirectly) to the transparent near eye display can cause the light rays to project towards the eye of the user in a collimated manner. In another embodiment the transparent near eye display comprises pixels or pixel patches aligned and distant separated from one more micro-lenses of a micro-lens array that is attached (directly or indirectly) to the transparent near eye display causing the light rays to project towards the eye of the user in a collimated manner. In most, but not all embodiments disclosed herein a micro-lens is distant separated in some manner from the pixel in which it is aligned.

A micro-lens array may be an array of micro-lenses formed on a transparent substrate, wherein each micro-lens comprising the micro-lens array may be, by way of example only one or more of: plano-convex, biconvex, aspheric, achromatic, diffractive, refractive, phase wrapped Fresnel lens, Fresnel Lens or a combination of plus and minus lenses forming a Gabor Superlens, a combination of a lens and a prism, or a gradient index (GRIN) lens. (See, e.g., FIGS. 2a, 2b, 2c.) In most, but not all cases, the MLA (micro-lens array) is antireflection coated on one or both sides.

Figure 3A:
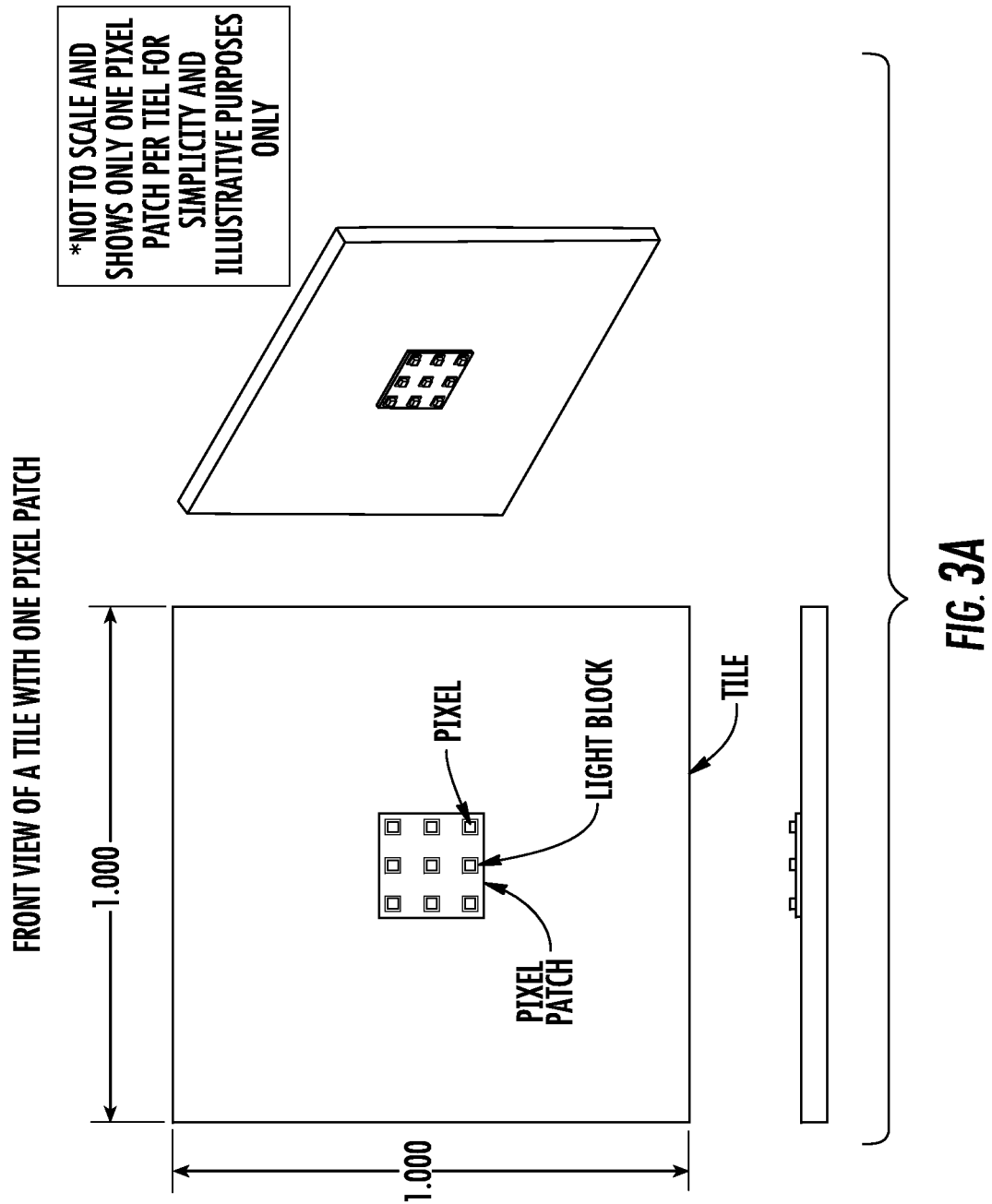
FIG. 3a is a schematic diagram showing a front view of tile having one-pixel patch of 9 pixels each having their own light block and showing how each pixel and light block are distant separated from one another according to an embodiment.
Figure 3B:
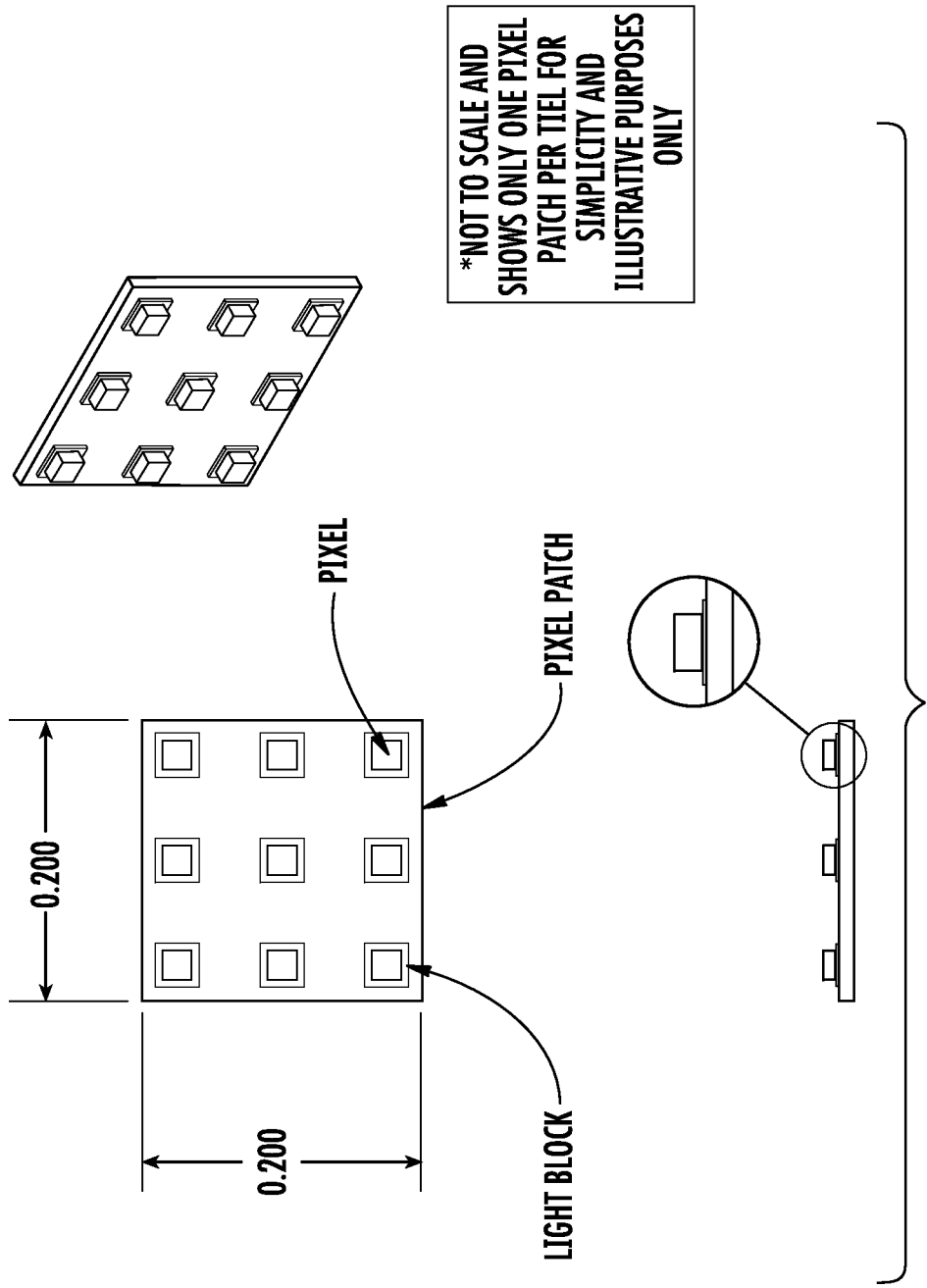
FIG. 3b is a diagram showing a front view of an embodiment of a pixel patch having 9 pixels each having their own light block and showing how each pixel and light block are distant separated from one another.
Figure 4A:
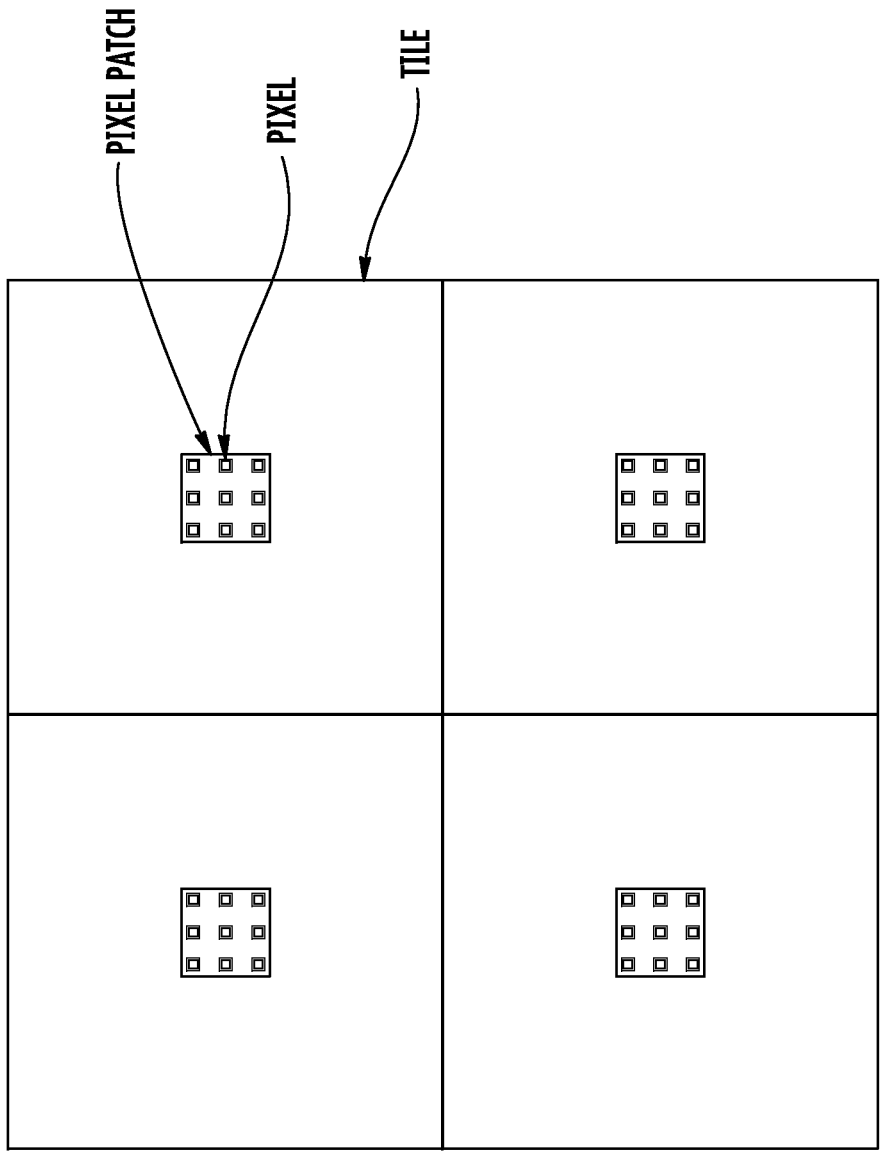
FIG. 4a is a diagram of a front view of an embodiment of 4 tiles each having one-pixel patch of 9 pixels.
Figure 4B:
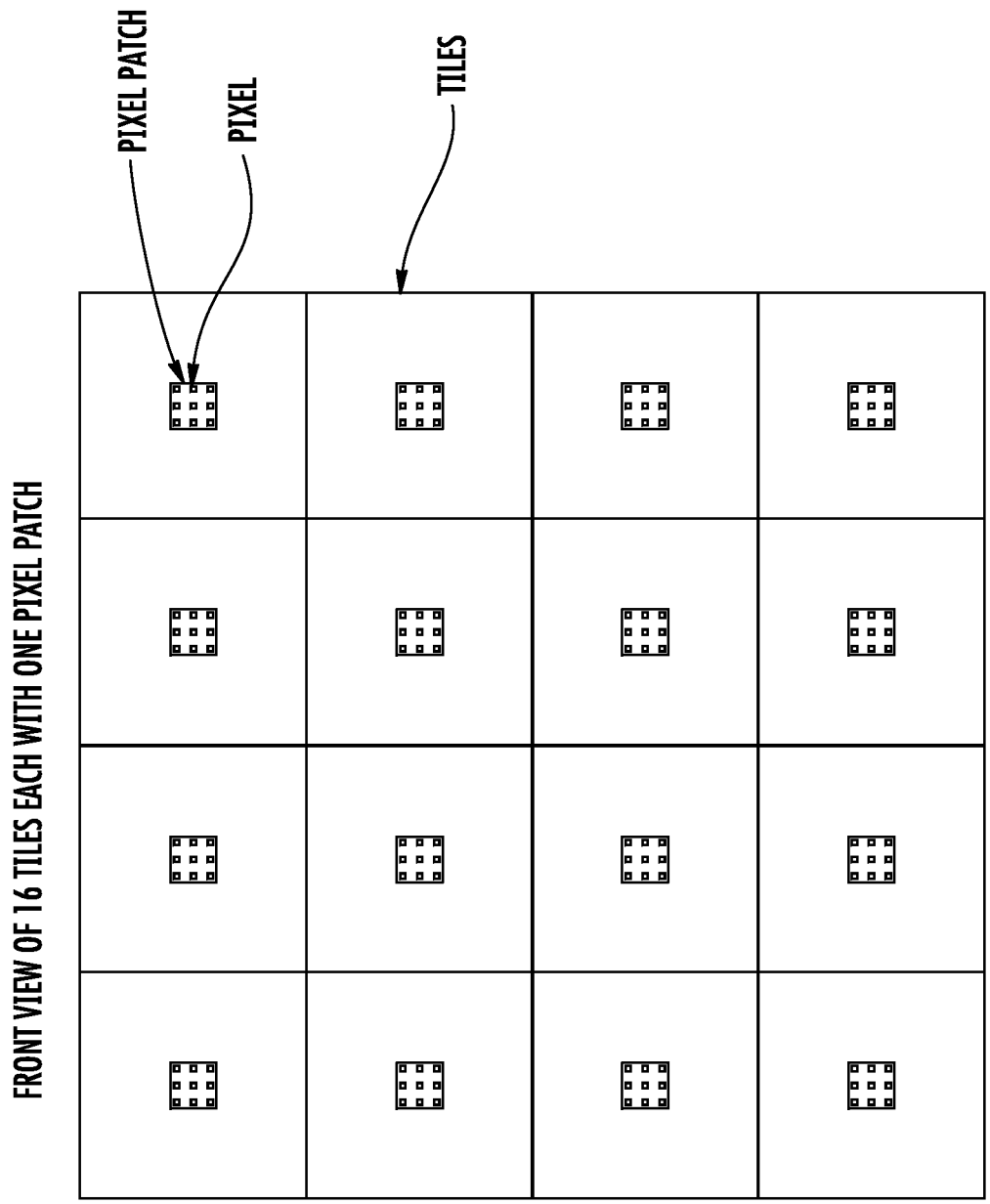
FIG. 4b is a diagram of a front view of an embodiment of 16 tiles each having one-pixel patch of 9 pixels.

A transparent near eye module taught herein includes any near eye display (with or without an associated lensing array) that is capable of passing/transmitting real world light rays through it to form a real image as perceived by the eye of a user, while also producing or giving off light rays from the near eye display that form a virtual image thus allowing a user or wearer thereof to see augmented reality or mixed reality. The lensing array can be that of a micro-lens array or a micro-optic array. One or more patches of pixels can be located within a tile of the near eye display. One-pixel patch can, by way of example only, comprise 9 pixels. (See FIGS. 3a, 3b.) One tile can, by way of example only, comprise 64-pixel patches. (See FIGS. 4a, 4b.) The transparent near eye display can have a plurality of tiles each having one or more pixel patches with each pixel patch having a plurality of pixels.

In one embodiment, a transparent near eye display optical module is used, wherein the module comprises a sparsely populated transparent near eye display, spaced apart from one or more optically aligned micro-lens array(s) (such spacing can be by way of example only an air gap or a material spacer), wherein the active pixel density (by way of example only, OLEDs and/or iLEDs) of the sparsely populated near eye display represents less than 50%, less than 35%, less than 25%, less than 15%, less than 10%, or less than 5% of the area of the transparent near eye display. In embodiments, light rays from the real world that form a real image pass through the see through near eye display, the space between the near eye display and the micro-lens array and the micro-lens array, wherein light rays that form a virtual image are generated by way of the active pixels of the sparsely populated near eye display that travel through the space between the near eye display and the micro-lens array and then one or more micro-lenses of the micro-lens array, and wherein the near eye display is constructed such to reduce outward light emitting away from the eye of the wearer. When the eye of the user when looking at infinity requires corrective optical power to focus light on its retina, such a corrective lens may be located between the eye of the user and the micro-lens array. The use of the words "active pixels" as used herein is meant to be pixels that are activated emitting light at any one time. The word gap as used herein is that of a space or distance between a pixel of the transparent near eye display and the aligned micro-lens of the micro-lens array. The gap can be filled with a material, air or a gas. The gap can be of a distance ranging from 25 microns-2 mm.

In other embodiments involving transparent pixels, such as by way of example only, TOLEDs, the pixel density can either be that of a sparsely populated near eye display (an amount less than 100% of a fully populated near eye display or that of a fully populated near eye display that limits the active pixels of such a fully populated near eye display at any one time to cause the fully populated near eye display to act as that of a sparsely populated near eye display. By limiting the number of active pixels of a TOLED display the appropriate amount of light rays from the real world can be transmitted through the TOLED display so to form a real image as seen by the eye of the user, while permitting the TOLED display to provide/generate the appropriate amount of light rays for forming the virtual image as seen by the eye of the user.

In certain embodiments the transparent near eye display is sparsely populated with pixels. In certain embodiments the transparent near eye display is fully populated with pixels. In certain embodiments material or element (light block) is positioned behind (further from the eye of the user) the pixels (or patch of pixels) to reduce and if possible, eliminate the amount of outward light from the pixels away from the eye of the user. Such material can be, by way of example only, an opaque material or element (light block). In other embodiments, by way of example only, when a TOLED is utilized as the near eye display, this opaque material or element (light block) blocks both outward light and inward light from the real world that without this opaque material or element (light block) could travel through a transparent patch of pixels, then through an aligned micro-lens of the micro-lens array.

In such embodiments, when such an opaque material or element (light block) is utilized the size of the material or element (light block) can be, by way of example only, the size of that of the pixel or pixel patch or slightly larger, or the size of the micro-lens that is in alignment with the pixel or pixel patch or slightly larger. The outer perimeter shape of the opaque material or element (light block), by way of example only, can be that of the shape of the pixel or pixel patch or the micro-lens that is in alignment with the pixel patch. One opaque material or element (light block) can be distant separated from the next closest opaque material or element (light block). Thus, by utilizing a plurality of opaque material or elements (light blocks) shaped, sized and aligned with their corresponding pixels, or pixel patches (patches of pixels) and further aligned with the micro-lenses (which are aligned with the corresponding pixels or pixel patches) it is possible to maintain a high degree of transparency of the transparent near eye optical module.

The light block that is utilized is located on the back side of each pixel or pixel patch. The light block is located on the back side of the pixel or pixel patch located furthest away from the eye of the user. In certain embodiments the light block is located directly behind and adjacent to the pixel or pixel patch. In other embodiments the light block is located on the transparent substrate which supports the pixel or pixel patch and directly behind the pixel or pixel patch. In still other embodiments the light block is located within the transparent substrate which supports the pixel or pixel patch and directly behind the pixel or pixel patch. The light block can be, by way of example only, one of a film, paint, ink, coating, etching, or opaque material layer.

In still other embodiments, a transparent near eye display can be modulated and have a duty cycle of on and off, so as to permit the real image to be seen for only a period of time (e.g., when no pixels are generating light) and the virtual image to be seen for only a period of time (e.g., when the majority of pixels are generating light). Such a duty cycle can be within the range of 1% to 50%. When such an embodiment is utilized the associated aligned micro-lens array can also be modulated, so to have a duty cycle (off and on) that mimics and is simultaneous with the duty cycle of the near eye display. When the micro-lens array is turned off it has little to no optical power and light rays from the real world can pass through largely unaltered (meaning that light rays from the real world pass through without being engaged by a micro-lens).

Figure 5A:
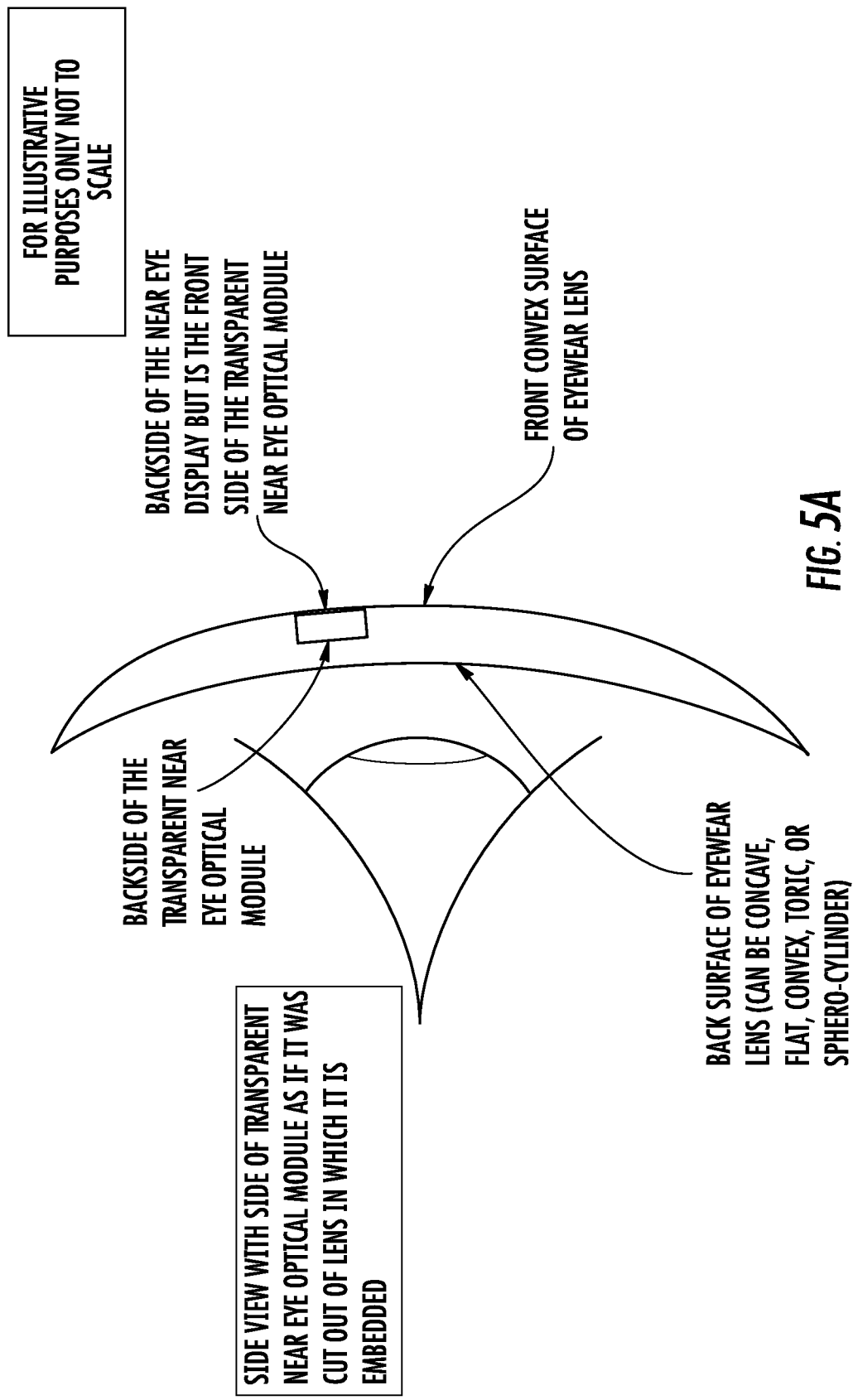
FIG. 5a is a side view of an embodiment of a transparent near eye display optical module embedded within the front surface of an eyewear lens.

For clarity the front of the transparent near eye module is the portion furthest away from the eye of the wearer/user. The back of the transparent near eye module is the portion closest to the eye of the wearer/user. Thus, by way of example only, if the transparent near eye display is embedded in or attached to the front side of an eyeglass lens, the front of the transparent near eye display would be on the side of the eyeglass lens furthest away from the eye of the wearer/user and the back of the near eye display would be closest to the eye of the wearer/user similar to that of the eyeglass lens. For clarity, the front surface of the near eye optical module is the portion furthest away from the eye of the wearer/user. The back surface of the near eye optical module is the portion closest to the eye of the wearer/user. This is easy to confuse as the back of the near eye display can form the front of the near eye display optical module and the back of the micro-lens array can form the back of the near eye display optical module. When the transparent near eye module is embedded into the front surface of an eyeglass lens the front surface of the transparent near eye optical module (which is the back of the near eye display) can be conformal to the front surface of the eyeglass lens to which it is embedded or attached (see, e.g., FIG. 5a, 5, b, 5c). The back of the near eye display can be curved to mirror that of the front surface base curve of the spectacle lens when it is one of; embedded in, attached to, or affixed to the eyewear frame and positioned in front of an eyewear lens (e.g., eyeglass lens or headwear lens). The spectacle lens can have optical corrective power or be devoid of optical corrective power (plano power). As used herein, a pixel is that of a light emitter and a pixel can also be referred to as a sub pixel emission area. Thus, both a pixel and the sub pixel emission area can be the same.

A transparent near eye optical module can comprise a near eye display and an optically aligned micro-lens array (MLA) being spaced from the near eye display. The spacing can be by way of an air gap and/or a material layer spacing (see FIGS. 16a-d). The near eye display can be sparsely pixelated to render transparency (see FIGS. 6a-d). The near eye display can be comprised of sparsely populated icons of a TOLED, OLED, or micro-LED. The near eye display can be comprised of sparsely populated pixel patches. The near eye display can be comprised of sparsely populated pixels. The near eye display can be comprised of sparsely populated Icons. The micro-lens array can be attached and optically aligned with the transparent near eye display. The plurality of pixels of the transparent near eye display can be optically aligned and in optical communication with a plurality of micro-lenses (see FIGS. 2a, 2b, 2c, 7a, 7b, and 7c). The micro-lens array can be attached to the transparent near eye display such that a plurality of micro-lenses of the micro-lens array are aligned with a plurality of pixels of the transparent near eye display and the plurality of micro-lenses and the plurality of pixels are aligned having one or more micro-lenses aligned and in optical communication with one or more pixels. The micro-lens array can be attached to the transparent near eye display such that a plurality of micro-lenses of the micro-lens array are aligned with a plurality of patches of pixels of the transparent near eye display. This provides for one micro-lens to be aligned and in optical communication with one-pixel patch (patch of pixels). One-pixel patch can, by way of example only, comprise 9 pixels. One tile can, by way of example only, comprise 64-pixel patches.

In certain embodiments, the micro-lens array is placed between the near eye display and a spectacle lens. In other embodiments, the micro-lens array can be placed between the near eye display and the real environment and a second micro-lens array can be placed between the near eye display and the spectacle lens. The micro-lens array can be arranged to form an infinite or finite conjugate optic. An embodiment of the invention disclosed herein can be that of a transparent near eye optical module which comprises a sparsely populated transparent near eye display which is distance separated from one or more optically aligned micro-lens array(s). The micro-lens array can be directly or indirectly attached to a transparent near eye display while having space in between. The space or gap can be that of an air gap or a material filled gap/spacer. In certain embodiments, the space or gap is filled with a low index material layer such as, by way of example only, silicone having a refractive index within the range of 1.41-1.45.

The active pixel density of the sparsely populated near eye display represents less than 50% or less than 40% of the area of the transparent near eye display, in embodiments, and wherein light rays from the real world that form a real image (as seen by an eye of a user) pass through the transparent near eye display, wherein light rays that form a virtual image (as seen by the eye of a user) are generated by way of active pixels of the sparsely populated near eye display. The transparent near eye display can be optionally configured to reduce light emitting away from the eye of the wearer. (See FIGS. 1a, 2a, 2c, 3b, 6d, 7c, and 8). The sparsely populated transparent near eye display can have an active pixel density of less than 30% or 20% of the area of the transparent near eye display, wherein light rays from the real world that form a real image (as seen by the eye of a user) pass through the see through near eye display, and light rays that form a virtual image (as seen by the eye of user) are generated by way of the active pixels of the sparsely populated near eye display. The near eye display is optionally configured to reduce light emitting away from the eye of the wearer. The sparsely populated transparent near eye display can have an extreme sparseness thus having an active pixel density of less than 15%, less than 10%, or less than 5% of the area of the transparent near eye display such that light rays from the real world that form a real image (as seen by the eye of a user) pass through the see through aspect of the transparent near eye display and light rays that form a virtual image (as seen by the eye of a user) are generated by way of the active pixels of the sparsely populated near eye display. The transparent near eye display is optionally constructed such that light emitting away from the eye of the wearer is reduced (see, e.g., FIGS. 2a, 2c, and 3b).

The near eye optical module in most, but not all, embodiments is sealed. Thus, the near eye display and the micro-lens array are attached, and the air gap or material spacer is enclosed and sealed. Said another way, most if not all of the front of the transparent near eye display (which faces the eye of the user) and the section of the micro-lens array (furthest away from the eye of the user), along with the air gap or material spacer in between are surrounded by a material wall and sealed. The sealing can be that of a hermetic seal. (See, e.g., FIGS. 1a and 1b.)

Figure 6A:
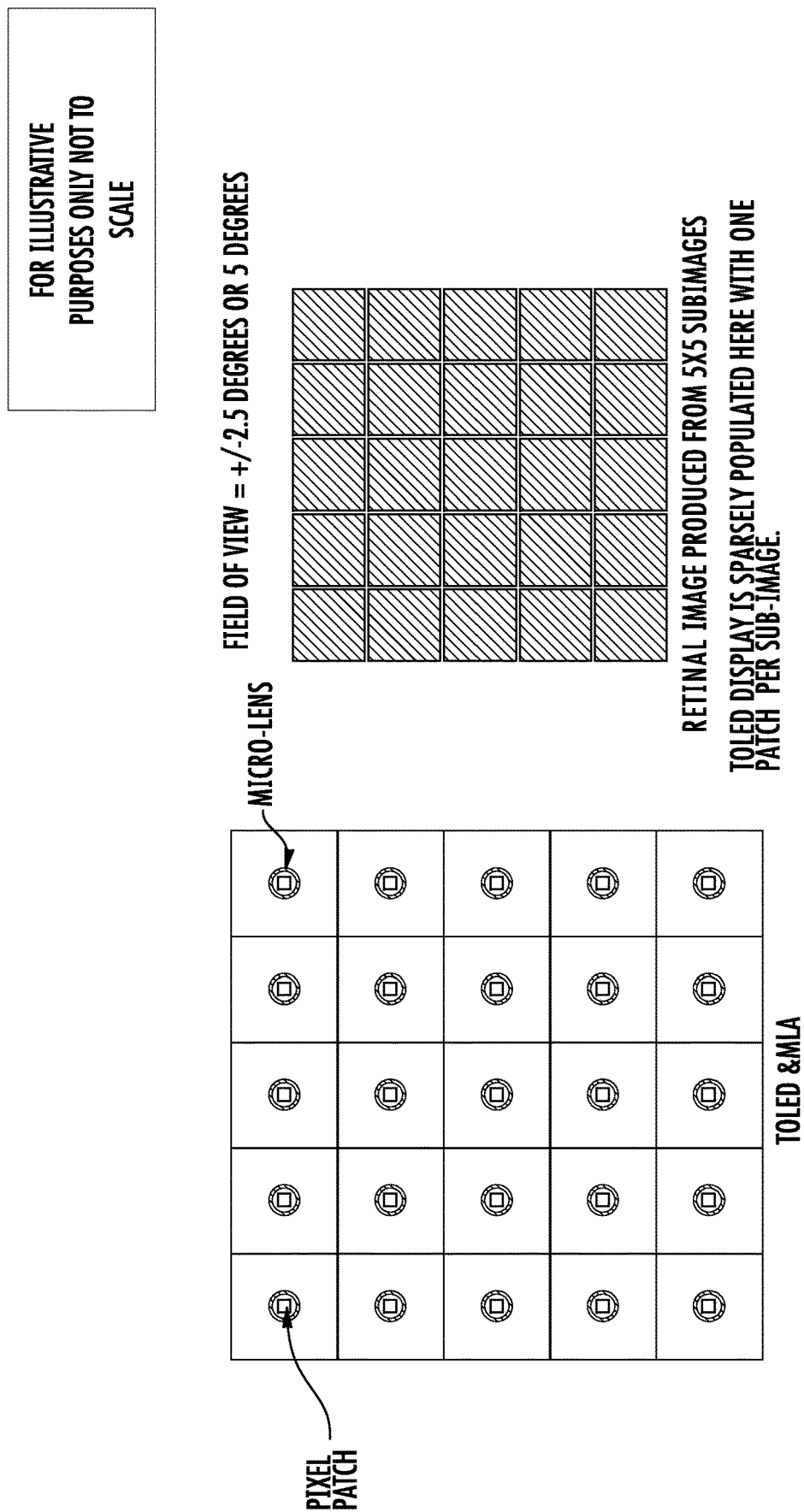
FIG. 6a is a front view diagram of an embodiment of 25 tiles each comprising 1-pixel patch that is aligned with a distant separated micro-lens and shows the retinal image produced therefrom.
Figure 6B:
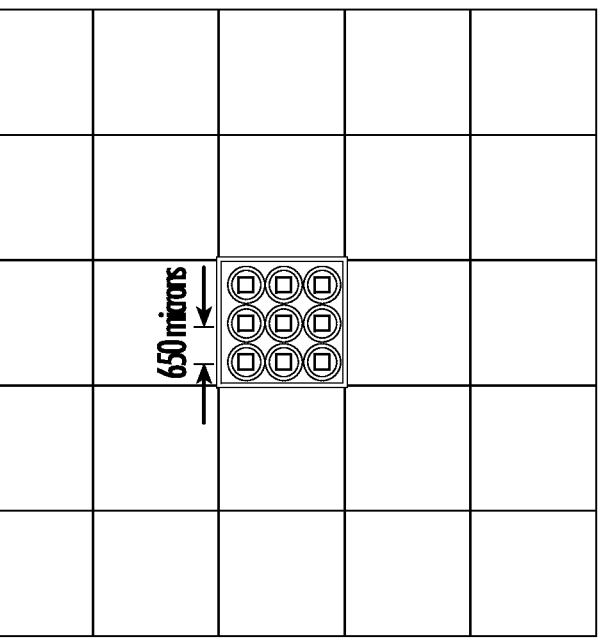
FIG. 6b is a front view diagram of an embodiment of 1 tile having 9-pixel patches each of which are aligned with a distant separated micro-lens providing higher resolution and brightness and shows the retinal image produced therefrom.
Figure 6C:
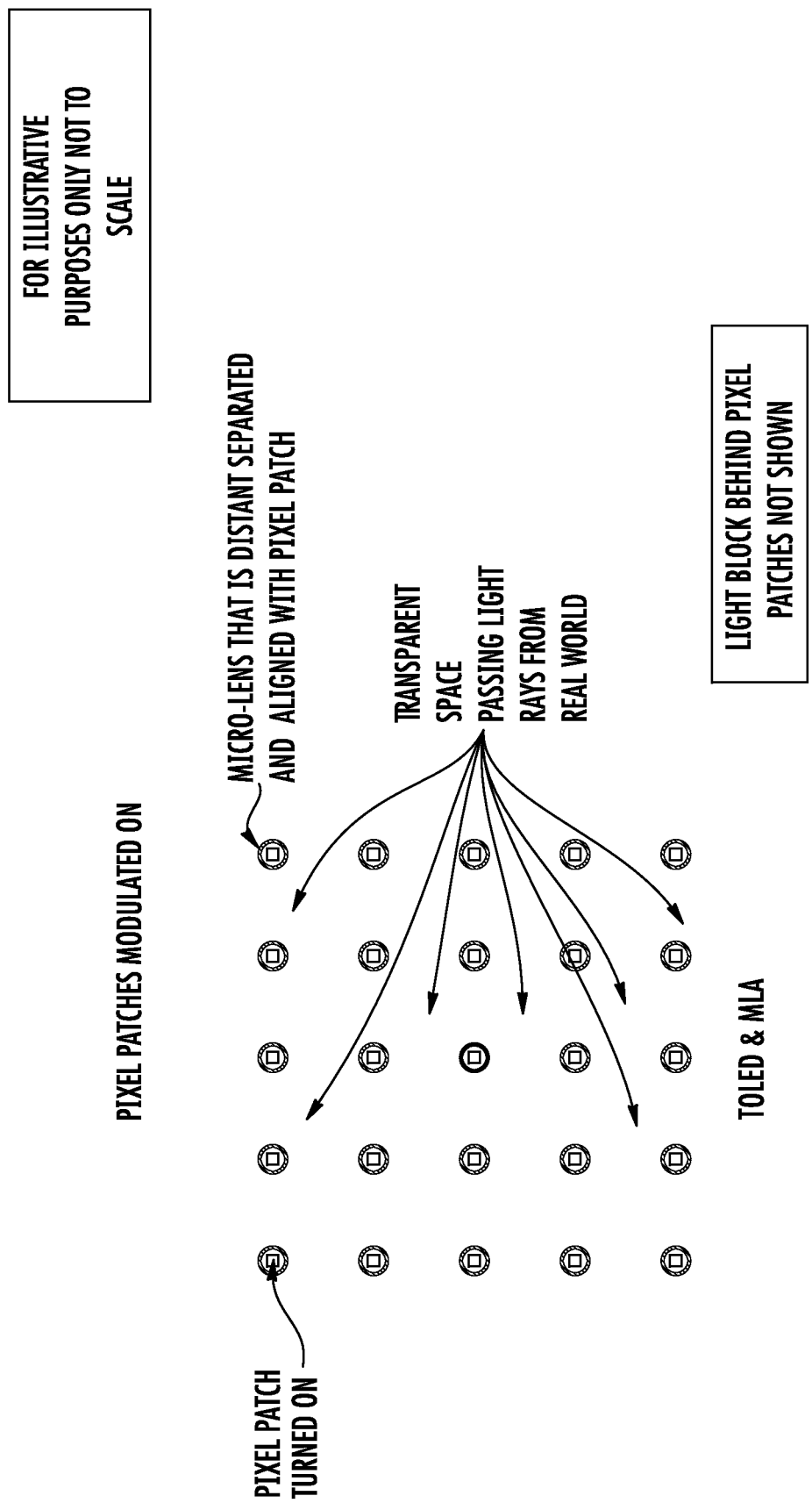
FIG. 6c is a front view diagram of an embodiment of 25 tiles each comprising 1-pixel patch (with light block directly behind) having pixel patch turned "on" each that is aligned with a distant separated micro-lens and shows how light from the real world passes between the pixel patches and between the micro-lenses.

In particular, FIG. 6c shows an embodiment of a mode with active pixel modulation of a virtual image (active pixels "polychrome or monochrome"). This mode shows light rays from the real world creating a real image as seen by the eye of a user and that of a virtual image as seen by the eye of a user generated by light rays from the active pixels passing through the micro-lenses of the micro-lens array. This figure shows a plurality of tiles, opaque members or elements, pixel patches, micro-lenses with one micro-lens being aligned with one-pixel patch (patch of pixels). It also shows one opaque member or element (which in this case is indicated by the box around the micro-lens and pixel patch) in alignment with one micro-lens and one-pixel patch. It is important to note that the opaque member or element shaped as a box could also have the outer perimeter shape of the micro-lens (thus being round or some other shape). Both the virtual image (as seen by the eye of the user) and the real image (as seen by the eye of the user) periodically are seen at the same time, with the real image being seen more that the virtual image, in embodiments. For clarity, the transparent near eye display always is transmitting light rays from the real world that form the real image (as seen by the eye of the user) thru the transparent near eye display, whether modulating with its duty cycle, on or off. However, the same transparent near eye display only generates light that forms the virtual image (as seen by the eye of the user) when the transparent near eye display is modulated with its duty cycle on. The sparsely populated transparent near eye display can be extremely sparse. In this embodiment, the fill factor of active pixels to that of transparent space of the transparent near eye display is 15% or less. This transparent space of the transparent near eye display can pass light rays from outside the module. The diagram with this embodiment shows the OLED pixels turned on. (See, e.g., FIG. 6c.)

Figure 6D:
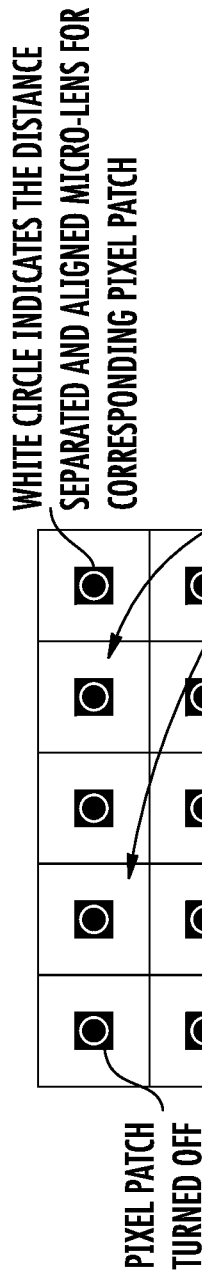
FIG. 6d is a front top view diagram of an embodiment of 25 tiles each comprising 1-pixel patch (with light block directly behind) having pixel patch turned "off" that is aligned with a distant separated micro-lens and shows light from the real world passes between the pixel patches and between the micro-lenses.

FIG. 6d shows an embodiment of a mode with active pixel "off" modulation of a virtual image (active pixels "opaque"). This figure shows a plurality of tiles, opaque members or elements, pixel patches, and micro-lenses with one micro-lens being aligned with one-pixel patch (patch of pixels). It also shows one opaque member or element (which in this case is indicated by the box around the micro-lens and pixel patch) in alignment with one micro-lens and one-pixel patch. The (light block) opaque member or element shaped as a box could also have the outer perimeter shape of the micro-lens (thus being round or some other shape), or by way of example only, have the shape of one of the pixel, pixel patch, or micro-lens to which it is positioned behind. The size of such a light block can be equal to or slightly larger than the size of one of the pixel, pixel patch or micro-lens. This mode further shows light rays from the real world that form a real image as seen by the eye of a user passing around the OLED pixels. The virtual image is not seen by the eye of a user due to the OLED pixels being turned off while light from the real world passes through the transparent areas of the transparent near eye display and between the micro-lenses of the micro-lens array. The figure shows the OLED pixels turned off while the transparent space can pass light rays from outside the module. In this embodiment, whereby the pixel density of the populated transparent near eye display is extremely sparse, the fill factor of active pixels to that of transparent space is 15% or less. In certain other embodiments whereby the pixel density of the populated transparent near eye display is extremely sparse, the sparsely populated transparent near eye display can have an active pixel density of 10% or less of the area of the transparent near eye display, wherein light rays from the real world that form a real image (as seen by the eye of a user) pass through the see through near eye display and light rays that form a virtual image (as seen by the eye of a user) are generated by way of the active pixels of the sparsely populated transparent near eye display. The transparent near eye display is optionally constructed to reduce light from one or more pixel patch(es) emitting away from the eye of the user, as well as in certain embodiments reduce or eliminate real world light rays that can penetrate transparent pixel patches of the transparent near eye display thus then passing through the micro-lens of the micro-lens array.

In certain embodiments, single pixels are in optical communication with individual micro-lenses of a micro-lens array. In certain embodiments, patches of pixels are in optical communication with a single micro-lens. In certain embodiments a single patch of pixels is in optical communication with a single micro-lens of a micro-lens array. In certain embodiments, a patch of pixels is in optical communication with multiple micro-lenses of a micro-lens array. In certain embodiments, multiple patches of pixels are in alignment with a single micro-lens. In certain embodiments, single pixels are aligned with micro-lenses of a micro-lens array. In certain embodiments, multiple patches of pixels are aligned with a single micro-lens. In certain embodiments, a single patch of pixels is aligned optically with multiple micro-lenses of a micro-lens array. In certain embodiments, multiple patches of pixels are aligned with a single micro-lens. In other embodiments one patch of pixels is aligned with one micro-lens.

The micro-lens array can be sparsely populated. By way of example only, in certain embodiments a micro-lens array can have a medium sparseness when the fill factor of micro-lenses to the overall area of the micro-lens array is less than 75% but no less than 50%. The micro-lens array can have sections between the micro-lenses of the micro-lens array where light rays from the real world can pass largely unaltered. By way of example only, in certain embodiments a micro-lens array can have a significant sparseness when the fill factor of micro-lenses to the overall area of the micro-lens array is less than 50% but no less than 25%. By way of example only, in certain embodiments a micro-lens array can have an extreme sparseness when the fill factor of micro-lenses to the overall area of the micro-lens array is less than 25% but greater than 0%. In certain embodiments a sparsely populated transparent near eye display can comprise a plurality of pixels. In certain embodiments, a sparsely populated transparent near eye display can comprise a plurality of patches of pixels. In certain embodiments the sparsely populated transparent near eye display can have a fill factor of pixel patches of 50% but no less than 25% thus being of significant sparseness. In certain embodiments the sparsely populated transparent near eye display can have a fill factor of pixel patches of less than 25% but greater than 0% thus being of extreme sparseness. In certain embodiments the sparsely populated transparent near eye display can have a fill factor of pixel patches of 10% or less. In certain embodiments the sparsely populated transparent near eye display can have a fill factor of pixel patches of 5% or less. The area not filled with pixel patches can be transparent. The area not filled with pixel patches can be semi-transparent. The area not filled with pixel patches can be translucent. A pixel patch can be located within the range of 3 microns to 1,000 microns to the next closest pixel patch. A pixel patch can be within the range of 15 microns to 500 microns to the next closest pixel patch. The area not filled with pixels can be transparent. The area not filled with pixels can be semi-transparent. The area not filled with pixels can be translucent. The area of the micro-lens array not filled with micro-lenses can allow light from the real world to pass through largely unaltered and be focused by the eye of the wearer/user. The transparent near eye display can be a TOLED display. The transparent near eye display can be an OLED display The near eye display can be a micro-OLED display. The transparent near eye display can be a micro-iLED display. The transparent near eye display can be comprised of TOLEDs. The transparent near eye display can be comprised of OLEDs. The transparent near eye display can be comprised of iLEDS (microLEDs). The transparent near eye display can have a transparent electrode section. The near eye display can have a translucent electrode section. The near eye display can have transparent or translucent sections between patches of pixels. The near eye display can have transparent or translucent sections between pixels. The near eye display can have transparent or translucent sections between pixels being opaque on the side away from the eye of the wearer. The near eye display can have transparent or translucent sections between pixels being opaque on the side away from the eye of the wearer. The pixels can be transparent or translucent but have an opaque member or element (light block) that reduces light being emitted away from the eye of the wearer. The pixels can be transparent or translucent but have an opaque member or element (light block) that blocks light being emitted away from the eye of the wearer (see, e.g., FIG. 8).

The pixels can be transparent or translucent but have an opaque member or element that blocks inward light coming from the real world from passing through the micro-lens that is in alignment with the associated pixel or pixels. A pixel patch is comprised of a plurality of pixels. The pixel patch can be transparent, semi-transparent or translucent. The individual pixels can have an opaque member or element (light block) on the side opposite of each pixel that is furthest from the eye of the user that blocks light rays going away from the eye of the user and blocks light rays coming from the real world from passing through a micro-lens or micro-lenses that is in alignment with the associated pixel patch. One light block is distant separated from the adjacent light block, thus creating an amount of transparency within a pixel patch. In addition, a pixel patch is distance separated from an adjacent pixel patch thus creating an additional amount of transparency. In certain embodiments a plurality of light blocks are located behind (furthest from the eye of the user) each of a plurality of pixels of a pixel patch, or behind each of a plurality of pixel patches. In other embodiments a plurality of light blocks are located behind (furthest from the eye of the user) each of a plurality of pixel patches.

In embodiments that have light blocks each located behind individual pixels of a pixel patch, the pixel patch is transparent or semi-transparent as the pixels are distance separated from one another and likewise the plurality of light blocks. In this embodiment light from the real world can be seen between the pixels and in addition between the pixel patches. In embodiment when a single light block is located behind a single pixel patch the pixel patch is opaque and transparency for the transparent near eye display is accomplished by seeing light from the real world between adjacent pixel patches or adjacent light blocks.

Figure 14:
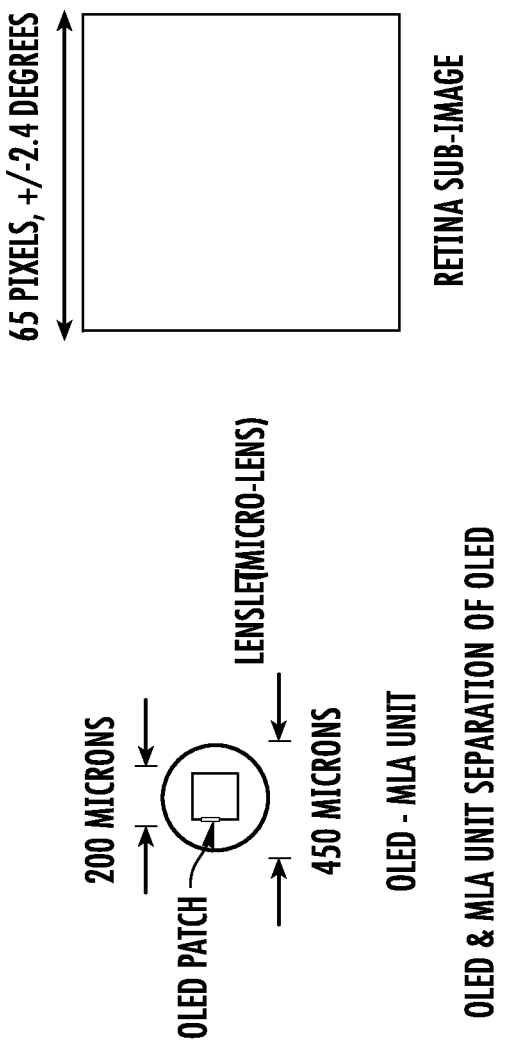
FIG. 14 is a diagram of an embodiment of a single pixel patch having 65 pixels having specified dimensions aligned with a 2.5 mm distant separated micro-lens having specified dimensions and the resultant sub-image if 65 of such pixels were utilized.
Figure 15A:
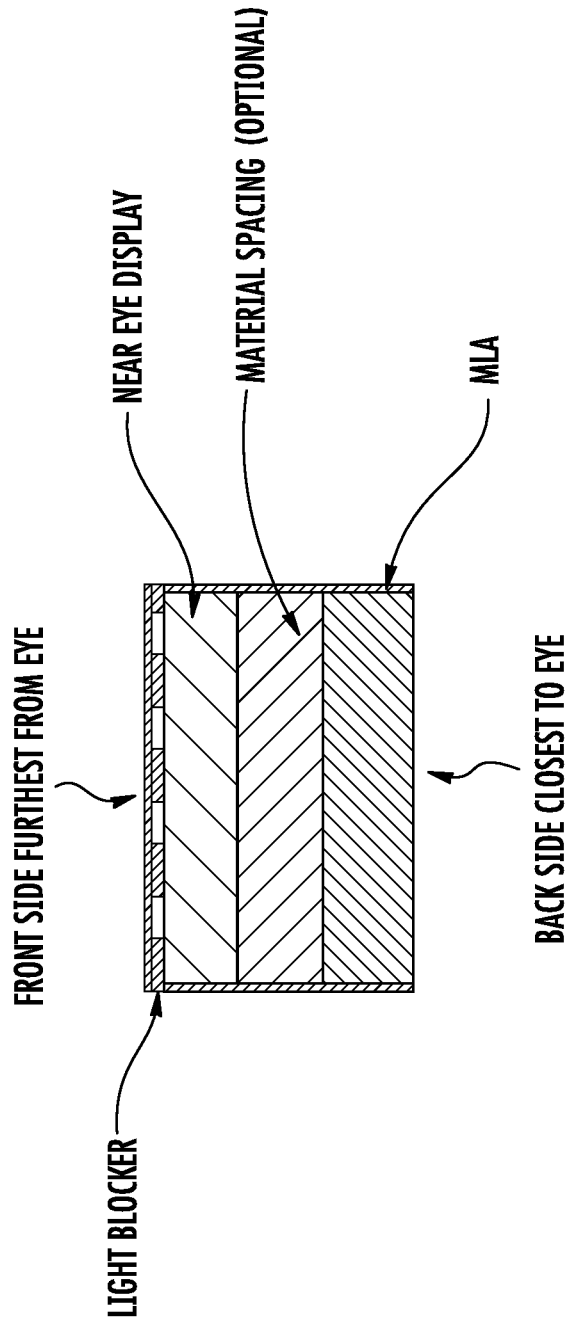
FIG. 15a is a side view diagram of an embodiment of a sealed transparent near eye optical module comprising certain elements.
Figure 15B:
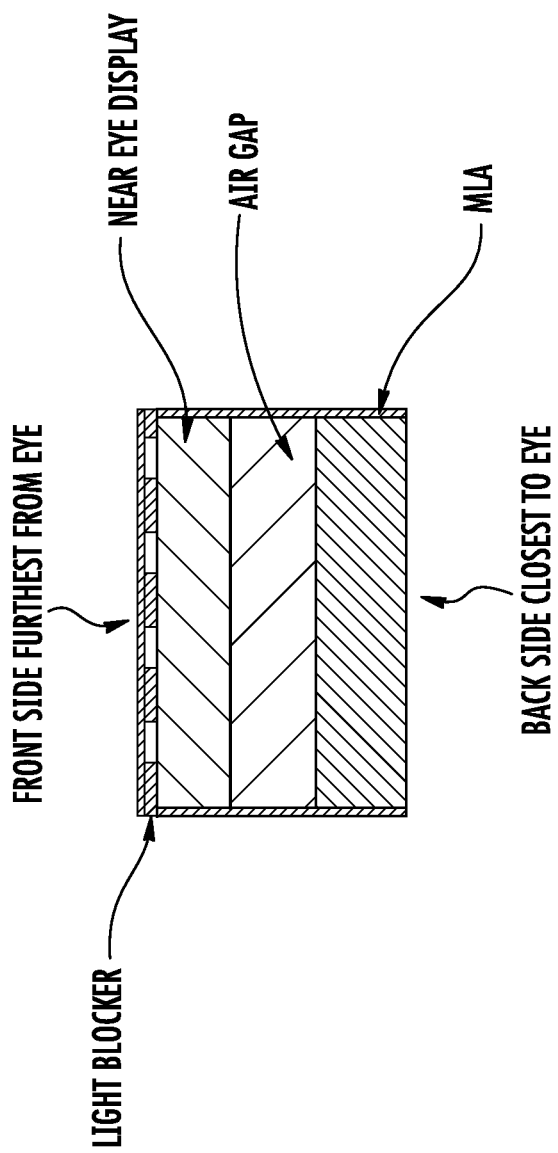
FIG. 15b is a side view diagram of an embodiment of a sealed transparent near eye optical module comprising certain elements.
Figure 15C:
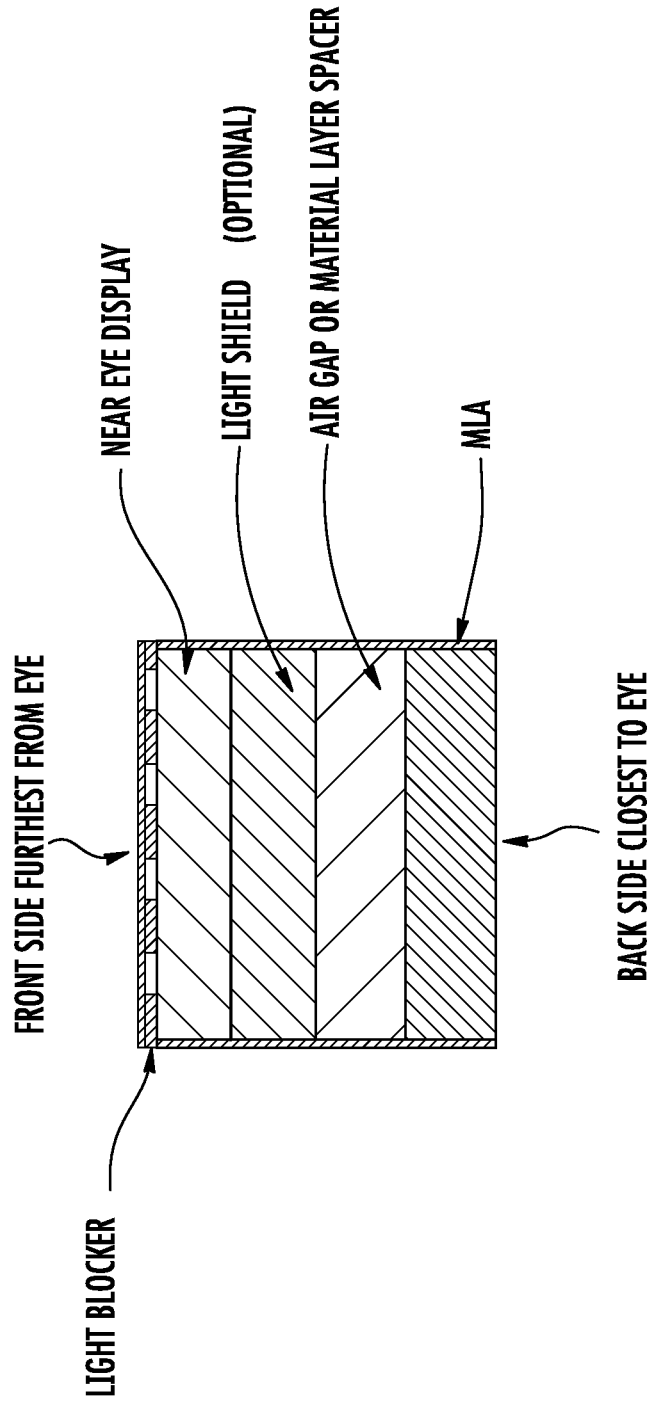
FIG. 15c is a side view diagram of an embodiment of a sealed transparent near eye optical module comprising certain elements.
Figure 15D:
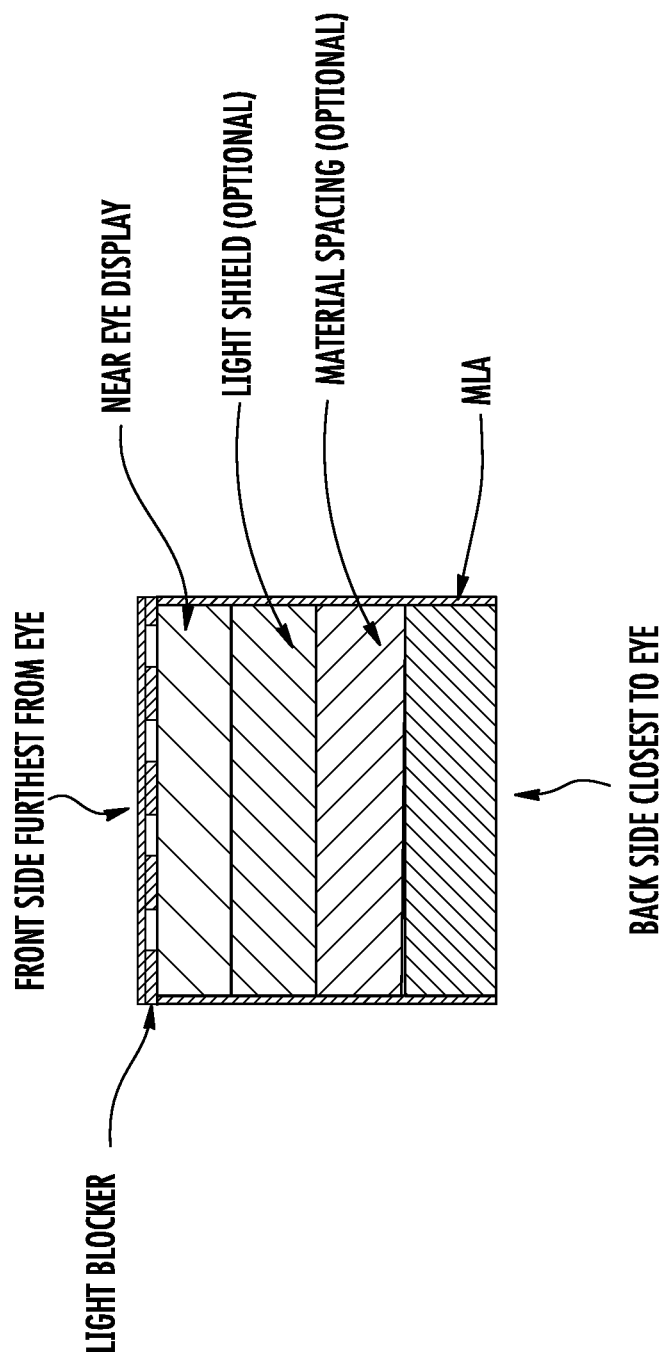
FIG. 15d is a side view diagram of an embodiment of a sealed transparent near eye optical module comprising certain elements.
Figure 15F:
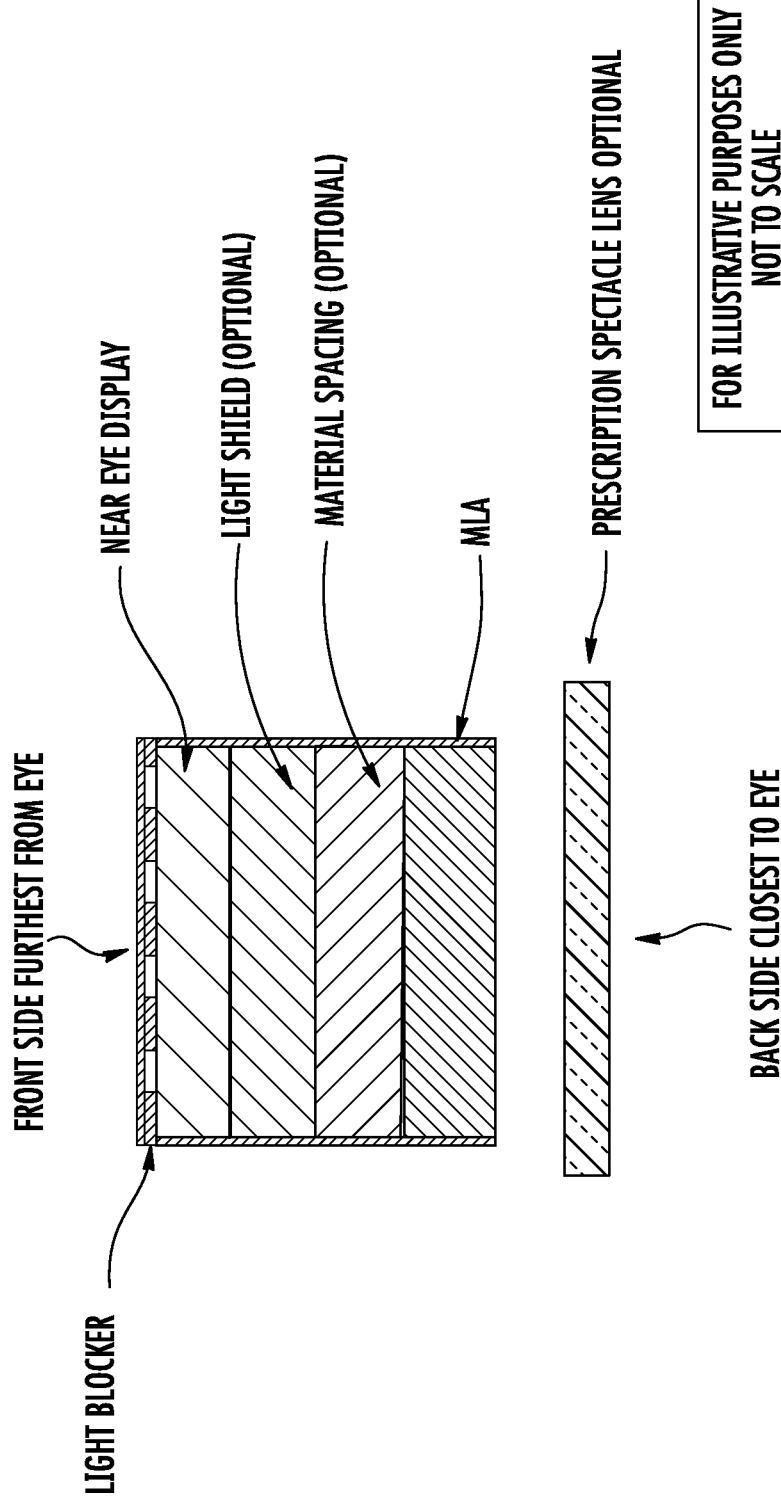
FIG. 15f is a side view diagram of an embodiment of a sealed transparent near eye optical module comprising certain elements.

In other embodiments, a patch comprising a plurality of pixels can be aligned with one or more micro-lenses or a micro-lens array. (See, e.g., FIGS. 2a, 2b, 2c, 7a, 7b, and 7c.) In particular, FIG. 14 shows an embodiment of an alignment of a single lenslet component of a micro-lens array surrounding an OLED patch (left side) (i.e. OLED-MLA unit) which produces a corresponding retinal sub-image (right side). Exemplary dimensions of the OLED patch, by way of example only, (200 microns/side) and lenslet (micro-lens) 450 microns in diameter are shown. In this embodiment, each OLED patch is aligned with a micro-lens whereby the separation there between is 2.5 mm. Exemplary dimensions of the corresponding retinal image, by way of example only, are 64 pixels, +/−2.5 degrees or 65 pixels, +/−2.4 degrees, which covers or mostly covers the fovea of the eye of the user and are shown on the right of the figure. FIG. 6a shows an embodiment of a plurality of TOLED-MLA units in, by way of example only, a 5×5 layout (left side) which produces a full retinal image (right side). In particular, FIG. 6a shows alignment of pixel patches relative to a plurality of distance separated individual micro-lenses (lenslets) of the MLA. These micro-lenses are separated from each other and also as indicated aligned and distance separated from their corresponding pixel patch. FIG. 6a shows a sparsely populated near eye display aligned with a sparsely populated micro-lens array while being distance separated from each other. In this embodiment, the fill factor of active pixels to that of transparent space is less than 50%, thereby facilitating transparency. On the right side of the figure, the retinal image produced from, by way of example only, 5×5 retinal sub-images is shown. As the TOLED display is sparsely populated, one pixel patch produces each retinal sub-image. The overall retinal image shown corresponds to a field of view of +/−2.5 degrees (or 5 degrees). FIG. 6b shows that the OLED and MLA units can be more densely populated, (by way of example only, 650 microns between each pixel patch center) whereby there is a group of 9 pixel patches within a tile that produces one retinal sub-image with such a grouping resulting in increased brightness of the sub-image.

Figure 7A:
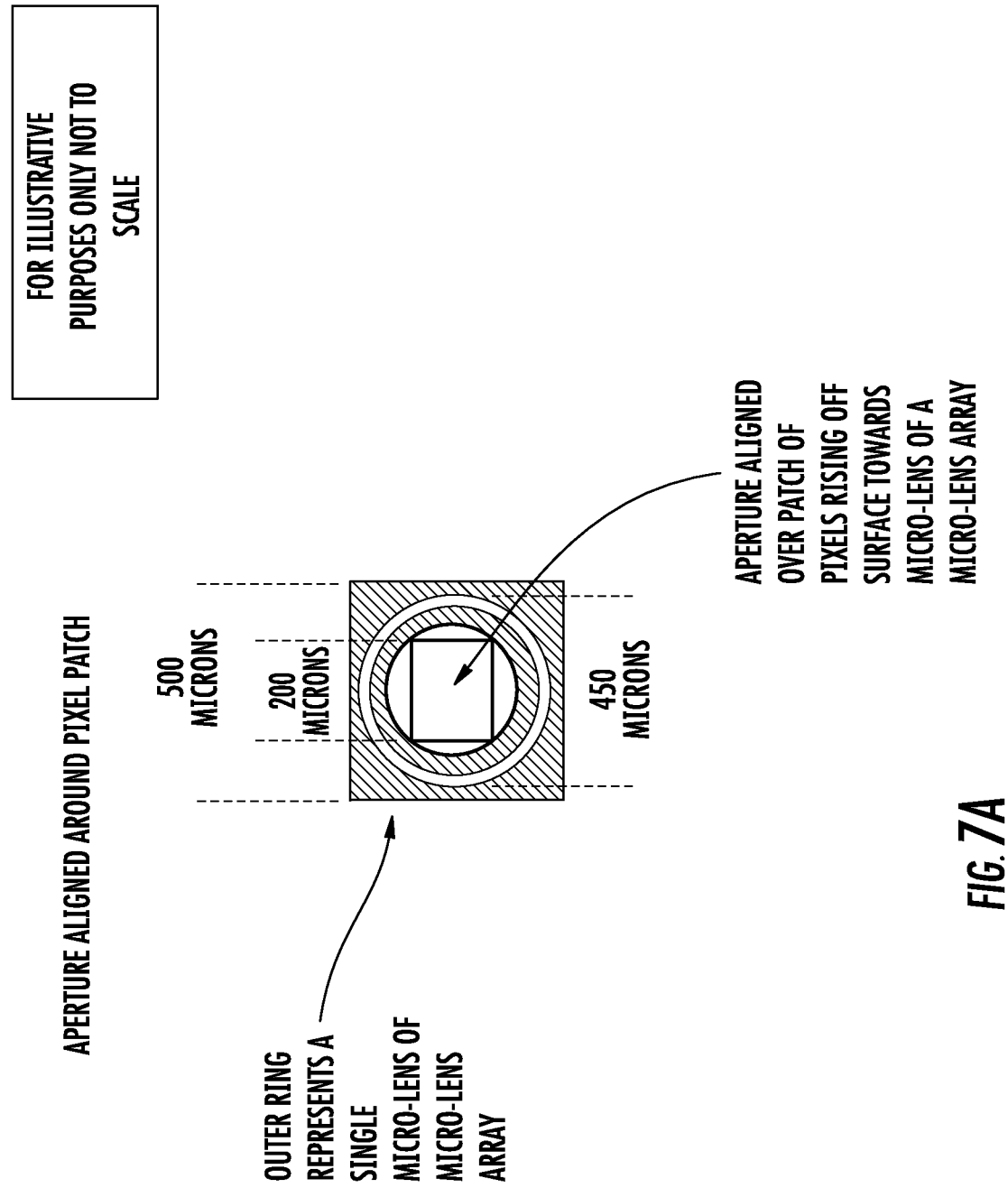
FIG. 7a is a front view diagram of an embodiment of a light shield aperture surrounding a pixel patch that is aligned with a micro-lens of a micro-lens array.
Figure 7B:
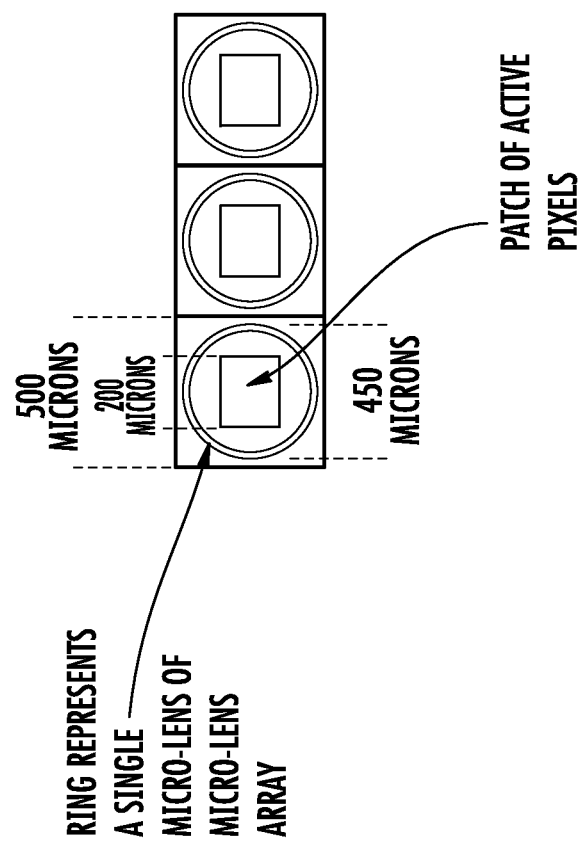
FIG. 7b is a front view diagram of an embodiment having three-pixel patches each aligned with a micro-lens showing transparent area around and between the pixels.

FIGS. 7a and 7b show a pixel patch distance separated and aligned with a micro-lens and in addition having an aperture that surrounds the pixel patch there in between. The aperture structure is located around the pixel patch and rises from the surface of the display towards that of the distance separated and aligned micro-lens. The aperture can be that of, by example only, a raised open ring that approximates the outer diameter of an aligned micro-lens, a raised open ring that is slightly larger than the outer diameter of an aligned micro-lens, or an open cylinder. The raised ring can be transparent and have an optical power that redirects unwanted light rays so as not to penetrate a micro-lens of the micro-lens array. The raised ring can be translucent and have an optical power that redirects unwanted light rays so as not to penetrate a micro-lens of the micro-lens array. The raised ring can be opaque and have an optical power that redirects unwanted light rays so as not to penetrate a micro-lens of the micro-lens array. The inside walls of the open aperture can be opaque. The inside walls of the open aperture can be of an optical design that extinguishes light rays that attempt to penetrate it. In certain embodiments the aperture has a thickness in the z axis that fills the space or gap between the near eye display and the micro-lens array while being limited along the x and y axis to the area around the pixel patch. In certain embodiments the aperture is an open aperture that allows light from the pixel patch to enter and travel through the aligned micro-lens. In certain embodiments the aperture is an open aperture that allows light from multiple pixels to enter and travel through the aligned micro-lens. In certain embodiments the aperture is an open aperture that allows light from a pixel to enter and travel through the aligned micro-lens. The outer perimeter of the floor around the aperture can be of any shape; by way of example only, round, oval, square, or rectangular.

Figure 7C:
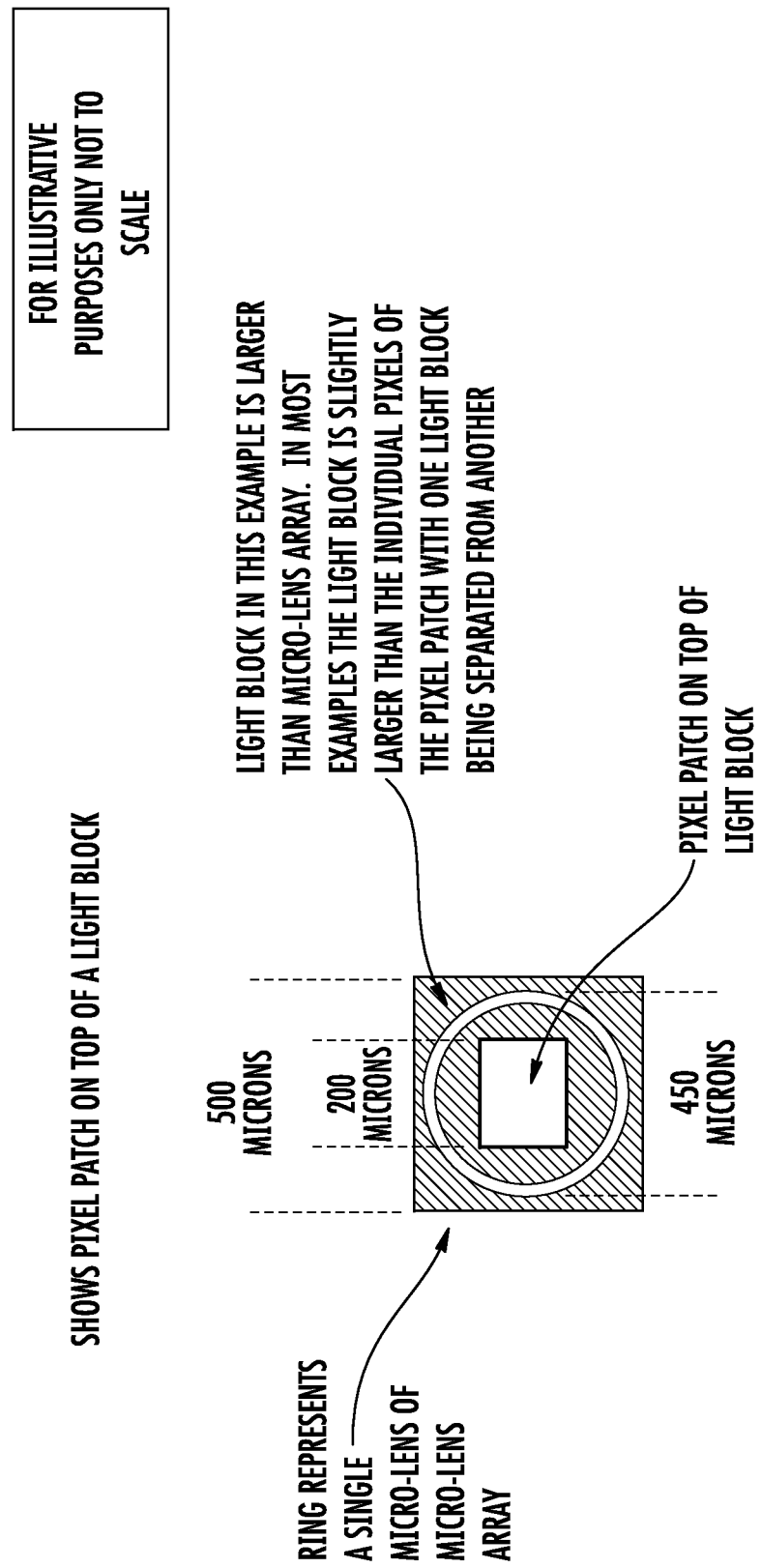
FIG. 7c is a front view diagram of an embodiment of a single pixel patch on top of a light block aligned with a distant separated micro-lens.

FIGS. 6c and 6d show an embodiment for modulating a virtual image with a patch of active pixels providing color or monochrome, with the ring representing a single lens of the micro-lens array aligned with the single patch of active pixels centered and formed on a tile. While most illustrations for the sake of simplicity and clarity show a single patch of pixels per tile, in certain embodiments there are multiple patches of pixels per tile such that each patch of pixels is aligned with one micro-lens of a micro-lens array. FIG. 7c shows a single pixel patch aligned with a single micro-lens whereby there is an opaque backing behind and around the pixel patch in the form of square.

FIG. 6c shows a sparsely populated transparent near eye display that is aligned, and distance separated with a sparsely populated micro-lens array (not shown). The pixel fill factor of the sparsely populated transparent near eye display is, by way of example only, less than 5%. The micro-lens fill factor of the aligned micro-lens array is, for example only, less than 50%. FIG. 6c illustrates the duty cycle of the sparsely populated transparent near eye display being on. When the duty cycle of the transparent near eye display is on there is a plurality of pixel patches active and aligned with a plurality of distance separated micro-lenses of the sparsely populated micro-lens array. The box around the base of each patch of pixels indicates the opaque backing that blocks or reduces light from the real world from traveling through the pixel patch and further blocks or reduces light from the pixel patch being projected outward away from the eye of the user. While FIG. 6c shows the pixel patches active and transmitting light to form the virtual image to the eye of the user, it also shows light from the real world passing through the transparent space between the pixel patches and also between the micro-lenses of the micro-lens array thus forming a real image as seen by the eye of the user. FIG. 6d illustrates the duty cycle of the sparsely populated transparent near eye display being off. When the duty cycle of the transparent near eye display is off the plurality of pixel patches are off, but they remain aligned with a plurality of distance separated micro-lenses of the sparsely populated micro-lens array. (See also FIGS. 3a, 3b.) The box around the base of each patch of pixels indicates the opaque backing that blocks or reduces light from the real world from traveling through the pixel patch and further blocks or reduces light from the pixel patch being projected outward away from the eye of the user when the pixels are active. FIG. 6d shows the pixel patches not active and thus not transmitting light to form the virtual image to the eye of the user, however, it further shows light from the real world passing through the transparent space between the non-active pixel patches and also between the micro-lenses of the micro-lens array thus forming a real image as seen by the eye of the user. FIG. 6d shows only the opaque backing (member or element) that is located behind that of the pixel patch. The opaque backing (member or element) blocks or reduces light from passing through the pixel patch or pixels and passing through the micro-lens of the micro-lens array. Furthermore, the opaque backing (member element) blocks or reduces light from being projected outward away from the eye of the user. It should be pointed out the opaque backing can be of any shape. The opaque backing (member or element) can be in the shape of a circle, oval, square, rectangle, or triangle.

Figure 2B:
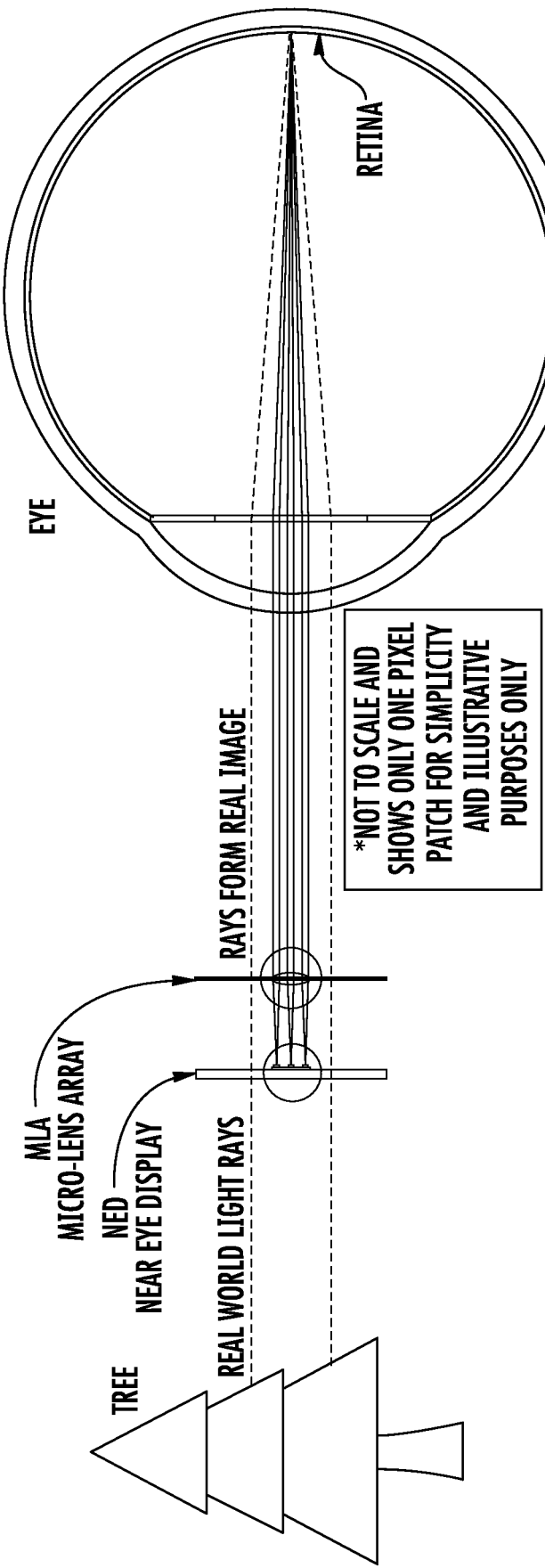
FIG. 2b is a schematic diagram showing a side view of how the populated transparent near eye module works when not used with an eyewear lens having optical power according to another embodiment.
Figure 2C:
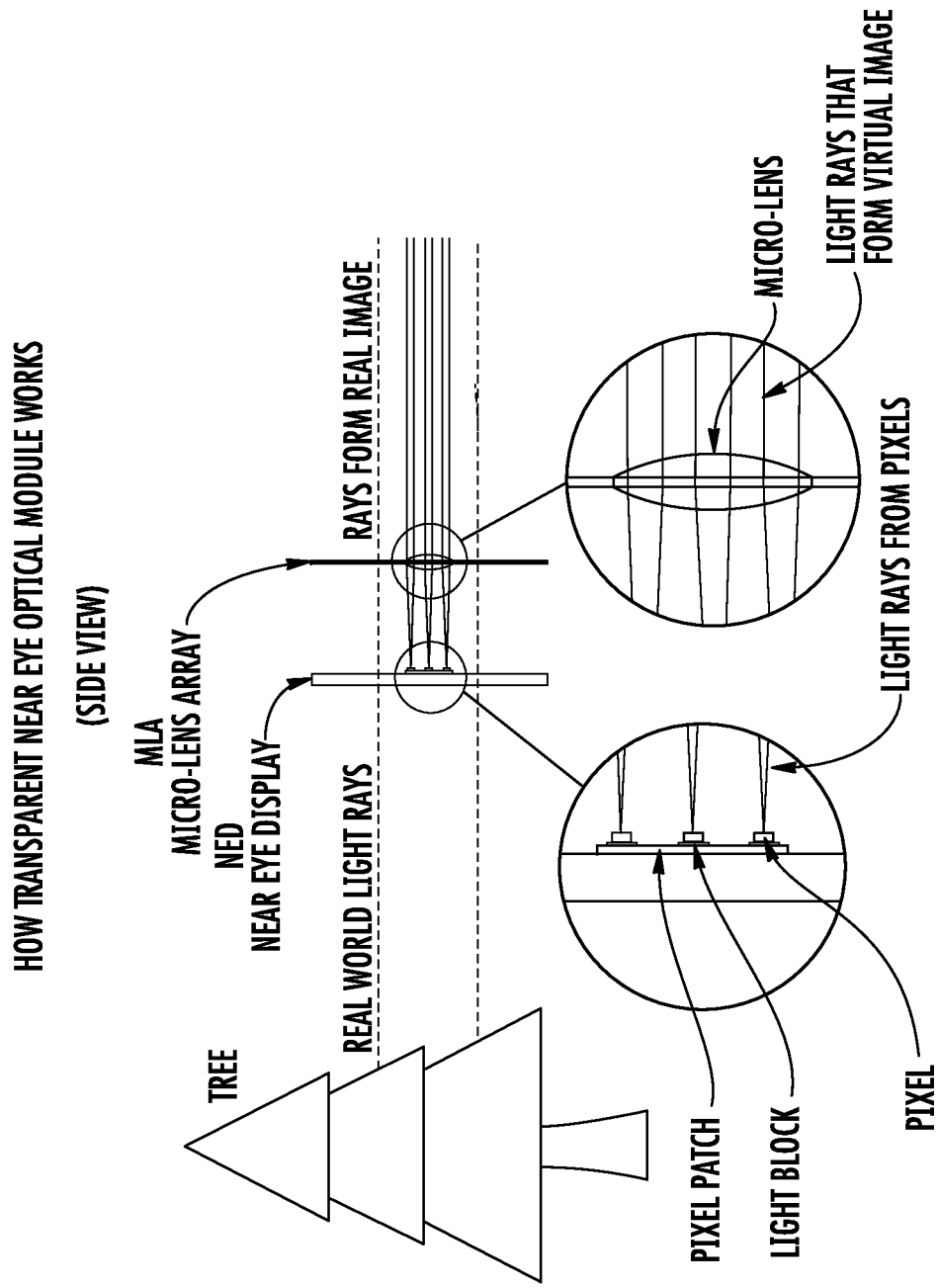
FIG. 2c is a schematic diagram showing a side view of a transparent near eye module showing how the sparsely populated transparent near eye display and the sparsely populated micro-lens array form a virtual image and pass light from the real world that forms a real image according to another embodiment.

As show in FIGS. 2a, 2b, and 2c, light forming the real image is seen 100% of the time when looking through the transparent near eye optical module. However, in certain embodiments the virtual image can be modulated to that of the always appearing real image at a time sequence that permits the modulation to appear seamless to the user. This can be done by modulating the transparent near eye display on and off.

The following represents various "example types" of modulation of the near eye display optical module:

a. Utilize a sparsely populated transparent near eye display (such as by example only, a TOLED) and a fully populated and aligned MLA such that the MLA is switched on and off electronically using electronic switchable optics and the near eye display is modulated by its on/off duty cycle. When the MLA is switched off electronically the real image is seen by the eye of the wearer with increased fidelity.

b. Utilize a sparsely populated transparent near eye display (such as by example only, a TOLED) and a sparsely populated and aligned MLA such that the MLA is switched on and off electronically using electronic switchable optics and the near eye display is modulated by its on/off duty cycle. When the MLA is switched off electronically the real image is seen by the eye of the wearer with increased fidelity.

c. Utilize a fully populated transparent near eye display (such as by example only, a TOLED) and a sparsely populated and aligned MLA such that the MLA is switched on and off electronically using electronic switchable optics and the near eye display is modulated by its on/off duty cycle. When the MLA is switched off electronically and the near eye display is modulated off at the same time, the real image is seen by the eye of the wearer with increased fidelity. When the MLA is switched on electronically and the near eye display is modulated on at the same time, the virtual image is seen by the eye of the wearer.
d. Utilize a sparsely populated transparent near eye display (such as by example only, a TOLED) and a sparsely populated and aligned MLA such that the MLA is switched on and off electronically using electronic switchable optics and the near eye display is modulated by its on/off duty cycle. When the MLA is switched off electronically and the near eye display is modulated off at the same time the real image is seen by the eye of the wearer with increased fidelity. When the MLA is switched on electronically and the near eye display is modulated on at the same time the virtual image is seen by the eye of the wearer.
e. Utilize a sparsely populated transparent near eye display (such as by example only, a TOLED) and a fully populated and aligned MLA such that the MLA is switched on and off electronically using electronic switchable optics and the near eye display is modulated by its on/off duty cycle. When the MLA is switched off electronically and the near eye display is modulated off at the same time the real image is seen by the eye of the wearer with increased fidelity. When the MLA is switched on electronically and the near eye display is modulated on at the same time the virtual image is seen by the eye of the wearer.
f. Utilize a sparsely populated transparent near eye display (such as by example only, an OLED or micro-LED display) and a sparsely populated and aligned MLA.
g. Utilize a sparsely populated transparent near eye display (such as by example only, an TOLED display) and a sparsely populated and aligned MLA.

The shortest time that a retinal image will register a neuronal response is 13 milliseconds. This means that the refresh of the transparent near eye display can be at a maximum rate of 77 Hertz. The retinal image should not persist more than 40 milliseconds for it to blend smoothly into the next picture. Therefore, the temporal modulation or the range of the duration of the virtual image is 13-40 milliseconds, or 25 Hertz-77 Hertz if the virtual image is modulated. The same range applies to the real image if the real image is modulated. The duty cycle controls the brightness of the real and the virtual images and must add up to 100%, in aspects. If both the real image and virtual image are being modulated then a suitable range could be 5%-25% for the virtual image and a range of 5%-75% for the real image, depending on the level of ambient illumination, and therefore, 25%-95% for the virtual image. However, in embodiments where the virtual image is being modulated and the real image is seen constantly, the virtual image should have a duty cycle of 50% of less of the time; in other embodiments 40% or less of the time. In still other embodiments 30% or less of the time. In certain embodiments 20% or less of the time. And still in other embodiments 10% or less of the time. Such an embodiment can be used, by way of example only when viewing AR/MR to enhance the real image.

This modulation can also occur in the same manner by way of turning on and off any one or more of pixels, patches of pixels, or tiles of pixel patches or for that matter the near eye display. The modulation can be such that the virtual image is seen 50% or more, 40% or more, 30% or more, 20% or more, or 10% or more, or 5% or more of the time by the eye of the wearer. Given the fact that the near eye display and the micro-lens array are both sparsely populated in most embodiments, but not all, light from the real world forming the real image is seen 100% of the time. Embodiments whereby the real image is not seen 100% of the time, are by way of example only, when a liquid crystal shutter is utilized to block light rays from the real world from being passed, or a fully populated electronic switchable micro-lens array is utilized. When light from the real world is not seen 100% of the time light forming the real image is modulated with light forming the near eye display in such a manner to permit the eye of the user to perceive a constant virtual image combined with a real image, thus perceiving augmented reality or mixed reality.

In certain embodiments the micro-lens array is modulated and the electronic near eye display is not modulated (other than normal refresh rate of electronic display). In other embodiments the electronic near eye display is modulated and the micro-lens array is not modulated. In still other embodiments both the micro-lens array and the electronic near eye display are modulated. And in still other embodiments neither the micro-lens array nor the electronic near eye display are modulated. When this occurs (no modulation of the virtual image or the real image) augmented reality/mixed reality is achieved by the eye and brain combining the virtual image with that of the real image. When stating that the electronic near eye display is modulated, the meaning of modulation as used herein is different than the standard refresh rate of the electronic near eye display. While the meaning is different the rate of modulation with that of the standard refresh rate could be the same.

In still another embodiment, the modulation of the virtual image takes place by turning a plurality of patches or tiles of pixel patches on, either in color or that of monochrome color (see, e.g., FIG. 6c) that are aligned with a plurality of micro-lenses of the MLA and then switching these patches or tiles of pixel patches off (see FIG. 6d). In this embodiment, when the virtual image shows to the eye of a user, the real image also is present. When the virtual image does not show to the eye of a user, only the real image shows.

The transparent near eye optical module can be that of a photonic optical module. The transparent near eye optical module can be attached to an eyewear frame by way of a track. The transparent near eye optical module can be attached to one or more of the eyewear frames' front, bridge, and/or temple (see, e.g., FIGS. 9, 10, and 11). A ridge of a temple, bridge or frame front can be a track. The transparent near eye optical module can be embedded or attached to or in the front surface of an eyeglass lens (see, e.g., FIGS. 3H and 3I). The transparent near eye display optical module can be attached to the eyewear frame's eyeglass rim and inserted in the eyeglass lens (see, e.g., FIGS. 5a, 5b, and 5c). The sparsely populated transparent near eye display can be comprised of a TOLED. The transparent near eye display can be comprised of a see-through micro-iLED display. The transparent near eye display can be comprised of a see-through micro-LED display. The see-through near eye display can be comprised of any emitting light source wherein the real image can be seen when looking through the near eye display. The see-through near eye display can be sparsely populated. The sparsely populated transparent near eye display can comprise a plurality of distance-separated patches of pixels. The sparsely populated transparent near eye display can comprise a plurality of tiles of pixel patches. The sparsely populated transparent near eye display can comprise a plurality of distance-separated patches of pixels and wherein the distance between the patches of pixels is within the range of 150 microns to 750 microns. The pixels located within the pixel patches can have a size within the range of 1.5 microns-10 microns. The pixel size can be more preferably within the range of 1.5 microns to 5 microns. A pixel can be aligned with a micro-lens. A pixel patch can be aligned with a micro-lens. A plurality of pixels can be aligned with a micro-lens.

A micro-lens can have a size within the range of 25 microns-750 microns. A plurality of micro-lenses can be part of a micro-lens array. The micro-lens array can be a sparsely populated micro-lens array. A micro-lens can be the same size as that of a pixel patch. A micro-lens can be larger than a pixel patch. By way of example only, a pixel patch of 150 microns×150 microns can be in optical communication and aligned with a micro-lens (lenslet) that is 450 microns in diameter. Thus, by way of example only, a micro-lens can be 1.5×-5× the size of a pixel patch. By having the micro-lens larger than the pixel patch that it is in alignment with, diffraction is reduced. With embodiments of the transparent near eye optical module that comprise a static micro-lens array, it is preferable to have the micro-lens of the micro-lens array larger than that of the pixel patch to which the micro-lens is aligned with. (See, e.g., FIGS. 12, 13, and 14.) However, in order to allow for the real-world light rays to pass between the micro-lenses of the sparsely populated micro-lens array, the size of the micro-lens should be sized to be larger than the aligned pixel patch but not so large as to interfere with the real-world light rays. With embodiments of the transparent near eye display optical module that comprise a dynamic switchable (on/off) micro-lens the overall size of the micro-lens can be larger.

Figure 33:
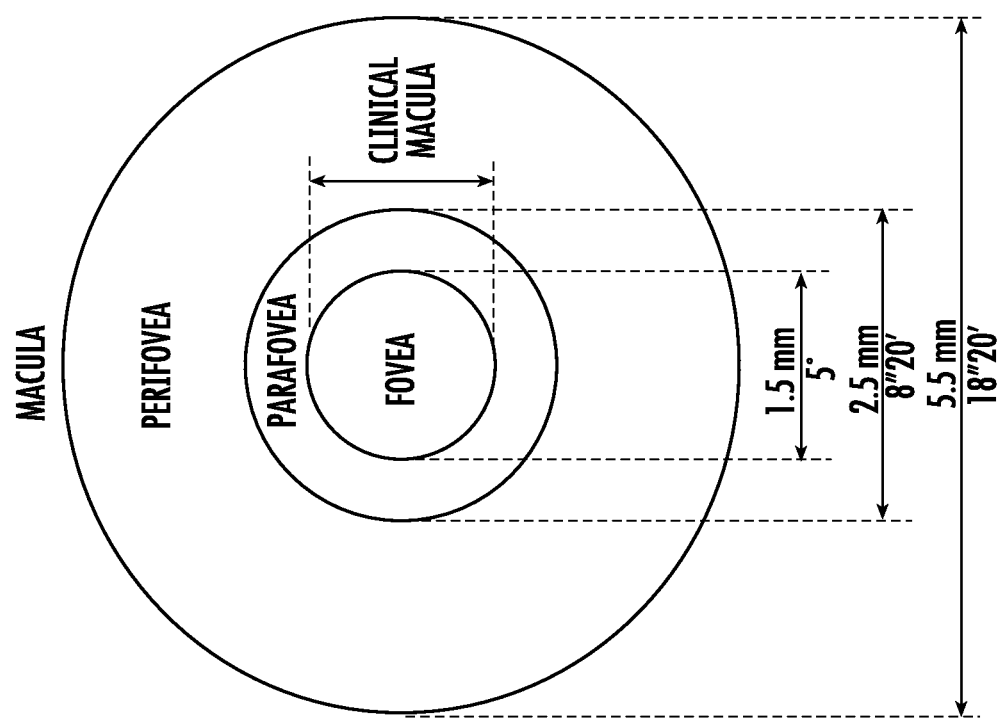
FIG. 33 is an illustration showing dimensions of the macula, perifovea, parafovea, and fovea areas of the human retina.

In FIG. 33, the fovea has an angular dimension of 5 degrees (+/−2.5 degrees), and is used for fixation. It is capable of highest resolution and is required for visual tasks that require the finest resolution. Visual perception extends over a much larger area, the macula that has an angular dimension of 20 degrees (+/−10 degrees), even though image resolution drops sharply as the distance from the fovea increases.

In FIGS. 33 and 34, structure and dimensions of the fovea and the macula are shown. The fovea is responsible for sharp central vision (also called foveal vision), which is necessary in humans for activities where visual detail is of primary importance, such as reading and driving. The fovea is surrounded by the parafovea belt, and the perifovea outer region. The parafovea is the intermediate belt, where the ganglion cell layer is composed of more than five rows of cells, as well as the highest density of cones; the perifovea is the outermost region where the ganglion cell layer contains two to four rows of cells and is where visual acuity is below the optimum. The perifovea contains an even more diminished density of cones, having 12 per 100 microns versus 50 per 100 microns in the most central fovea. This, in turn, is surrounded by a larger peripheral area that delivers highly compressed information of low resolution following the pattern of compression in foveal imaging.

Therefore, the largest size of the virtual image that the eye can see is about +/−10 degrees, if it is allowed to completely occupy central as well as peripheral vision. For most applications an angular width of +/−5 degrees is sufficient for the virtual image, with the real image occupying the rest of the macula. A virtual image greater than +/−5 degrees in width will induce eye movement, since the eye will seek to fixate at various parts of the virtual image In FIG. 34, cone density as a function of angular separation from the fovola is shown.

| Distance from eye | Pixel density Required to Achieve a specific Retinal Image Resolution (VA) | | | |
| --- | --- | --- | --- | --- |
| Feet | 20/10.5 | 20/20 | 20/40 | 20/60 |
| 25 mm | 6550 Pixels/cm | 3300 Pixels/cm | 1650 Pixels/cm | 1100 Pixels/cm |
|  | (1.5 micron Pixels) | (3.0 micron Pixels) | (6.0 micron Pixels) | (9.0 Micron Pixels) |
| 10 inches | 655 Pixels/cm | 330 Pixels/cm | 165 Pixels/cm | 110 Pixels/cm |
| 2 Feet | 273 Pixels/cm | 138 Pixels/cm | 69 Pixels/cm | 46 Pixels/cm |
| 5.69 feet | 96 Pixels/cm | 50 Pixels/cm | 25 Pixels/cm | 16.5 Pixels/cm |
| 20 feet | 25 Pixels/cm | 13 Pixels/cm | 6.5 Pixels/cm | 4.3 Pixels/cm |

Table 1 above shows the pixel size required for displays at various distances from the eye in order to achieve specified levels of retinal image quality. For a near eye display at 25 mm from the eye, a minimum pixel size of 60-90 microns are required to achieve an image quality in the range of 20/40 to 20/60.

The above shows, by way of example only, that if all the optical aspects of the transparent near eye optical module were perfect and that, by way of example only, no diffraction occurred to achieve 20/20 vision, it would require a plurality of tiles each having a plurality of pixel patches each having a plurality of 3 micron pixels totaling 3,300 pixels. The above shows, by way of example only, that if all the optical aspects of the transparent near eye optical module were perfect and that, by way of example only, no diffraction occurred to achieve 20/40 vision, it would require a plurality of tiles each having a plurality of pixel patches each having a plurality of 6 micron pixels totaling 1,650 pixels.

The micro-lens array can communicate optically with a plurality of pixels. One micro-lens of the micro-lens array can communicate optically with a specific patch of pixels. The micro-lens array can communicate optically with a specific tile of pixels. The micro-lenses of the micro-lens array can be located within the range of 75 microns to 1 mm from each other. A patch or tile of pixels can be of a number of pixels within the range of 2,500-10,000 pixels. The pixels within the patches or tiles of pixels can be located within the range of 1 micron to 5 microns from each other. The spacing between pixel patches or tiles of pixels or pixels patches is determined by the need to minimize stray light from the neighboring pixel patch or tile. A patch or tile of pixels can be of a size within the range of 150 microns×150 microns-750 microns×750 microns. Tiles of pixels or pixel patches can be within the range of 150 microns×150 microns-750 microns×750 microns.

As seen in FIGS. 6a and 6b, by increasing the number of pixels within a patch or moving the number of patches or tiles of pixels closer together (thus reducing the separation between patches of pixels) it is possible to increase the brightness level on the retina of the eye of a wearer while also increasing the eye box.

An eye tracker can be utilized in association with the sparsely populated transparent near eye display that involves a large eye box. As the eye moves across the near eye display, one or more of certain active pixels, patches of pixels or tiles of pixels, or icons are turned on and certain others can be turned off. This is done to prevent two or more overlapping images to be formed on the retina at one time. The sparsely populated transparent near eye display can provide magnification of the virtual image within the range of 1-10.

The transparent near eye optical module can increase its vertical and horizontal size without increasing thickness. The transparent optical module can be as small in area as the pupil of the eye of the wearer (by way of example only, 5 mm×5 mm) or can be as large as the front surface of a headwear mounted visor. Depending upon size, the transparent near eye display optical module can weigh as little as 2 grams or less. The transparent near eye display optical module can be embedded within the front surface of an eyewear lens and be of a less size than the front surface area of the eyewear lens. The transparent near eye display optical module can be embedded within the front surface of a headwear mounted visor and be of a less size than the front surface area of the headwear mounted visor.

The transparent near eye display optical module in certain embodiments can provide over 15 Nits within the pupil of the eye of the user and in other cases 1-8 Nits. The transparent near eye display optical module in certain embodiments can provide 1 to 15 Nits within the pupil of the eye of the user and in other cases 1-8 Nits. Given that the transparent near eye module is in most cases located 30 mm or less from the eye of the user the light efficiency of the light given off by the transparent near eye module reaching the pupil of the eye of the user can be greater than 80%. In certain embodiments the light efficiency of the light given off by the transparent near eye module reaching the pupil of the eye of the user can be greater than 90%.

The transparent near eye module can be curved to the front base curve of the eyeglass lens to which it is in optical communication with. The transparent near eye display optical module can be curved in the horizontal direction to that of the horizontal curve of the eyeglass lens to which it is in optical communication therewith. The transparent near eye display can comprise tiles of pixel patches that are faceted or tilted across a section of the eyewear lens or in front of an eyewear lens, such to allow for the line of sight of the wearer to be within zero to 10 degrees of the perpendicular when looking through a section of a patch of pixels as the line of sight of the wearer's eye moves horizontally across a section of the transparent near eye display. (See, e.g., FIGS. 15a, 15b, 15c, 15d, 15e, 15f, and 15g.) The transparent near eye optical module can comprise an air gap cavity. As shown in FIGS. 15a, 15b, 15c, 15d, 15e, 15f, and 15g, the air gap is located between the transparent near eye display and the micro-lens array. The air gap or material layer spacer can be within the range of 25 microns and 2.0 mm. The air gap or material layer spacer can be within the range of 50 microns and 150 microns. The micro-lens array can have a thickness within the range of 0.3 mm and 2.0 mm. The transparent near eye display can have a thickness is within the range of 0.3 mm and 2.0 mm. The transparent near eye module can have a thickness within the range of 1.0 mm and 4.0 mm.

The transparent near eye display can be a faceted display. The transparent near eye display can have multiple tiles of pixel pixels that are tilted (see FIGS. 16a, 16b, 16c, and 16d)). The transparent near eye display can have multiple patches or tiles of pixels that are faceted (see FIGS. 16a, 16b, 16c, and 16d). The transparent near eye display can have pixels that are sparsely populated and tiles of pixels that are tilted and faceted. The transparent near eye display can comprise a plurality of integrators that integrate the color from a plurality of colored pixels. A single integrator can be in optical communication with a plurality of colored pixels. Multiple integrators can be located between the MLA and the plurality of pixels (see FIGS. 16b and 16c).

FIG. 1a shows a top view of an embodiment of a transparent near eye optical module. As shown in FIGS. 15a, 15b, 15c, 15d, 15e, 15f, 15g, 16a, 16b, 16c, and 16d, the components are arranged such that the front-most component (furthest away from the eyes of the wearer) are shown at the top of the figure, with additional layers of components arranged toward the bottom of the figures such that the bottom layer is closest to the eyes of the wearer. As shown, the top section represents the transparent near eye optical module with a faceted sparsely populated near eye display positioned in front of the micro-lens array, for which the transparent near eye optical module is positioned in front of the spectacle lens with a gap (air gap or material spacer) therebetween. The transparent near eye optical module itself can have an air gap or material layer spacer disposed between the sparsely populated transparent near eye display and sparsely populated micro-lens array as shown in, for example, FIG. 1b.

Figure 16A:
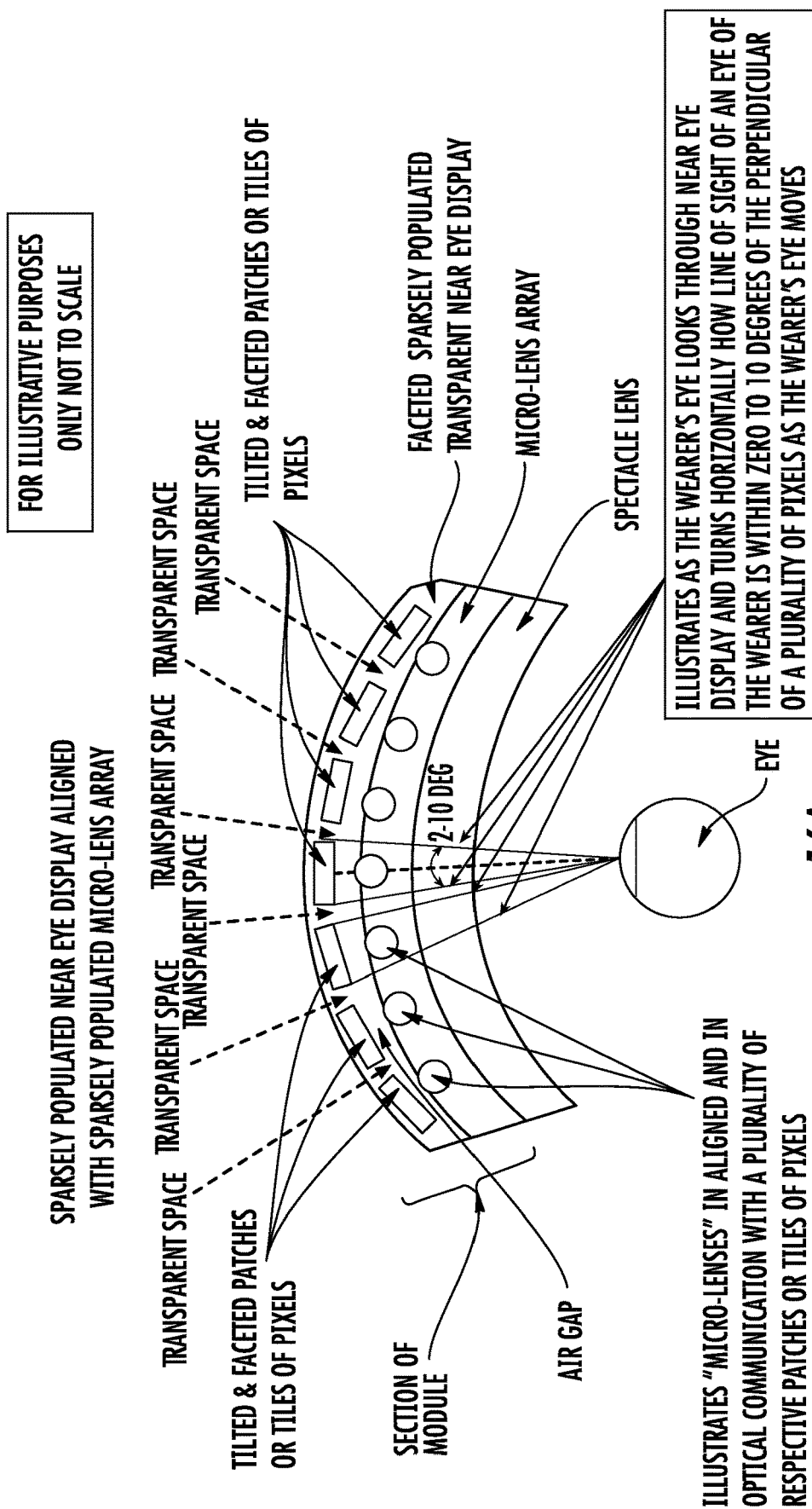
FIG. 16a is a side view diagram of a faceted embodiment, showing a transparent near eye optical module comprising various elements spread across the front surface of an eyewear lens.
Figure 16B:
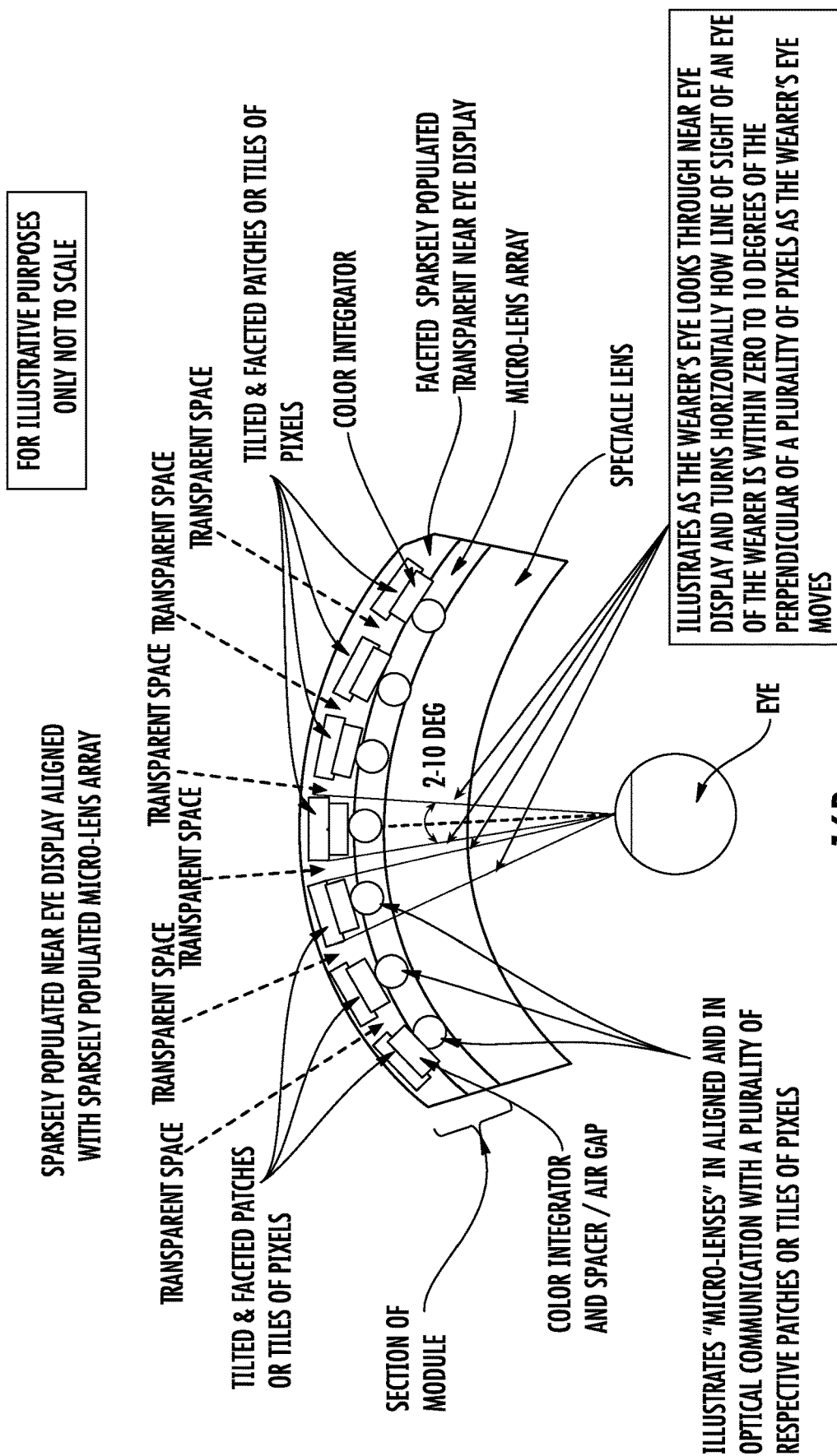
FIG. 16b is a side view diagram of a faceted embodiment, showing a transparent near eye optical module comprising various elements including color integrators that provide distance separation between the near eye display and the micro-lens array spread across the front surface of an eyewear lens.
Figure 16C:
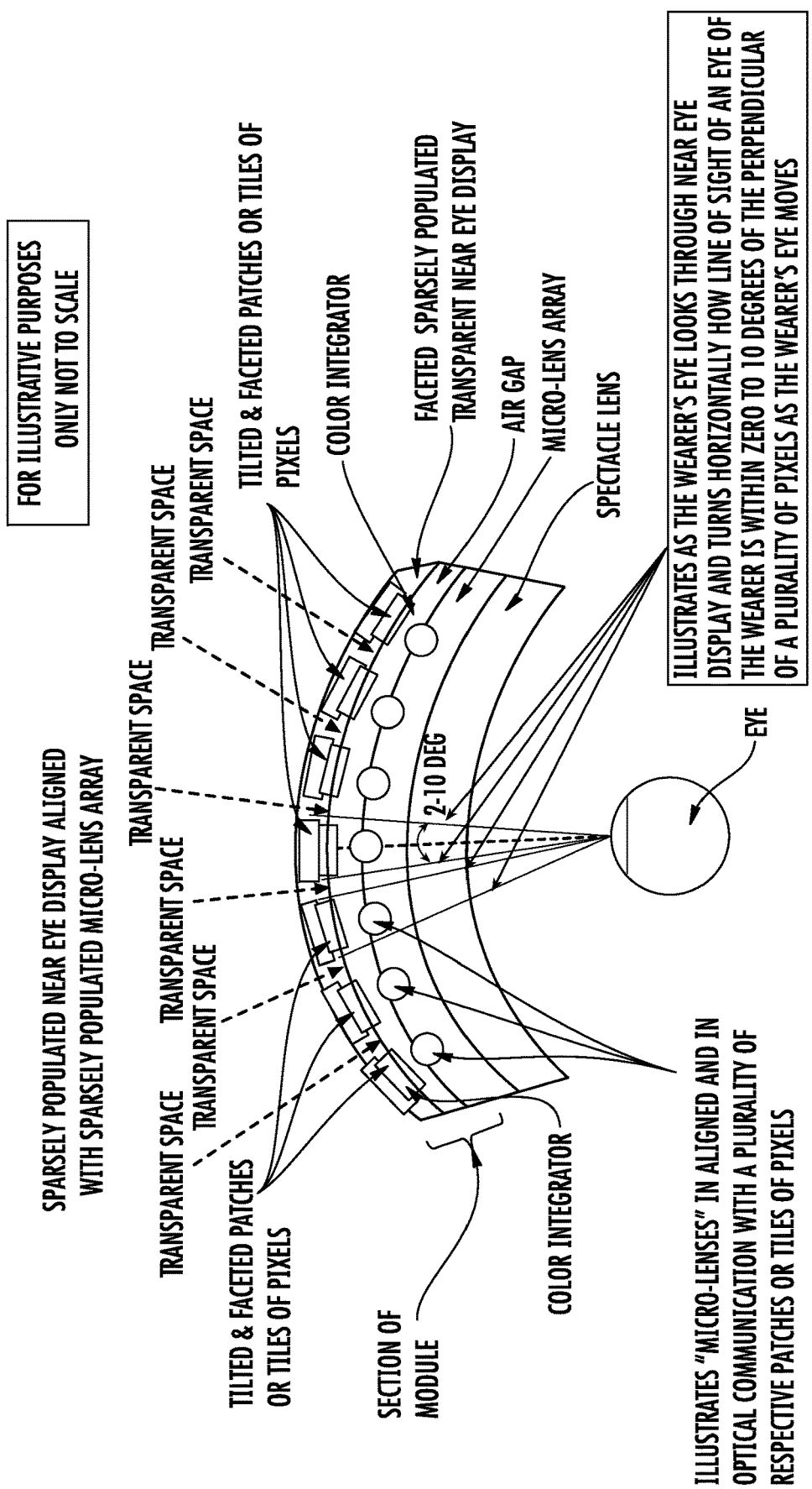
FIGS. 16c and 16d are side view diagrams of a faceted embodiment, showing a faceted transparent near eye optical module comprising various elements including light shield apertures (16c) and opaque micro-apertures (16d) that provide distance separation between the near eye display and the micro-lens array spread across the front surface of an eyewear lens.
Figure 16D:
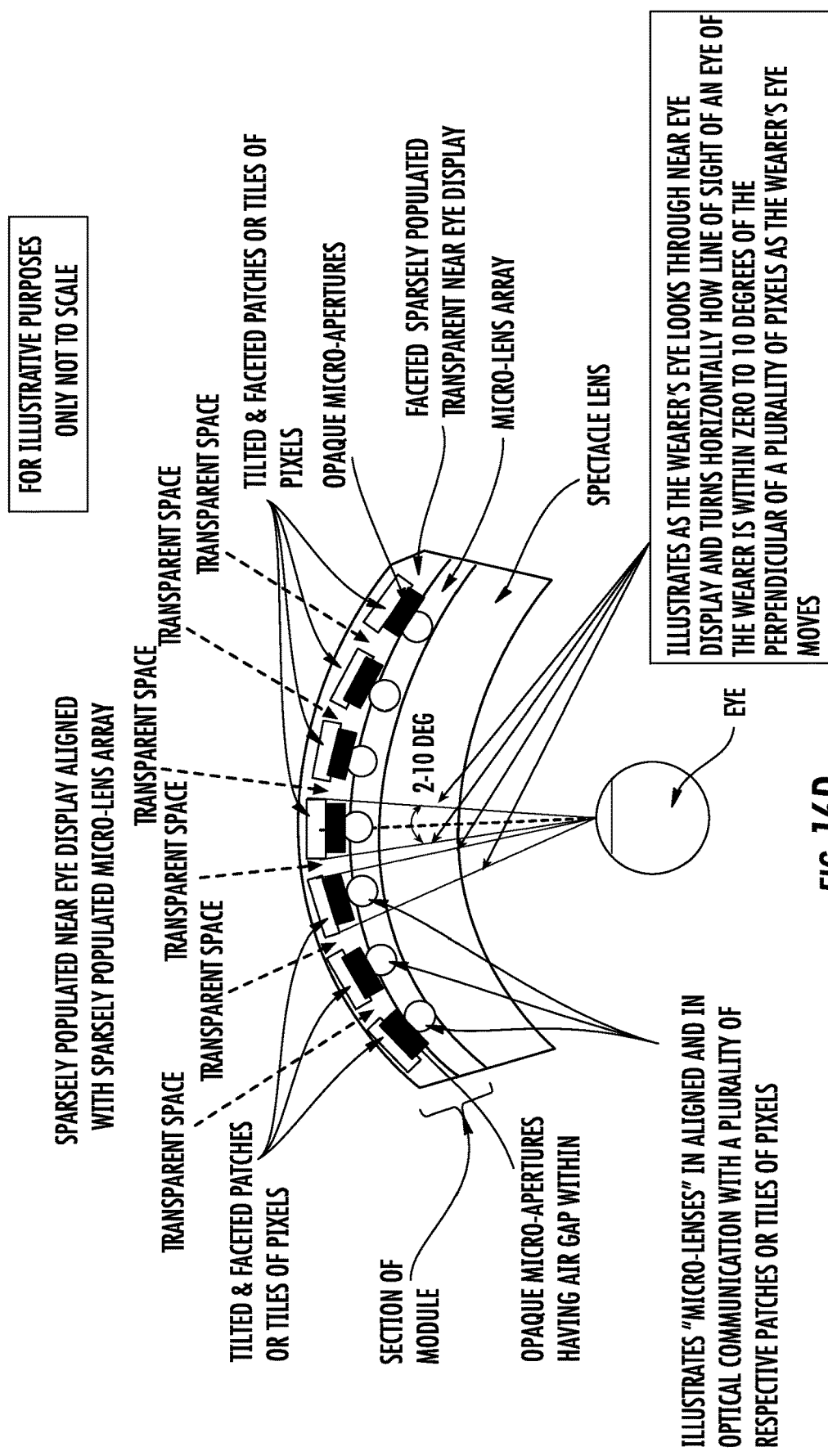

FIGS. 16a, 16b, 16c, and 16d illustrate that within the sparsely populated transparent near eye display component are an array of tilted and faceted patches of pixels with transparent space allowing light transmission from outside the module between the individual patches. In certain embodiments the sparsely populated transparent near eye display is an array of tilted and faceted tiles comprising patches of pixels with transparent space allowing light transmission from outside the module between the individual patches. Shown in the sparsely populated micro-lens array component are the individual micro-lenses or lenslets in alignment and in optical communication with the individual patches of pixels of the sparsely populated transparent near eye display disposed in front of the sparsely populated micro-lens array. Such alignment with the line of sight of the wearer is depicted by the dashed line in FIGS. 16a, 16b, 16c, and 16d. FIG. 16b shows an embodiment with a color integrator disposed within the near eye display between each of the individual lenslets and pixel patches. FIGS. 7a, 16d, 17a, and 17b show embodiments with an opaque micro-aperture disposed between each of the individual micro-lenses or lenslets and the distant separated pixel patches. Further, one of skill in the art will appreciate that other variations of the above embodiments fall within the scope of the invention, such as incorporation of a micro-aperture and a color integrator, one or more additional air gaps, etc. The solid lines in FIGS. 16a, 16b, 16c, and 16d illustrate that as the wearer's eye looks through the near eye display and turns horizontally, the line of sight of an eye of the wearer is within zero to 10 degrees of the perpendicular of a plurality of pixels as the wearer's eye moves.

The sparsely populated transparent near eye display can provide monochromatic light. The near eye display can provide multiple colors. The sparsely populated transparent near eye display can provide Quarter Video Graphics Array (QVGA). The sparsely populated transparent near eye display can provide better than QVGA. The sparsely populated transparent near eye display can provide full Video Graphics Array (VGA). The sparsely populated transparent near eye display can have a pixel fill factor ranging between 0.50% and 50%. Preferably the pixel fill factor is between 1% and 10%.

FIGS. 5a, 16a, 16b, 16c, and 16d show that the transparent near eye display optical module and its components can be curved to the front base curve of the eyeglass lens to which it is in optical communication with. The transparent near eye display optical module and its components can be flat and tiled. The transparent near eye display optical module and its components can be curved in the horizontal direction to that of the horizontal curve of the eyeglass lens to which it is in optical communication therewith. The sparsely populated transparent near eye display can be comprised of pixels that are faceted or tilted such to allow for the line of sight of the wearer to be within zero to 10 degrees of the perpendicular, more preferably within zero to 5 degrees, when looking through a section of pixels as the line of sight of the wearer's eye moves horizontally across a section of the sparsely populated transparent near eye display. The sparsely populated transparent near eye display can comprise a plurality of distance separated pixel patches or tiles of pixel patches wherein 16-36 pixel patches can be seen at one time by an eye of the wearer. An optional eye tracker can be utilized in association with the near eye display such that as the eye moves across the near eye display certain active pixels or pixel patches are turned off. The transparent near eye display optical module can comprise an air gap cavity between the sparsely populated transparent near eye display and the distance separated but aligned sparsely populated micro-lens array. The transparent near eye display optical module can comprise a material spacer (space filled with a medium of different refractive index from the material comprising the sparsely populated micro-lens array). The transparent near eye display optical module can comprise a material spacer between the sparsely populated transparent near eye display and the distance separated but aligned sparsely populated micro-lens array. The transparent near eye display optical module can be one of; located in front of, attached to, or embedded in the front surface of an eyewear lens worn by a user.

The air gap thickness (located between the transparent near eye display and the micro-lens array) can be within the range of 25 microns and 2.0 mm. The gap (air gap or material layer spacer) thickness can be within the range of 25 microns and 150 microns. The micro-lens array thickness can be within the range of 0.2 mm and 2.0 mm. The micro-lens array thickness can be within the range of 0.5 mm and 1.0 mm. The micro-lens array can have an antireflection coating on one or both sides. The near eye display thickness can be within the range of 0.3 mm and 2.0 mm. The near eye display thickness can be within the range of 0.35 mm and 1.0 mm. The thickness of the entire module (including the air gap between the sparsely populated transparent near eye display and the sparsely populated micro-lens array) can be within the range 1.0 mm and 3.0 mm.

The thickness of the entire module (including the air gap between the sparsely populated transparent near eye display and the sparsely populated micro-lens array) can be within the range 1.0 mm and 3.0 mm, and preferably between 1.0 mm and 2.0 mm. The sparsely populated transparent near eye display can be a faceted display. The sparsely populated transparent near eye display can have a plurality of pixel patches that are tilted and faceted. The transparent near eye optical module near eye display can have a plurality of tiles of pixel patches that are tilted and faceted.

While the above embodiment teaches a sparsely populated transparent near eye display, the same approach of having tilted and faceted pixel patches or tiles of pixel patches can be used with a fully populated transparent near eye display.

The transparent near eye optical module can be releasably attached to the spectacle frame. The transparent near eye optical module can be embedded within the front surface of the eyewear lens. A low index adhesive can be utilized to bond the transparent near eye optical module to the spectacle lens. This low index adhesive can be used to reduce diffractive effects of the micro-lens array. In certain embodiments an adhesive or resin that has a refractive index that is in between the index of refraction of the transparent near eye optical module and that of the index of refraction of the spectacle lens can be utilized to bond the transparent near eye optical module to the spectacle lens. In certain embodiments an adhesive or resin that has a refractive index that is in 50% between the index of refraction of the transparent near eye optical module and that of the index of refraction of the spectacle lens can be utilized to bond the transparent near eye optical module to the spectacle lens.

The transparent near eye optical module can be attached to the eye glass frame and spatially separated from the spectacle lens (see, e.g., FIGS. 1 and 2). The transparent near eye optical module can be embedded or attached to the front surface of an eye glass lens or eyewear lens. The sparsely populated transparent near eye display of the transparent near eye optical module can be comprised of a plurality of sparsely populated pixel patches, wherein a plurality of pixel patches are controlled by an eye tracking component such that as the eye of the wearer moves his or her eyes and looks along a section of the sparsely populated transparent eye display certain pixel patches are turned off. The sparsely populated transparent near eye display can be comprised of a plurality of sparsely populated pixel patches, wherein a plurality of pixels patches are controlled by an eye tracking component such that as the eye of the wearer moves his or her eyes and looks along a section of the sparsely populated transparent eye display certain pixel patches are turned on.

The sparsely populated transparent near eye display of the transparent near eye optical module can be comprised of a plurality of sparsely populated pixels, wherein a plurality of pixels are controlled by an eye tracking component such that as the eye of the wearer moves his or her eyes and looks along a section of the sparsely populated transparent eye display certain pixels are turned off. The sparsely populated transparent near eye display can be comprised of a plurality of sparsely populated pixels, wherein a plurality of pixels are controlled by an eye tracking component such that as the eye of the wearer moves his or her eyes and looks along a section of the sparsely populated transparent eye display certain pixels are turned on.

The fully populated transparent near eye display of the transparent near eye optical module can be comprised of a plurality of fully populated pixel patches, wherein a plurality of pixel patches are controlled by an eye tracking component such that as the eye of the wearer moves his or her eyes and looks along a section of the fully populated transparent eye display certain pixel patches are turned off. The eye tracking component can be an eye tracking device. The eye tracking component can be a plurality of sensors integrated into the transparent near eye optical module. The eye tracking component can be a plurality of sensors integrated into the transparent near eye display. The fully populated transparent near eye display can be comprised of a plurality of fully populated pixels patches, wherein a plurality of pixels patches are controlled by an eye tracking component such that as the eye of the wearer moves his or her eyes and looks along a section of the fully populated transparent eye display certain pixel patches are turned on.

The fully populated transparent near eye display of the transparent near eye optical module can be comprised of a plurality of fully populated pixels, wherein a plurality of pixels are controlled by an eye tracking component such that as the eye of the wearer moves his or her eyes and looks along a section of the fully populated transparent eye display certain pixels are turned off. The fully populated transparent near eye display can be comprised of a plurality of sparsely populated pixels, wherein a plurality of pixels are controlled by an eye tracking component such that as the eye of the wearer moves his or her eyes and looks along a section of the fully populated transparent eye display certain pixels are turned on.

Figure 18A:
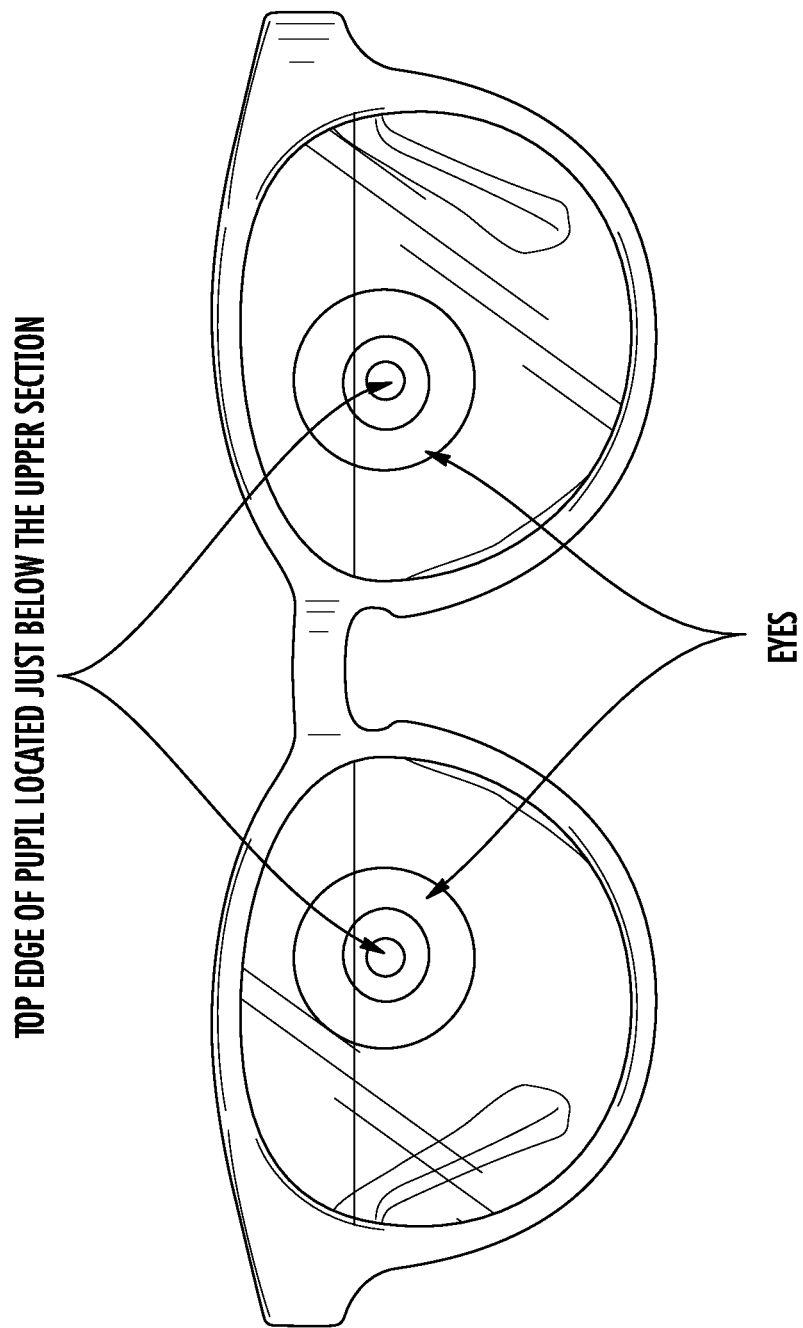
FIG. 18a is a front view diagram of an embodiment showing two transparent optical modules each with their bottom edge located above the top edge of the pupils of the eyes of a user.
Figure 18B:
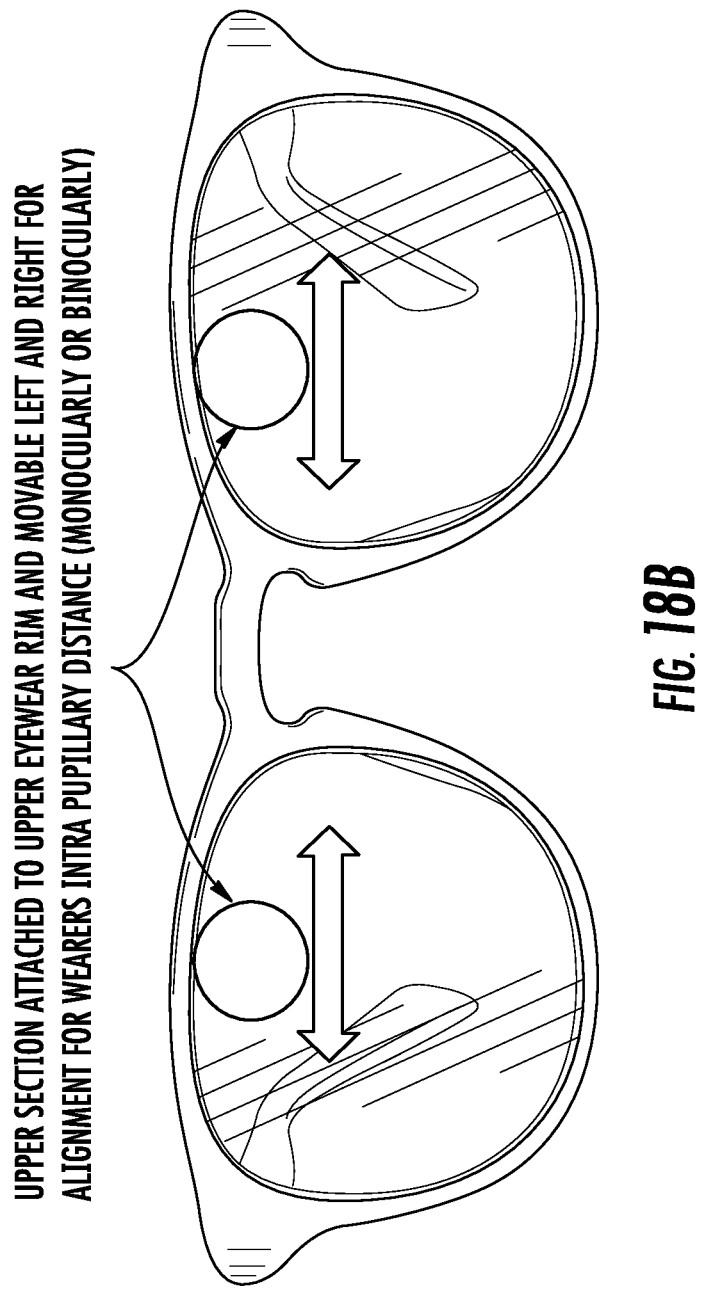
FIG. 18b is a front view diagram of an embodiment showing two transparent optical modules each of which are capable of being independently aligned horizontally that are attached to an eyewear frame.
Figure 18C:
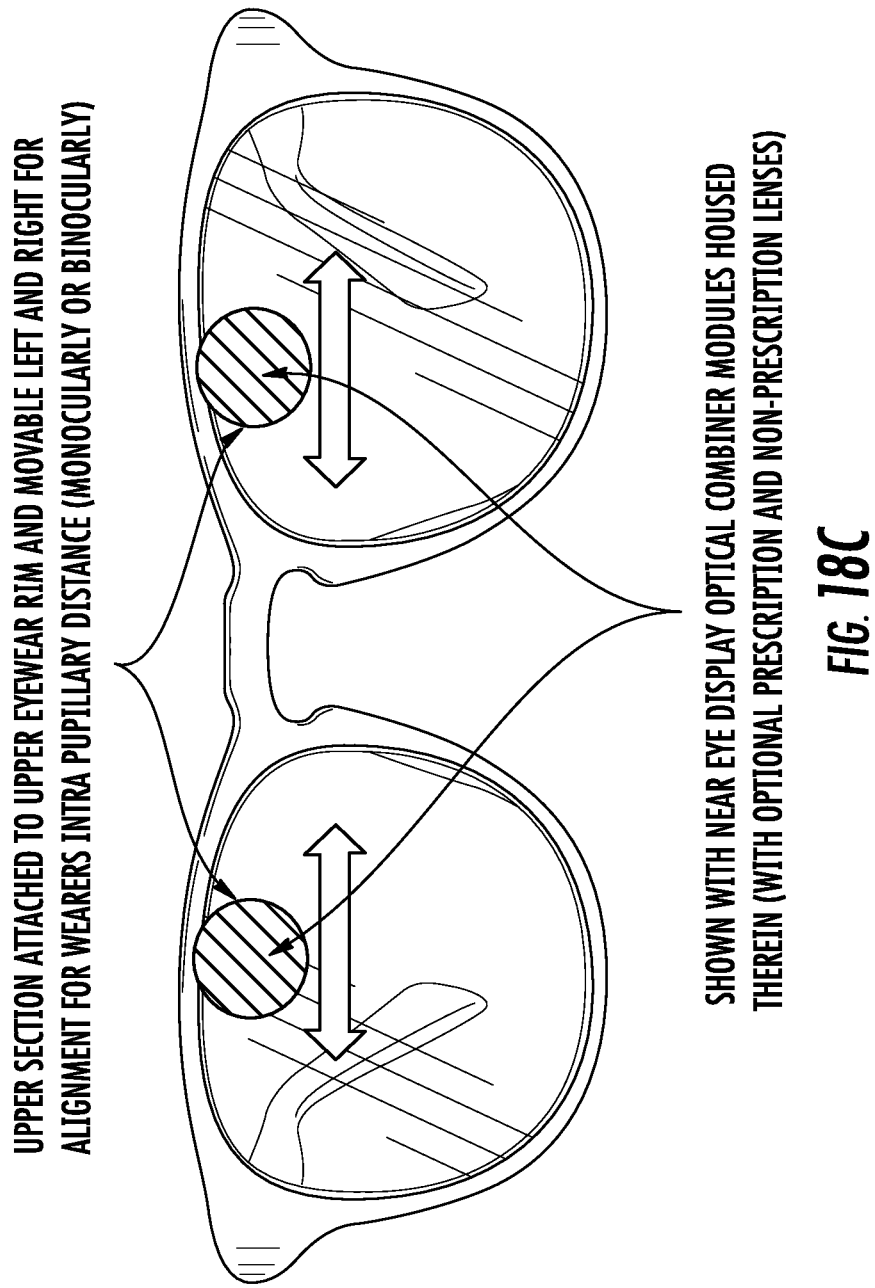
FIG. 18c is a front view diagram of an embodiment showing two transparent optical modules each of which are capable of being independently aligned horizontally that are attached to an eyewear frame.

The lower edge of the transparent near eye optical module can be located above the upper edge of the pupil of the eye(s) of a user (see FIG. 18a), or an edge of the transparent near eye optical module can be located temporally to the pupil of the eye of a user, or an edge of the transparent near eye optical module can be located nasally to the pupil of the eye of a user, or an edge of the transparent near eye optical module can be located inferiorly to the pupil of the eye of a user, or the transparent near eye optical module can be located partially or completely in front of the pupil of the eye(s) of a user. In certain embodiments the transparent near eye optical module when attached to an eyewear frame can be adjustable relative to the pupil of the eye of the wearer (see FIGS. 18b and 18c). The transparent near eye optical module can be adjustable along the X, Y axis relative to the pupil of the eye of the wearer. The transparent near eye display optical module can be adjustable along the X, Y, and Z axis relative to the pupil of the eye of the wearer. The transparent near eye display optical module can be binocular. The transparent near eye display optical module can be monocular. One transparent near eye display optical module can be releasably attachable to a plurality of different eyewear frames.

Figure 9:
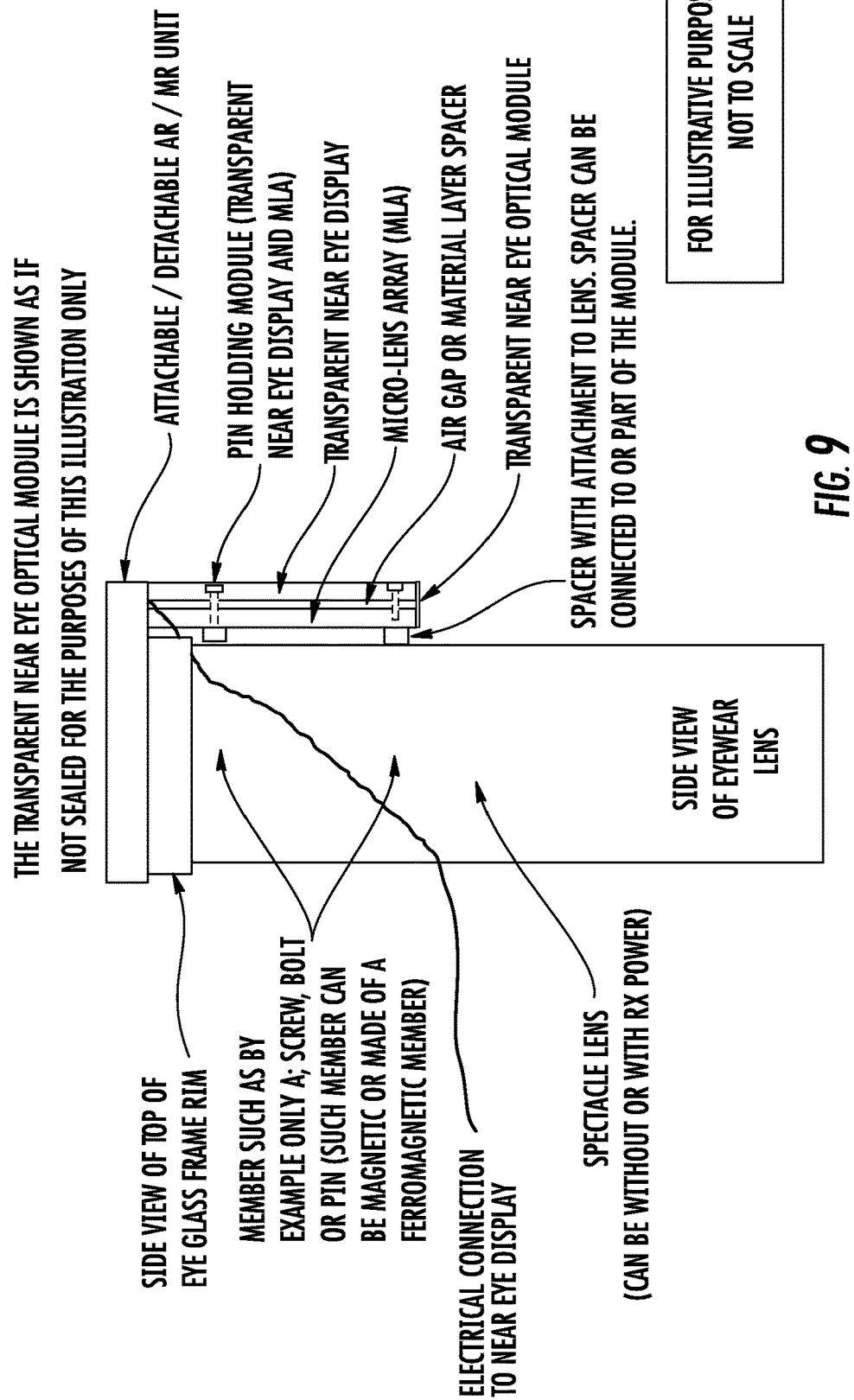
FIG. 9 is a side view diagram of an embodiment showing a releasably attachable AR/MR unit that comprises a sealed transparent near eye optical module that is distance separated from the front surface of an eyewear lens.
Figure 10:
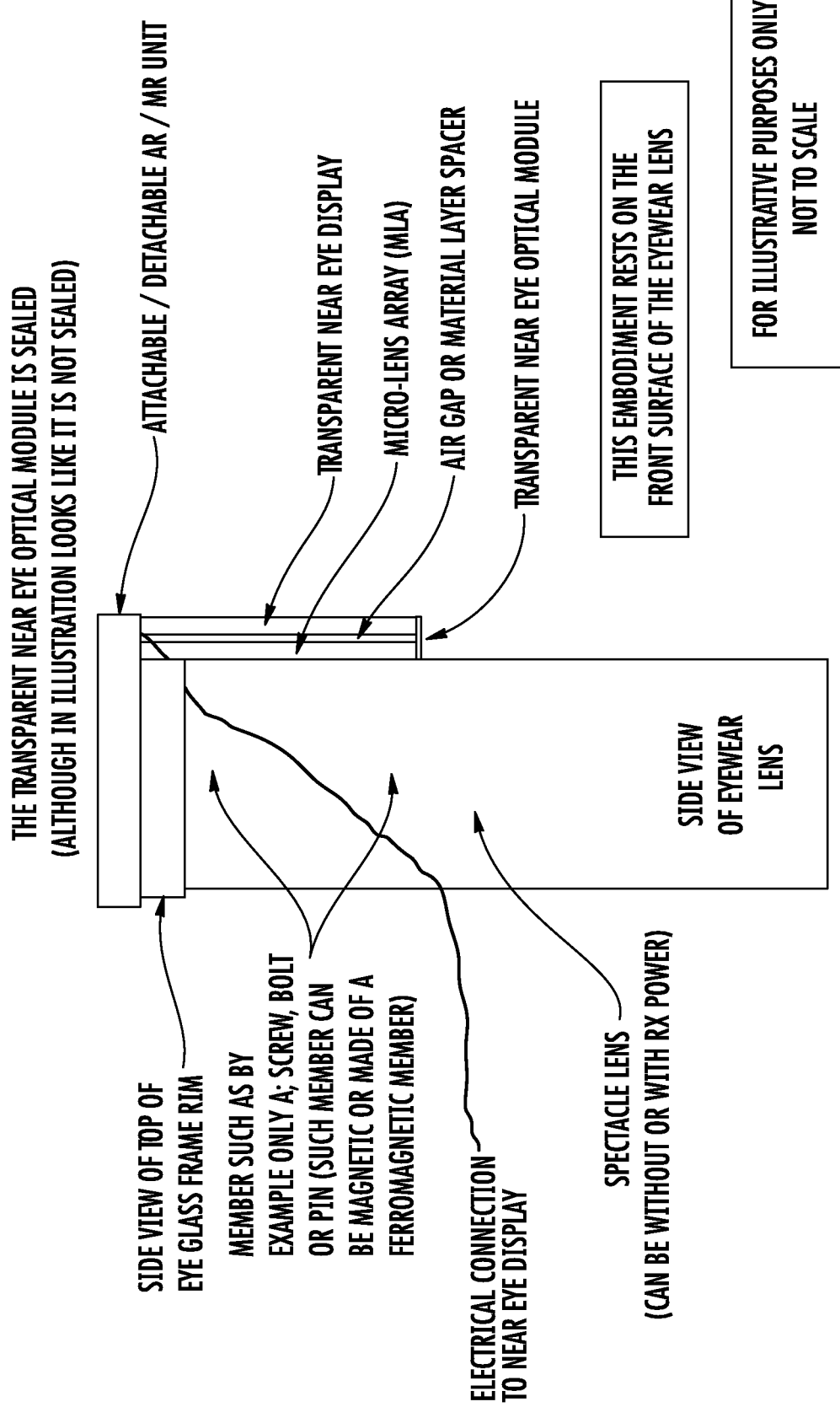
FIG. 10 is a side view diagram of an embodiment showing a releasably attachable AR/MR unit that comprises a sealed transparent near eye optical module that rests upon the front surface of an eyewear lens.

FIGS. 9, 10, 11a, and 11b show a transparent near eye optical module and attachment means to an eyewear frame according to an embodiment. A side view of the module is shown in FIGS. 9 and 10. The module includes an attachable/detachable AR/MR transparent near eye display optical module disposed on top of eyeglass frame rim. FIGS. 9 and 10 show an example only of the attachable/detachable AR/MR unit comprising the transparent near eye optical module attached to an eyeglass frame that extends beyond the top of the eye glass frame rim such that the sparsely populated transparent near eye display and sparsely populated micro-lens array can extend downward perpendicularly from the AR/MR unit and parallel to a top portion of the spectacle lens. In other embodiments not shown the transparent near eye display optical module can completely cover the spectacle lens. The transparent near eye optical module can be held together as well as attached to the spectacle lens(es) by way of a fastener such as a screw, bolt, or pin. The transparent near eye optical module can be attached to the front surface of an eyewear lens. The transparent near eye display optical module can be magnetically attached to an eyewear lens. The transparent near eye optical module can extend downward with respect to the wearer. The transparent near eye optical module can extend from the eyewear temple towards the eye of the wearer. The transparent near eye optical module can extend from the eyewear frame upwards towards the eye of the wearer. The transparent near eye optical module can extend downward with respect to the wearer along the front surface of the eyewear lens or in front of the front surface of the eyewear lens. The transparent near eye optical module can extend from the eyewear temple towards the eye of the wearer along the front surface of the eyewear lens or in front of the front surface of the eyewear lens. The transparent near eye optical module can extend from the eyewear frame upwards towards the eye of the wearer along the front surface of the eyewear lens or in front of the front surface of the eyewear lens. As shown in FIGS. 9 and 10, the module can have a spacer in between and in communication with the spectacle lens and micro-lens array to facilitate attachment to the lens. The spacer can be connected to or be part of the transparent near eye optical module. In certain embodiments the spacer may be absent and the transparent near eye optical module can rest on the front surface of an eyewear lens. In both FIGS. 9 and 10, there can be a space or air gap between the spectacle lens and the transparent near eye optical module. The spectacle lens can be a lens without or with prescription power. The transparent near eye display can include an electrical connection as shown.

Figure 5B:
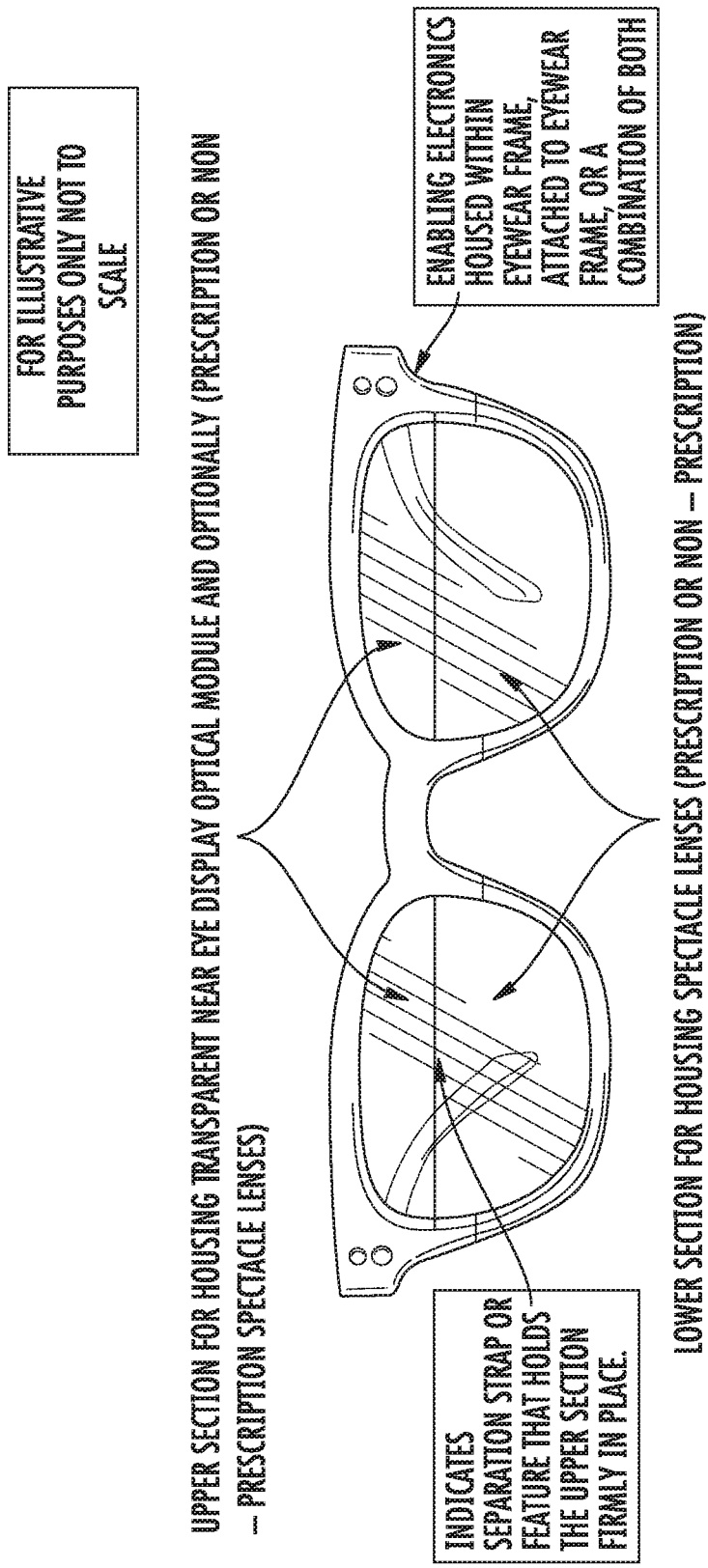
FIG. 5b is a diagram of an embodiment of a front view of two transparent near eye optical modules each part of the front surface of a pair of eyewear lenses of an eyewear frame that contains enabling electronics.
Figure 5C:
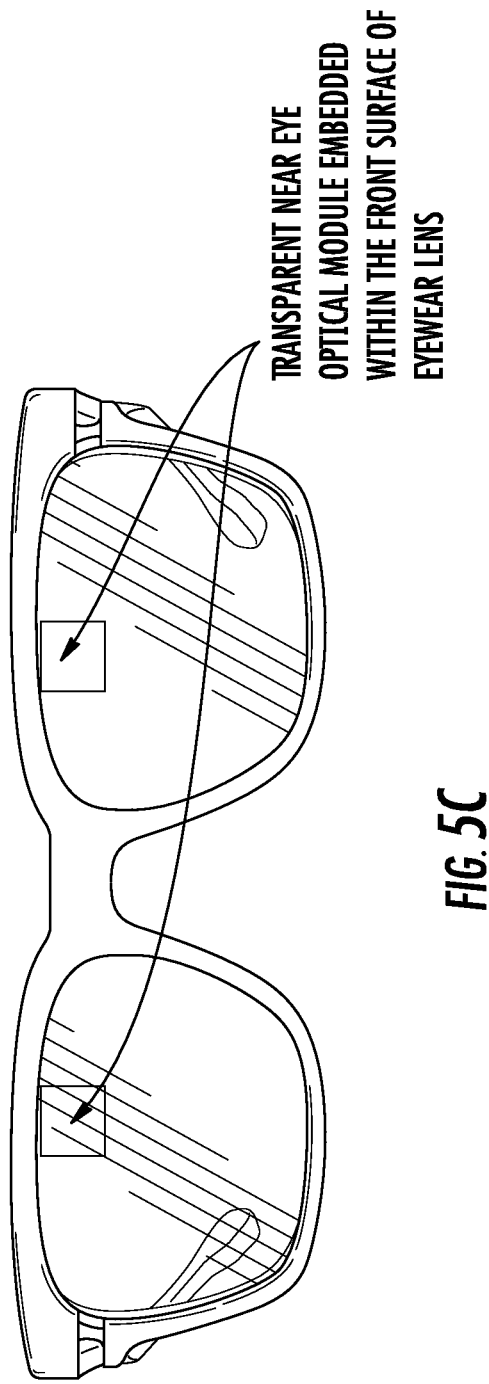
FIG. 5c is a diagram of an embodiment of a front view of two transparent near eye optical modules each embedded in the front surface of a pair of eyewear lenses of an eyewear frame that contains enabling electronics.
Figure 5D:
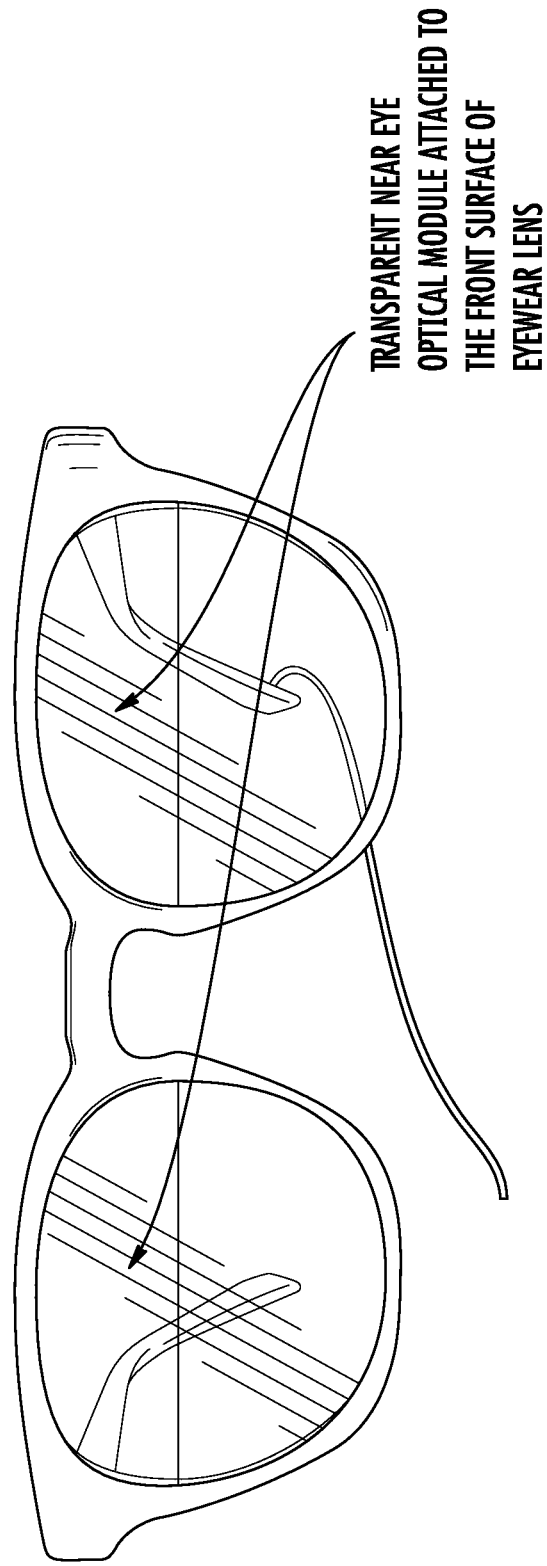
FIG. 5d is a diagram of an embodiment of a front view of two transparent near eye optical modules each attached to the front surface of a pair of eyewear lenses of an eyewear frame that contains enabling electronics.
Figure 11A:
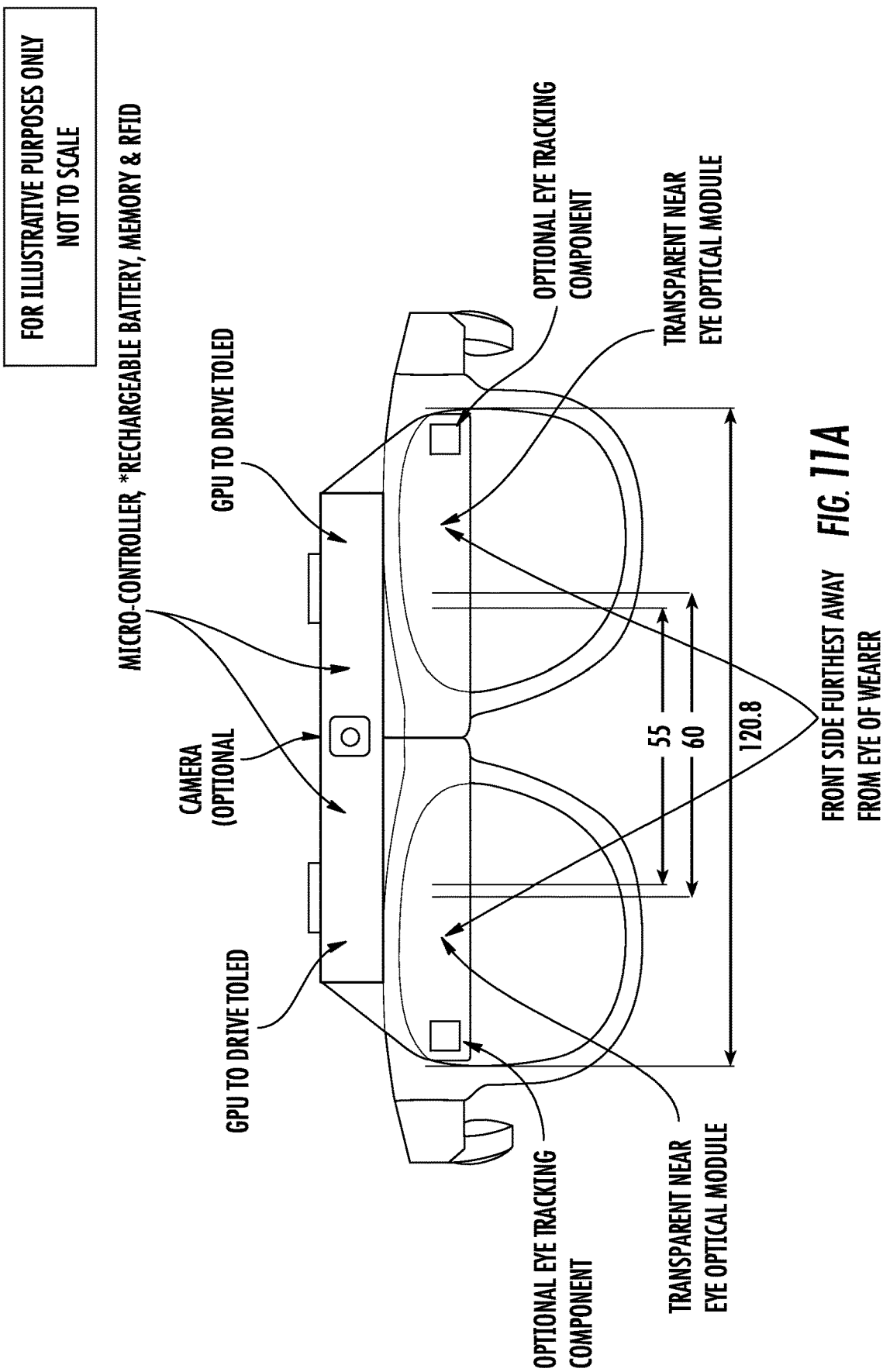
FIG. 11a is a front view of an embodiment of an eyewear frame supporting a releasably attached AR/MR unit having two transparent near eye optical modules.
Figure 11B:
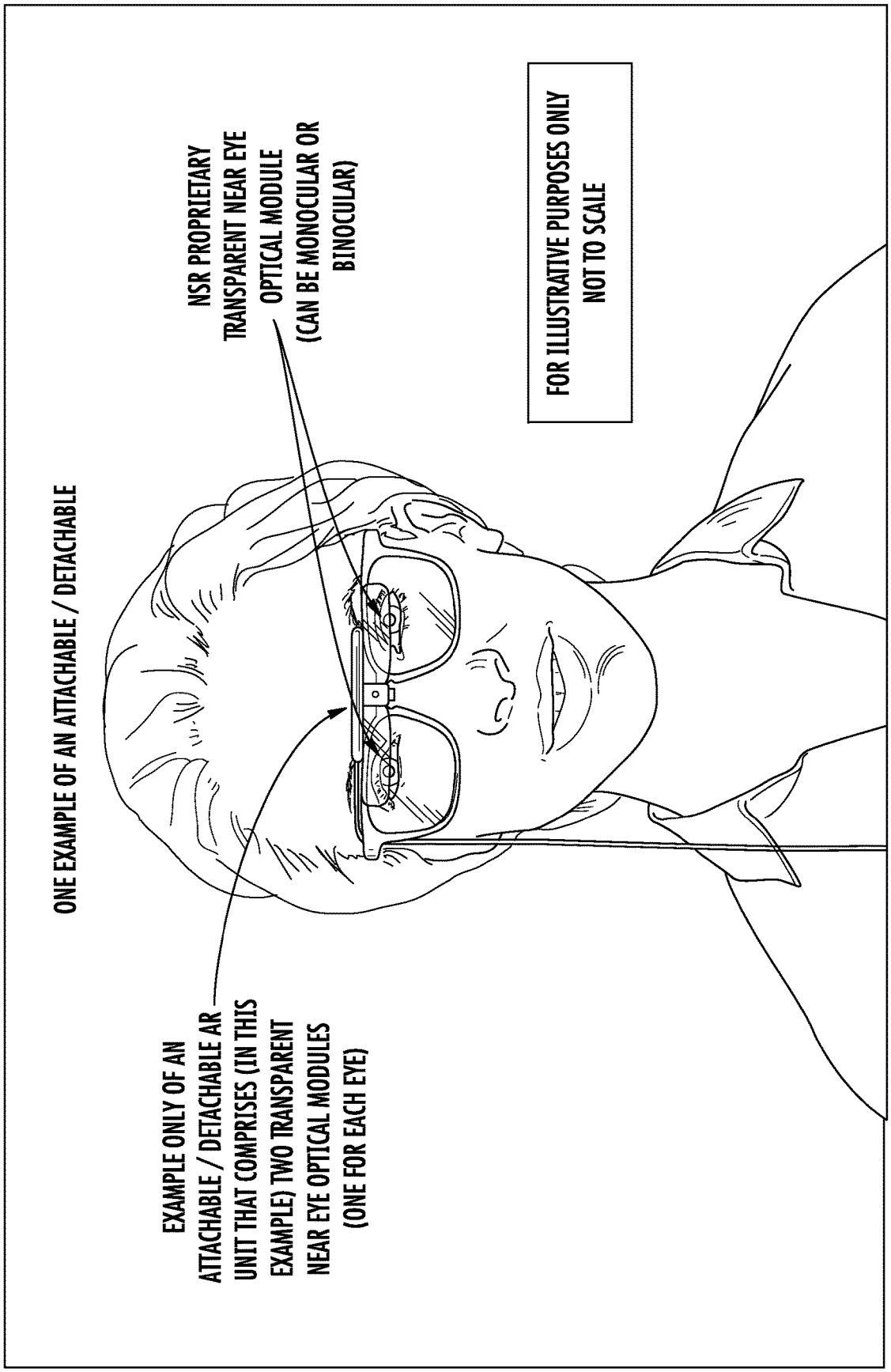
FIG. 11b is a front view of another embodiment of an eyewear frame supporting a releasably attached AR/MR unit having two transparent near eye optical modules showing the bottom edge of each of the transparent eye optical modules being located above the top edge of the pupils of the eye of the wearer.

FIGS. 11a and 11b show a front view of an embodiment of the transparent near eye optical module showing a releasably-attachable AR device. Shown in FIGS. 11a and 11b are eyeglass frame with AR/MR unit disposed above. In FIGS. 5b, 5c and 5d, the AR/MR unit may include a micro-controller, rechargeable battery, memory, and radio-frequency identification (RFID). Also included in the figures is a graphics processing units (GPUs) configured to drive the sparsely populated transparent near eye display, which in this embodiment is one of, by way of example only, a transparent organic light-emitting display (TOLED), an OLED, or an iLED (micro-LED) located upon a transparent substrate. The attachable/detachable embodiments are located in front of the spectacle lens (front side furthest away from the eye of the wearer). The AR/MR unit can optionally include a camera as shown or cameras as not shown. The transparent near eye display disposed in front of the spectacle lens can include eye tracking components for each lens of the eyewear as shown.

A micro-lens of the micro-lens array can be, by way of example only; a spherical convex lens, biconvex lens, spherical minus lens, compound lens, two or more component optics, an aspheric lens, Fresnel lens, diffractive optic, refractive optic, achromatic optic, prismatic optic, Gabor Superlens, Gradient Index Lens (GRIN) patterned electrodes, or liquid lens. In embodiments where each micro-lens of a micro-lens array is in optical communication with each pixel of the transparent near eye display the fill factor ratio of the micro-lenses in the micro-lens array is approximately the same as the fill factor of the pixels in the corresponding transparent near eye display. In embodiments where one micro-lens array is in optical communication with a patch of pixels the fill factor ratio of the micro-lenses in the micro-lens array is greater than the fill factor of the pixels in the corresponding transparent near eye display. In embodiments where one micro-lens array is in optical communication with a plurality of patches of pixels the fill factor ratio of the micro-lenses in the micro-lens array is greater than the fill factor of the pixels in the corresponding transparent near eye display. The micro-lens array can be a sparsely populated micro-lens array.

In certain embodiments where a pixel is of a size exceeding the size of a micro-lens, an aperture can be placed over the pixel to shutter down the light from the pixel so that the light can be appropriately optically communicated through the micro-lens. The micro-lens array can be a sparsely populated micro-lens array. In certain embodiments where a pixel is of a size exceeding the size of a micro-lens an aperture array can be placed over the pixel to shutter down the light from the pixel so that the light can be appropriately optically communicated through the aligned micro-lens. The micro-lens array can be a sparsely populated micro-lens array. In certain embodiments where a pixel patch is of a size exceeding the size of a micro-lens an aperture array can be placed over the pixel patch to shutter down the light from the pixel patch so that the light can be appropriately optically communicated through the aligned micro-lens.

The micro-lens array can be a fully populated micro-lens array. In certain embodiments where a pixel is of a size exceeding the size of a micro-lens an aperture array can be placed over the pixel to shutter down the light from the pixel so that the light can be appropriately optically communicated through the aligned micro-lens. (See, e.g., FIG. 8.) The micro-lens array can be a fully populated micro-lens array. In certain embodiments where a pixel patch is of a size exceeding the size of a micro-lens an aperture array can be placed over the pixel patch to shutter down the light from the pixel patch so that the light can be appropriately optically communicated through the aligned micro-lens.

Figure 17A:
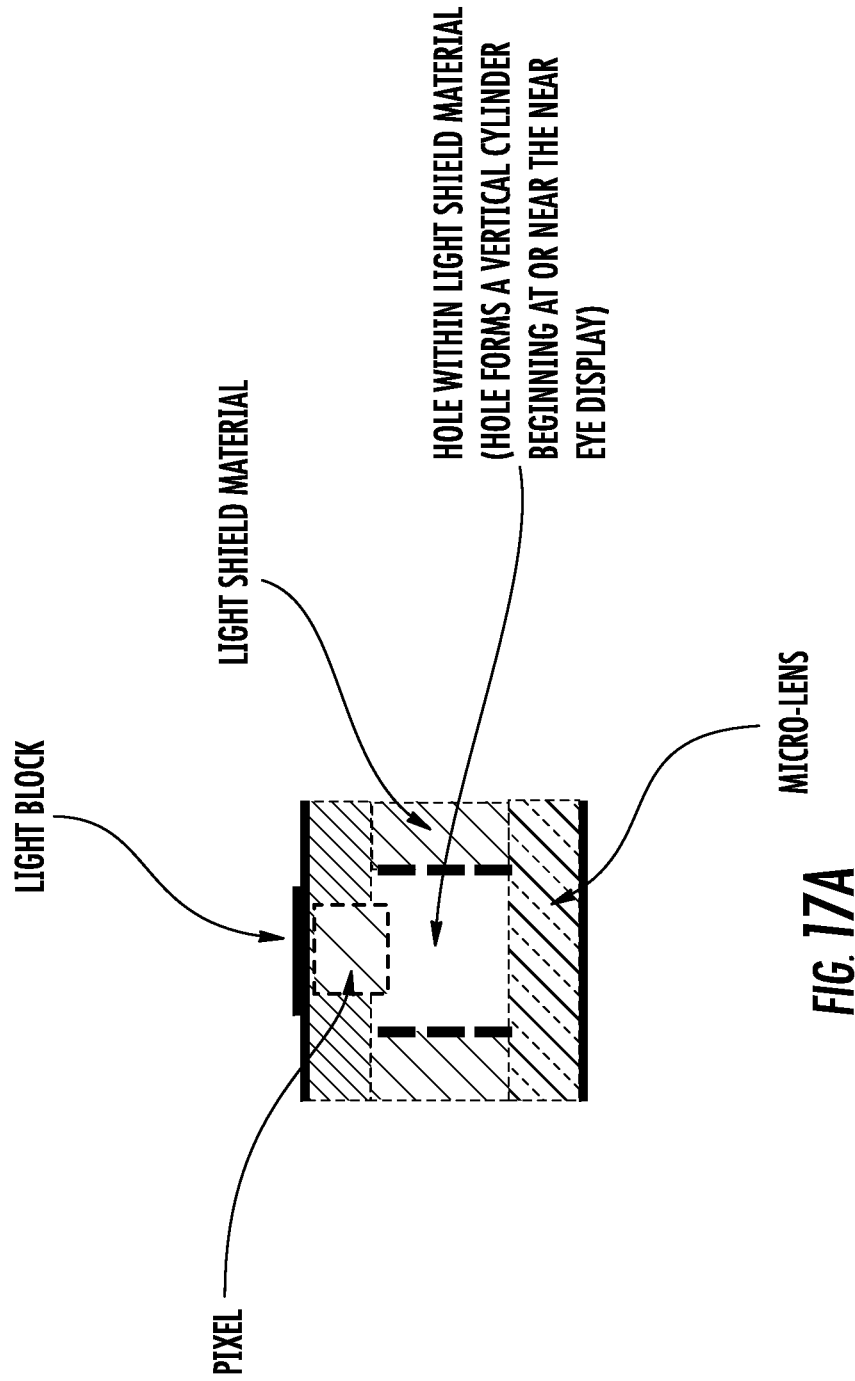
FIG. 17a is a side view diagram of an embodiment of small section limited to that of a single pixel of the sealed transparent near eye optical module which comprises a light shield aperture having a vertical hole located between the pixel and a micro-lens.

FIG. 17b shows a top view of the structure of an open aperture light shield according to an embodiment, and FIG. 17a shows a side view of this embodiment. A structure for one pixel is illustrated, which would be replicated across the near eye display, pixel by pixel, patch by patch, or tile by tile. In certain embodiments the open aperture light shield covers a pixel patch as opposed to just that of a pixel. As shown in FIG. 17a, the pixel in the center of the illustration is surrounded by an individual micro-lens and light shielding material. A hole within the light shield material forms a vertical cylinder beginning at or near the transparent near eye display. The inner wall of the cylinder can be as absorptive or opaque as practical. Further, in certain embodiments one aperture light shield hole can provide light from a patch of pixels to that of a micro-lens. A pixel of the near eye display is aligned with the lens of the micro-lens array with the hole disposed within the aperture light shield material forming a vertical cylinder between the pixel and lens beginning at or near the near eye display. For clarity, the light shield can extend part way for its start at the transparent near eye display and not touch the MLA or it can extend the full way and touch the micro-lens array. The aperture light shield material when formed around a plurality of pixels or pixel patches forms an aperture light shield array. However, when the aperture light shield material is formed as an aperture light shield array the sections of the aperture light shield array between the pixel patches is transparent.

In FIGS. 1a and 1b, and in the transparent near eye display optical module as shown in FIGS. 15a, 15b, 15c, 15d, 15e, 15f, and 15g, the apparatus can be comprised of several layers or components that are sealed on their outer surface. The sealing can be hermetically sealed. The backing or substrate to which light emitters (or pixels) are deposited can be that of a transparent material. The light blocker reduces or blocks the lighted pixels' outward emission of light away from the eye of a wearer/user is reduced or blocked. Such light block can be implemented, by way of example only, by an opaque material shield, opaque element, deposited opaque material, shutter (such as a liquid crystal shutter), added material layer, or opaque light emitter on the side furthest away from the eye of the wearer/user.

The light blocker (opaque member or element) is located behind the light emitter on the side of the light emitter that is furthest away from the eye of the user. The light blocker can be the size of the aligned corresponding micro-lens for a pixel or pixel patch. The light blocker can be the outer perimeter size of the aligned corresponding micro-lens along the x/y plane. The light blocker can be the outer perimeter shape of the aligned corresponding micro-lens along the x/y plane (see FIGS. 2a, 2c, 3a, and 3b). The light blocker can be 5% to 20% larger than the size of the aligned corresponding micro-lens. The light blocker can be on the outer perimeter 5% to 20% larger than the size of the aligned corresponding micro-lens along the x/y plane. While the share of the light blocker can be round, it can be of any shape, by way of example only, rectangular, square, oval, or triangular. The material spacing or air gap can be disposed between transparent near eye display and aligned micro-lens array. (See, e.g., FIGS. 15a, 15b, 15c, 15d, 15e, 15f, and 15g.) Those figures illustrate different embodiments demonstrating other arrangements of light blocks, near eye display light shield, material spacing, and air gap or cavity between the transparent near eye display and the micro-lens array, including the use of multiple components placed between the near eye display and the micro-lens array and/or behind the micro-lens array (closest to the eye).

In certain embodiments a sealed transparent near eye optical module comprises a plurality of light blocks separated from one another by transparent areas. In certain embodiments a sealed transparent near eye optical module comprises a plurality of light emitters separated from one another by transparent areas. In certain embodiments a sealed transparent near eye optical module comprises a plurality of light shields separated from one another by transparent areas. In certain embodiments a sealed transparent near eye optical module comprises a plurality of color integrators separated from one another by transparent areas. In certain embodiments a sealed transparent near eye optical module comprises a plurality of micro-lenses separated from one another by transparent areas. In certain embodiments a sealed transparent near eye optical module comprises a plurality of lenslets separated from one another by transparent areas. In certain embodiments a sealed transparent near eye optical module comprises a plurality of air gaps separated from one another by transparent areas. In certain embodiments a sealed transparent near eye optical module comprises a plurality of material spacers separated from one another by transparent areas. In certain embodiments a sealed transparent near eye optical module comprises an air gap that is located between a plurality of pixel or pixel patches and each of the aligned corresponding micro-lens. Other configurations not illustrated herein which can be contemplated by one of skill in the art also within fall within the scope of the invention.

In certain embodiments where a pixel is of a size exceeding the size of a micro-lens an aperture array can be placed over the pixel to shutter down the light from the pixel so that light can be appropriately optically communicated through the micro-lens(es). An aperture array can be comprised of a plurality of apertures. The apertures can be micro-apertures aligned over a plurality of pixels. For example, one aperture can be aligned per pixel for stopping down the pixel light to that of the diameter of the aperture and directing the light to a micro-lens of a micro-lens array, or the micro-aperture can be aligned over a patch of pixels stopping down light from the patch of pixels and directing the light to a micro-lens of a micro-lens array. As indicated in FIGS. 17a and 17b, in certain embodiments, a micro-aperture array can have micro-aperture that has height. The micro-aperture array can fit over a pixel or a patch of pixels. The micro-aperture array can fit near or adjacent to the pixel or patch of pixels. The micro-aperture array can fit near or adjacent to the micro-lens array. A micro-aperture can be aligned with a pixel and a micro-lens. A micro-aperture can be aligned with a patch of pixels and a micro-lens. In other embodiments, a micro-aperture array can have micro-apertures having no height but only a thin material layer by way of example only a film or a coating.

The micro-aperture array can be opaque other than the hole. The micro-aperture can have an optical structure that prevents light from passing through the walls of the open aperture or hole. The optical structure can be on the outside side of the aperture or hole. The optical structure can be on the inside side of the aperture or hole. The optical structure can be on that of the aperture or hole. The micro-aperture can have a coating that prevents light from passing through the walls of the open aperture or hole. The coating can be on the outside side of the aperture or hole. The coating can be on the inside side of the aperture or hole. The micro-aperture can have a finish that prevents light from passing through the walls of the open aperture or hole. The finish can be on the outside side of the aperture or hole. The finish can be on the inside side of the aperture or hole.

In certain embodiments, a fully pixelated TOLED near eye display can be utilized. However, by turning off certain TOLED pixels at any given time, the pixelated TOLED near eye display can be made to simulate that of a sparsely populated pixelated near eye display. The same pixel fill factor of "active" pixels at any one time can be achieved as that of a sparsely populated near eye display by turning off various pixels or pixel patches when the transparent near eye display is in use. Thus, each of the embodiments and examples of the sparsely populated pixelated near eye display disclosed herein can be mimicked by a fully populated pixelated TOLED, or transparent OLED, or iLED near eye display having a certain number of its pixels or pixel patches turned off at any one time. A transparent OLED or iLED (micro-LED) display comprises a transparent substrate of backing to which the OLEDs or iLEDs are deposited.

In a certain embodiment of a fully pixelated transparent near eye display different pixels or pixel patches are turned off specific to a plurality of different locations within the near eye display and left off. The active pixels utilized are always the active pixels being utilized. The corresponding aligned micro-lens array is customized and static so to align with the active pixels. In another embodiment the active pixels or pixel patches are turned on and off periodically as opposed to be turned off and left off. In this embodiment the corresponding and aligned micro lenses are switchable on and off. Each aligned micro-lens can be switchable on and off to coordinate with the corresponding and aligned pixel or pixel patch. Thus, if the pixel or pixel patch is turned on the switchable micro-lens is turned on, and when the pixel or pixel patch is turned off the switchable micro-lens is turned off.

By way of example only, an embodiment can be that of a transparent near eye optical module, wherein the transparent near eye optical module comprises one of a transparent TOLED, OLED, or iLED near eye display and one or more optically aligned micro-lens array(s), wherein the "lighted/active pixel density" of the transparent near eye display represents 50% or less of the area of the transparent near eye display, and light rays from the real world that form a real image pass through the transparent near eye display and light rays that form a virtual image are generated by way of the lighted active pixels of the transparent near eye display. An embodiment can be that of a transparent near eye optical module, wherein the transparent near eye optical module comprises one of a transparent TOLED, OLED, or iLED near eye display and one or more optically aligned micro-lens array(s), wherein the "lighted pixel density" of the near eye display represents 25% or less of the area of the transparent near eye display, and light rays from the real world that form a real image pass through the transparent near eye display and light rays that form a virtual image are generated by way of the lighted pixels of the transparent near eye display. An embodiment can be that of one of a transparent near eye display optical module, wherein the module comprises a populated transparent TOLED, OLED, or iLED near eye display and one or more optically aligned micro-lens array(s), wherein the "lighted pixel density" of the transparent near eye display represents 20% or less of the area of the transparent near eye display, and light rays from the real world that form a real image pass through the transparent near eye display and light rays that form a virtual image are generated by way of the lighted pixels of the transparent near eye display.

An embodiment can be that of one of a transparent near eye module, wherein the transparent near eye optical module comprises a transparent TOLED, OLED, or iLED near eye display and one or more optically aligned micro-lens array(s), wherein the "lighted/active pixel density" of the transparent near eye display represents 15% or less of the area of the transparent near eye display and light rays from the real world that form a real image pass through the see through the transparent near eye display and light rays that form a virtual image are generated by way of the lighted pixels of the transparent near eye display. An embodiment can be that of one of a transparent near eye optical module, wherein the transparent near eye optical module comprises a transparent TOLED, OLED, or iLED near eye display and one or more optically aligned micro-lens array(s), wherein the "lighted/active pixel density" of the transparent near eye display represents 5% or less of the area of the transparent near eye display, and light rays from the real world that form a real image pass through the see through transparent near eye display and light rays that form a virtual image are generated by way of the lighted pixels of the transparent near eye display. In each of these preceding examples, the near eye display can be fabricated such that light being emitted away from the eye of the wearer is reduced. In each of these preceding examples, the transparent near eye display can be fabricated such that light being emitted away from the eye of the wearer is blocked. The transparent near eye display, as disclosed herein, can have opaque section(s) behind a pixel or patches of pixels, on the side of the pixel or patches of pixels furthest from the eye of the wearer and have sections between the pixels and/or patches of pixels that are transparent. The transparent near eye display as disclosed herein can have opaque section(s) of the transparent near eye display behind a pixel or patches of pixels, on the side of the pixel or patches of pixels furthest from the eye of the wearer and wherein the sections between the pixels and/or patches of pixels are semi-transparent or transparent.

FIG. 8 shows active pixel patches (patches of pixels capable of being lit) covered by light blocks as seen looking from the front of the transparent near eye display as being viewed by the eye of someone looking at the wearer/user of the transparent near eye display. This mode shows light rays from the real world creating a real image as seen by the eye of a user that are passed through the transparent sections to the eye of the wearer/user, while a virtual image is being created by the light emitting from the transparent near eye display passing through the micro-lens array towards the eye of the wearer/user. As seen in this illustration, light that is emitted forward away from the eye of the wearer/user is blocked. Each component (depicted as individual squares but can be round or any shape) of the array shows a light block covering a patch of pixels in the center with transparent space around the patch of pixels passing light rays from the real world surrounding each block. As an example only, the fill factor of active pixels to that of transparent space can be less than 15%.

The near eye display can have a pixelated liquid crystal shutter located on the side of the near eye display furthest from the eye of the wearer that blocks or reduces outbound light from the display going outward away from the eye of the wearer, thus reducing light given off from the near eye display that is being observed by an observer and not that of the wearer. In certain embodiments the near eye display can have a pixelated liquid crystal shutter located on the side of the near eye display furthest from the eye of the wearer that blocks or reduces the outbound light from a pixel or pixel patch going outward away from the eye of the wearer, thus reducing light given off from the near eye display that is being observed by an observer and not that of the wearer. The pixelated liquid crystal shutter is coordinated to turn opaque or near-opaque as a pixel or pixel patch is turned on and lit.

Figure 35C:
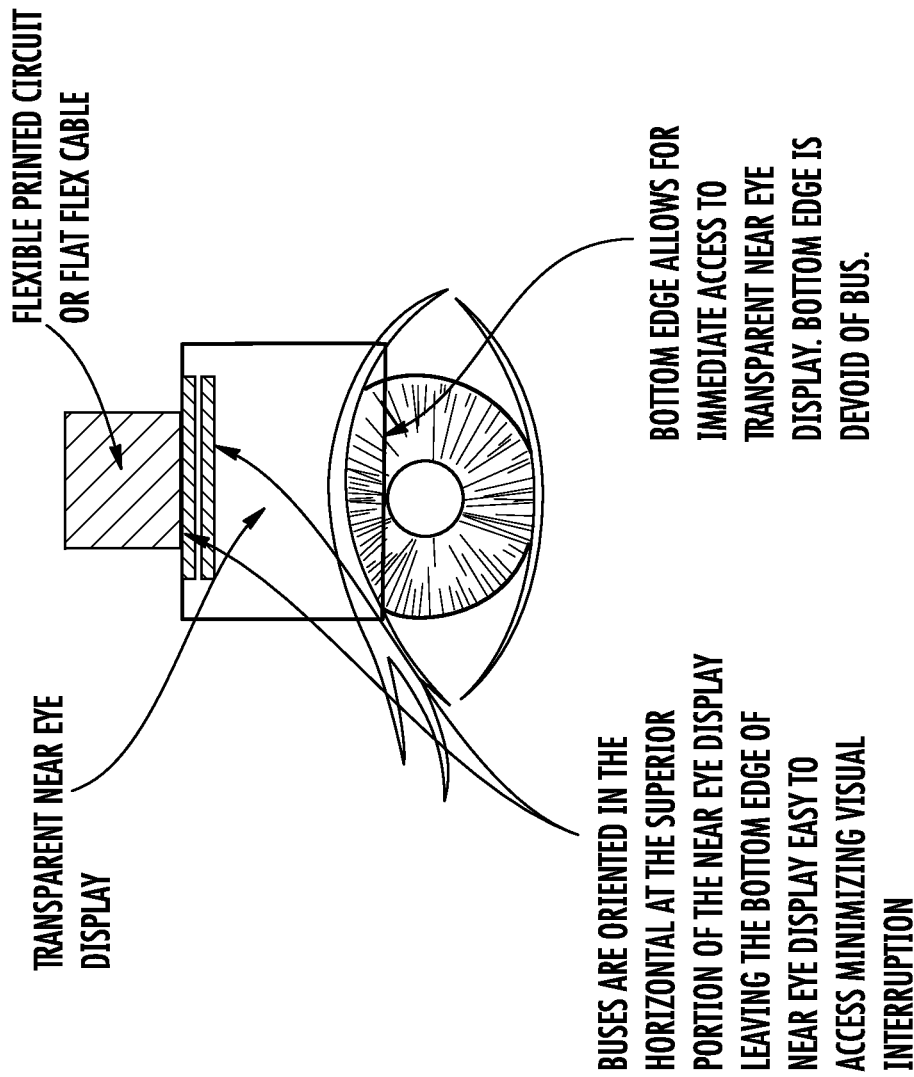
FIG. 35c is an illustration of an example embodiment of the transparent near eye display having superiorly horizontally aligned and separated buses as part of the transparent near eye optical module having a flex cable or flat printed circuit superiorly and vertically oriented.

As shown in FIGS. 35a-c, the transparent near eye display can be fabricated in such a manner that the bus of the near eye display does not cross the bottom edge or bottom perimeter of the near eye display. Said another way the transparent near eye display can be fabricated so that the edge of the transparent near eye display closest to the pupil of the eye of the user will be devoid of an electronic bus. The transparent near eye display can be fabricated in such a manner that the transparent near eye display has one or more vertical buses. The transparent near eye display can be fabricated such that the bottom portion of the near eye display is devoid of an electrical bus. The transparent near eye display can be fabricated so that the side of the display to which the pupil of the eye of the user will cross when first looking through the transparent near eye display is devoid of a bus. The transparent near eye display can be fabricated so that one or more sides of the transparent near eye display is devoid of an electrical bus.

The transparent near eye display can have a flexible printed circuit or a flex cable superiorly attached vertically to the near eye display. The transparent near eye display can have a flexible printed circuit or a flex cable nasally attached horizontally to the near eye display. The transparent near eye display can have a flexible printed circuit or a flex cable temporally attached horizontally to the near eye display. Given that in a preferred embodiment the transparent near eye display is located at or above the upper edge of a wearer's eye pupil, it is important that the eye, upon a tilt of the wearer's head, easily and quickly passes over the bottom edge of the transparent near eye display and starts seeing the virtual image as soon as possible. Thus, the reason why the bus or buses are oriented vertically. However, should the transparent near eye display be located nasally, temporally, or inferiorly the transparent near eye display can be fabricated to ensure the pupil of the eye of the user quickly translates over the closest edge of the transparent near eye display without crossing an electrical bus.

The transparent near eye optical module can be located within the line of sight of an eye of the user when the eye is looking with normal gaze straight ahead. The transparent near eye optical module can be located outside of the line of sight of an eye of the user when the eye is looking with normal gaze straight ahead. The transparent near eye optical module can be located outside of the line of sight of an eye of the user, but within 10 degrees of the line of sight when the eye is looking with normal gaze straight ahead. The transparent near eye optical module can be located outside of the line of sight of an eye of the user, but within 5 degrees of the line of sight when the eye is looking with normal gaze straight ahead. The transparent near eye optical module can be located outside of the line of sight of an eye of the user, but within 2.5 degrees of the line of sight when the eye is looking with normal gaze straight ahead. The transparent near eye optical module can be located within 30 mm or less of the wearer's eye. The transparent near eye optical module can be located within 20 mm or less of the wearer's eye. The transparent near eye optical module can be located within 15 mm or less of the wearer's eye.

As illustrative embodiments, FIGS. 35a, 35b, and 35c show various configurations of different electrical connections to the transparent near eye display. As shown in both embodiments (left and right) of FIGS. 35a and 35b, the buses are oriented in the vertical direction leaving the bottom edge of the near eye display devoid of bus and thus allowing for easy, immediate access to the transparent near eye display and minimizing visual interruption, while the embodiment in FIG. 35b provides these advantages by orienting the buses horizontally at the superior portion of the near eye display. The embodiments shown on the left side of FIGS. 35a and 35c additionally show a flexible printed circuit or flat flex cable disposed in electrical communication with and on top of the transparent near eye display, while the embodiment shown on the right of FIG. 35b shows the flexible printed circuit or flat flex cable disposed in electrical communication with and at the side of the transparent near eye display.

The smaller the pixel size, the higher the packing of pixels can be positioned within a pixel patch. The higher the number of pixels, the higher the display resolution. Thus, pixels having a size of 5 microns or less are preferred. The foveal region of the eye of a wearer/user is approximately +/−2 degrees or that of 4 degrees. The foveal size is approximately 500 microns×500 microns. A pixel patch can be 1.03 mm high×1.03 mm long to cover the foveal area of an eye. Therefore, by way of example only, if utilizing 2 micron by 2 micron pixels a patch of 25K, 2 micron×2 micron pixels can cover the entire foveal region.

In an embodiment a sparsely populated near eye display having iLEDs (micro-LEDs) is aligned with a sparsely populated micro-lens array. The sparsely populated transparent near eye display has a pixel to near eye display fill factor less than 25%. The sparsely populated micro-lens array has a micro-lens to micro-lens array fill factor less than 50%. The sparsely populated transparent near eye display is comprised of tiles each comprising one or more patches of pixels (pixel patches). Each pixel patch comprises 1.5 microns-3.0 microns light emitter pixels. The light emitters are iLEDs (micro-LEDs). A tile can have between 1 to 64 pixel patches. Each pixel patch is distance separated and aligned with one micro-lens, in aspects. The distance separation between the pixel patch and the micro-lens is a gap (air gap or material layer spacer). The distance separation is within the range of 50 microns and 2 microns. In this embodiment the transparent near eye display is modulated in such a manner that it has a duty cycle such that the virtual image is seen by the eye of the user less than 50% of the time. In other embodiments the duty cycle is such that the virtual image is seen by the eye of the user less than 25% of the time. And in still other embodiments the duty cycle is such that the virtual image is seen by the eye of the user less than 12.5% of the time.

In certain embodiments (but not all embodiments) an intensity reducing filter to reduce the level of brightness of the virtual image is used. The intensity reducing filter can be provided at any location within the optical system between the iLED (micro-LED) and the eye of the user. The intensity reducing filter can be located on the front surface of the iLED (micro-LED). The intensity reducing filter can be located between the micro-lens of the micro-lens array and the iLED (micro-LED). The intensity reducing filter can be that of a tint within the micro-lens and/or micro lens array that reduces light transmission through the micro-lens and/or the micro-lens array. In other embodiments enabling electronics permit turning down the light intensity of the iLEDs (micro-LEDS) of the transparent near eye display, thus reducing the brightness intensity of the virtual image. In still other embodiments enabling tunable electronics permit tuning the light intensity of the iLEDs (micro-LEDS) of the transparent near eye display, thus making the level of brightness intensity of the virtual image tunable.

In an embodiment, a sparsely populated near eye display has OLEDs which are aligned with a sparsely populated micro-lens array. The sparsely populated transparent near eye display has a pixel to near eye display fill factor less than 25%. The sparsely populated micro-lens array has a micro-lens to micro-lens array fill factor less than 50%. The sparsely populated transparent near eye display is comprised of tiles each comprising one or more patches of pixels (pixel patches). Each pixel patch comprises a light emitter(s) sized between 3 microns and 8 microns. The light emitters are OLEDs, in this case. A tile can have between 1 to 64 pixel patches. Each pixel patch is distance separated and aligned with one micro-lens. The distance separation between the pixel patch and the micro-lens is a gap (air gap or material layer spacer). The distance separation is within the range of 25 microns and 2 mm. In this embodiment the transparent near eye display is modulated in such a manner that it has a duty cycle such that the virtual image is seen by the eye of the user less than 50% of the time. In other embodiments the duty cycle is such that the virtual image is seen by the eye of the user less than 25% of the time. And in still other embodiments the duty cycle is such that the virtual image is seen by the eye of the user less than 12.5% of the time.

As shown in FIGS. 2a and 2b, when utilizing diverging rays of light from the near eye display in certain embodiments, using infinite conjugate optics, the micro-lens array is used for collimating the rays of light that will strike either a spectacle lens if the user has a need to correct his or her refractive error or to remain mostly parallel to one another if striking the cornea of the user having no need for corrective eyewear. However, due to the image magnification caused by the micro lens array a lesser number of pixels per patch can be utilized for covering the foveal region of the eye of a wearer/user. By way of example only, with a 7x magnification factor of the image only, 1K, 2 micron×2 micron pixels per patch can be used to cover the entire fovea region of the eye of a wearer/user. Thus, for several reasons using small pixels is desired, in most cases. These reasons are for increasing the resolution of the near eye display, for packing more pixels within a pixel patch, and for minimizing the effect of magnification thus allowing for the largest number of pixels to be used when covering the foveal region of the eye of a wearer/user. It is preferred to see an image magnification effect of the micro-lens array below that of 10× and more preferably below 6×. The macula is 5 mm diameter or +/−12.5 degrees or that of 25 degrees. In certain embodiments of the invention where small pixels are used the number of pixels packed into a pixel patch that covers the fovea can be so bright that while the resolution is very acceptable the brightness is too bright for the eye of the user. In this case one of, by way of example only; filter, tint, or tunable electronic illumination can be used. By way of example only, a pixel patch comprised of iLEDs (micro-LEDs) can provide acceptable resolution but have a brightness that is too intense for the eye of the user when the transparent near eye optical module is positioned within 25 mm or less of the wearer's eye.

In still other embodiments, using finite conjugate optics the rays of light coming from the micro-lens array forms an image in front of the eye of the user and is seen by the eye of the user. When this occurs, the magnification of the image is negligible, however the image can be inverted. When this occurs, the display image is inverted by software or hardware to cause the image to be perceived right side up by the wearer/user.

In a preferred embodiment, one-pixel patch is imaged upon the fovea and a plurality of pixel patches that are separated with transparent or semi-transparent space therebetween are imaged on the non-foveal macular area. In another preferred embodiment, one-pixel patch or more adjacent pixel patches is/are imaged upon the fovea and a plurality of pixel patches that are separated with transparent or semi-transparent space therebetween are imaged on the non-foveal macular area. The micro-lens array can use collimating optics, focusing optics, or a combination of both. The micro-lens array can be a sparsely populated micro-lens array. The sparsely populated micro-lens array can be aligned and in optical communication with a sparsely populated transparent near eye display. The sparsely populated transparent near eye display can have pixels that occupy less than 2.5% of the display surface. The sparsely populated transparent near eye display can have pixels that occupy less than 5% of the display surface. The sparsely populated transparent near eye display can have pixels that occupy less than 10% of the display surface. The sparsely populated transparent near eye display can have pixels that occupy less than 20% of the display surface. The sparsely populated micro-lens array can have micro lenses that occupy less than 60% of the micro-lens array. The sparsely populated micro-lens array can have micro-lenses that occupy less than 50% of the micro-lens array. The sparsely populated micro-lens array can have micro-lenses that occupy less than 40% of the micro-lens array.

Figure 19:
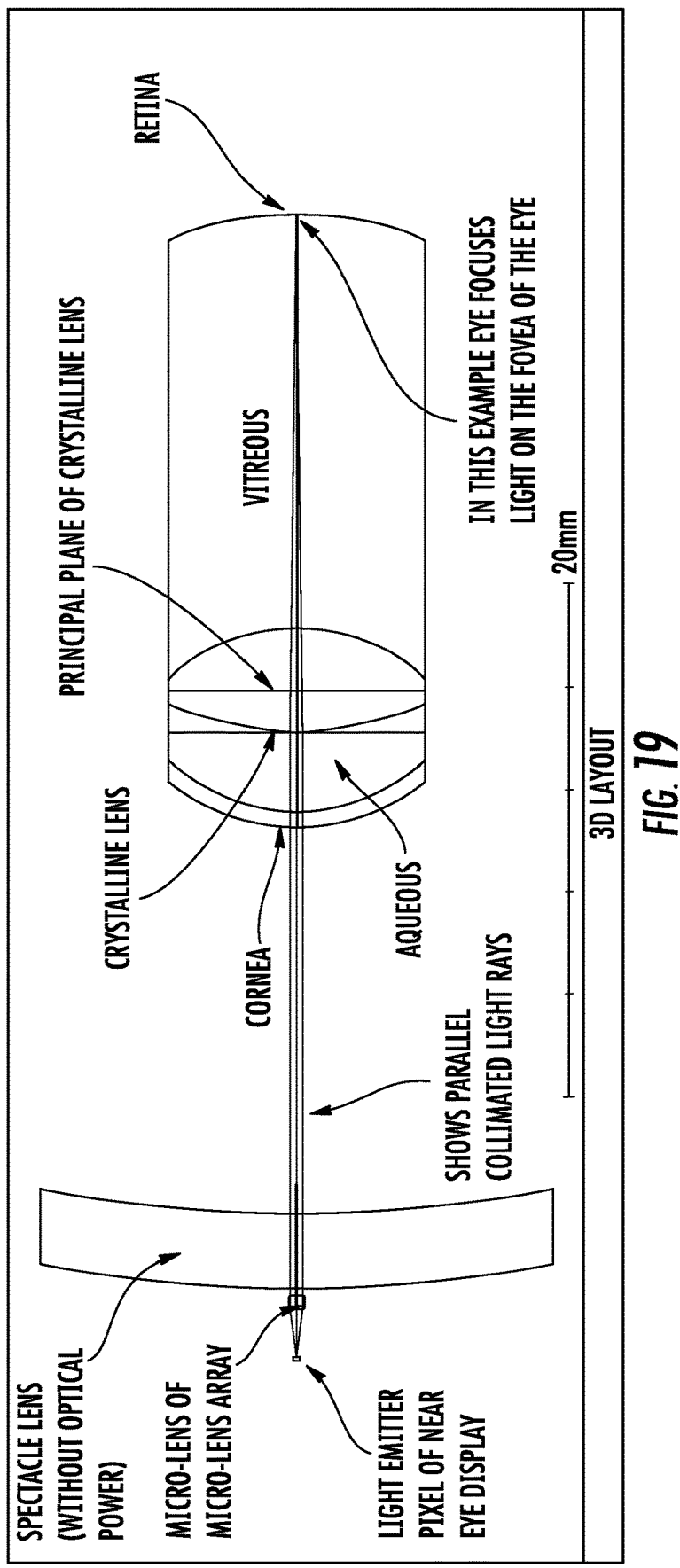
FIG. 19 is an example ray tracing embodiment showing a point source, an aligned micro-lens in optical communication therewith, how the micro-lens collimates the rays of light and how the eye focuses light on the retina.
Figure 20:
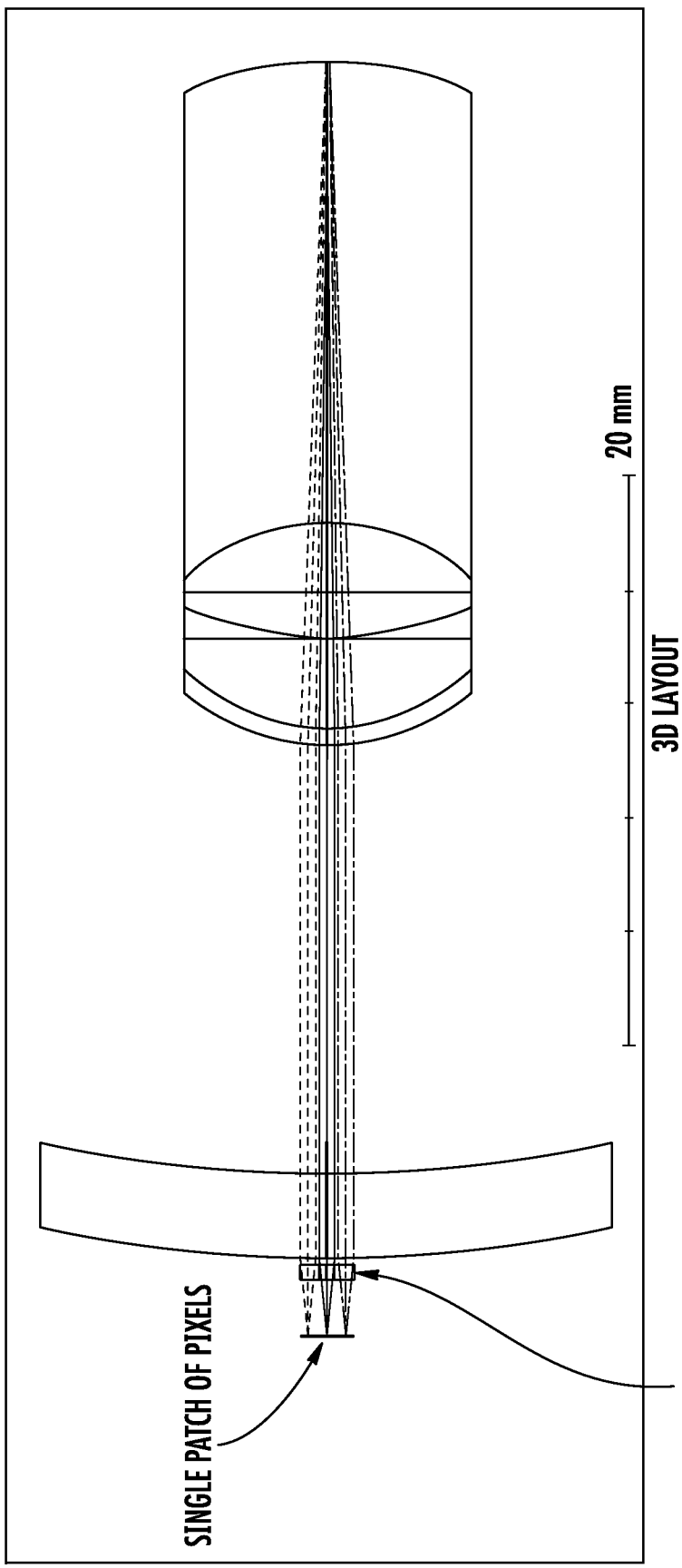
FIG. 20 is an example ray tracing embodiment showing a single pixel patch, one or more aligned micro-lenses of a micro-lens array in optical communication therewith, how the micro-lens(es) collimates the rays of light and how the eye focuses light on the retina.
Figure 21:
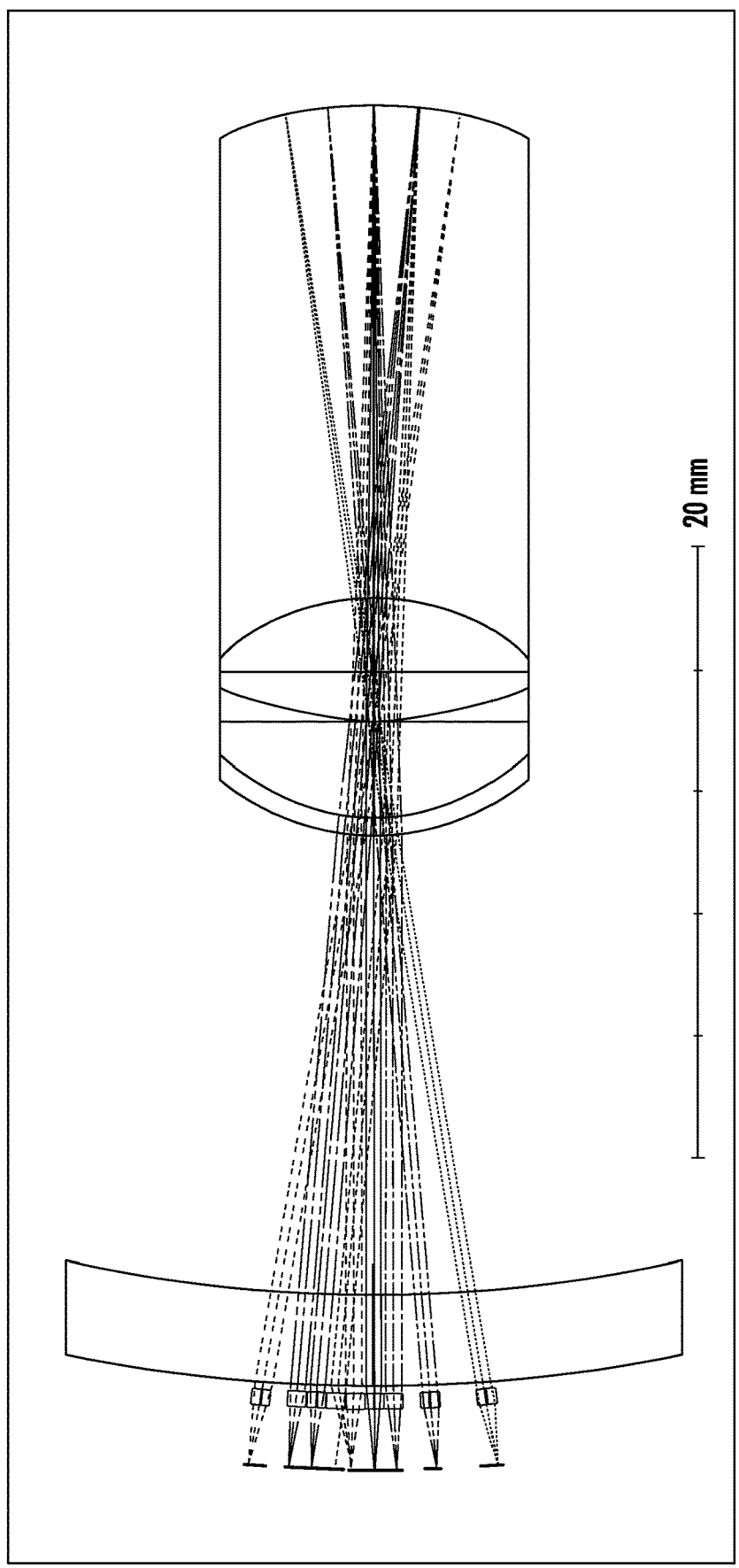
FIG. 21 is an example ray tracing embodiment showing multiple pixel patches, multiple aligned micro-lenses of a micro-lens array and in optical communication with the multiple pixel patches, how the micro-lens(es) collimates the rays of light and how the eye focuses light on the retina.
Figure 22:
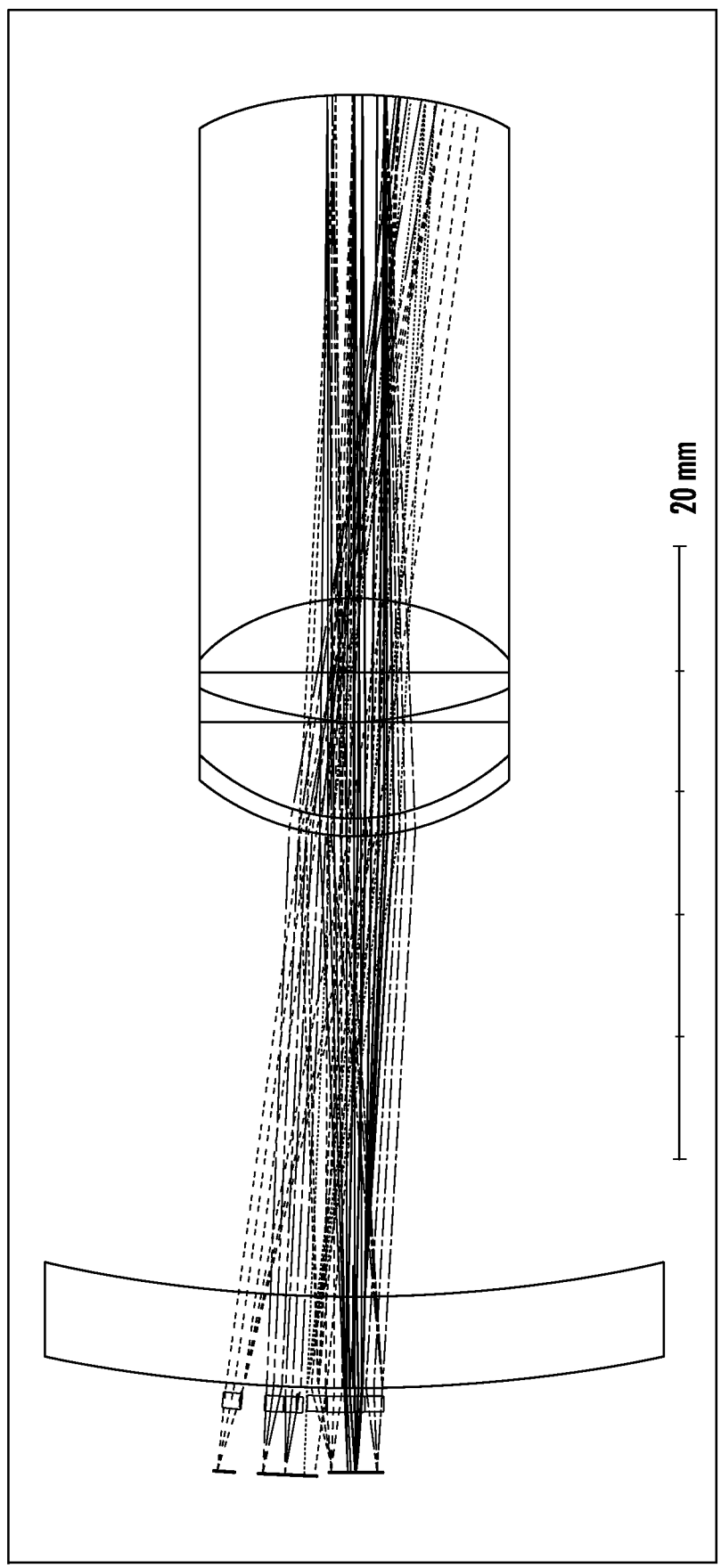
FIG. 22 is an example ray tracing embodiment showing multiple pixel patches, multiple aligned micro-lenses of a micro-lens array and in optical communication with the multiple pixel patches, how the micro-lens(es) collimates the rays of light and how the eye focuses light on the retina.

FIGS. 19, 20, 21, 22, and 23 present a side view showing ray tracings which demonstrate how light from the transparent near eye module is projected onto the retina of the user to form an image. FIG. 19 shows a single light emitting pixel of the transparent near eye display at the left most side of the figure in optical alignment with a single micro-lens of the micro-array, which is itself disposed in front of the spectacle lens, which in this embodiment is without optical power. The figure shows that the single lenslet (micro-lens) and single point source utilizes infinite optical conjugation to deliver light to the eye. In particular, the individual micro-lens transmits parallel collimated light rays to the eye which is schematically represented on the right side of the figure. The collimated light rays pass through the cornea of the eye, then through an aqueous layer, then the crystalline lens (including the principal plane of the crystalline lens), and finally through the vitreous where the light rays focus on the fovea of the retina. FIG. 20 shows light from the transparent near eye optical module emanating from a single patch of pixels of the transparent near eye display, with one or more micro-lenses of a micro-lens array collimating light rays from the patch of pixels, while FIG. 21 shows light emanating from several patches partially filled with single light sources. FIG. 22 shows ray tracings of a full ray set emanating from multiple patches/sub images (+/−2 degrees or 4 degrees total).

Figure 23:
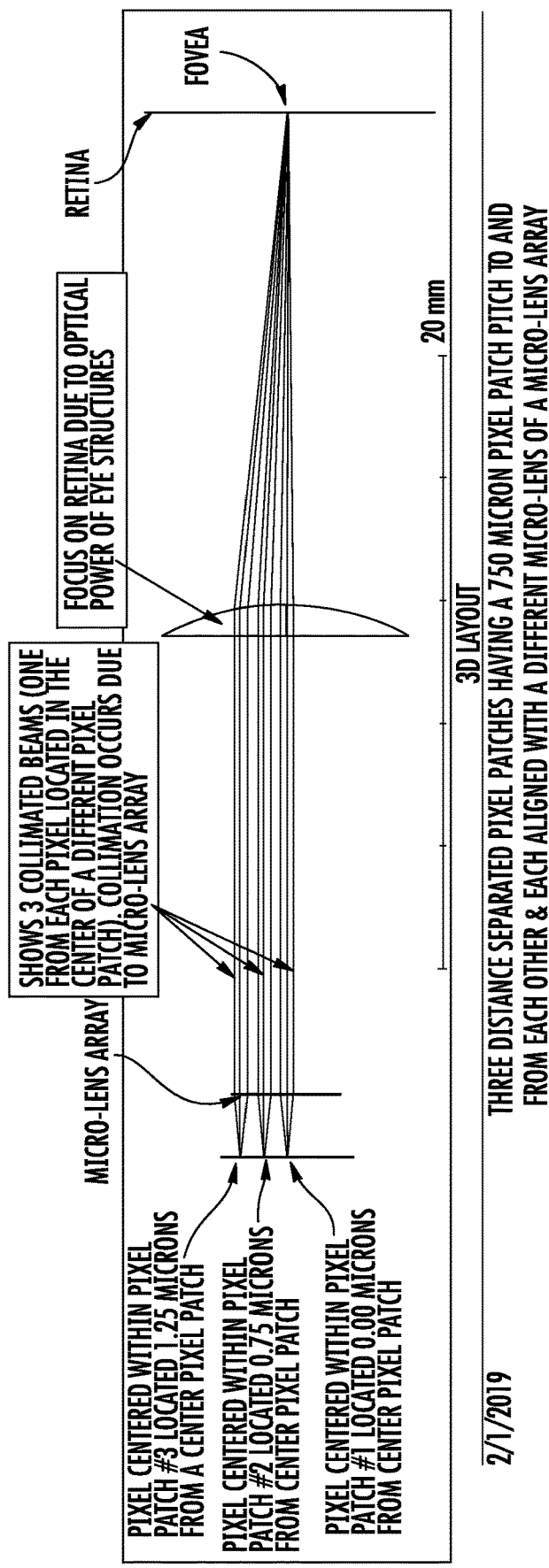
FIG. 23 is an example ray tracing embodiment showing three distant separated pixel patches each aligned with a different micro-lens of a micro-lens array and shows three resulting collimated beams that pass through the eye each focusing on the fovea.

FIG. 23 shows an infinite conjugate Zemax™ ray trace from three distance-separated pixel patches having a 750-micron pixel patch pitch to and from each other and each aligned with a different micro-lens of a micro-lens array. At the left of the diagram are shown three pixels, where the bottom pixel is centered. The diagram shows three collimated beams (one from each pixel located in the center of a different pixel patch). Collimation occurs due to a micro-lens array. The beams focus on the fovea of the retina due to the optical power of the eye structures.

While most of the illustrations and examples disclosed herein utilized infinite conjugate optics, the transparent near eye optical module can utilize either infinite conjugate optics or finite conjugate optics. The optical system design can be altered to accommodate either.

In certain embodiments, the virtual image as seen by an eye is preprocessed regarding color, spatial frequency, duty cycle, resolution or other features without limitation. In other embodiments the virtual image as seen by an eye is devoid of any preprocessing and is the original virtual image obtained from the transparent near eye display after being optically impacted by one or more micro-lenses of a micro-lens array.

Figure 13:
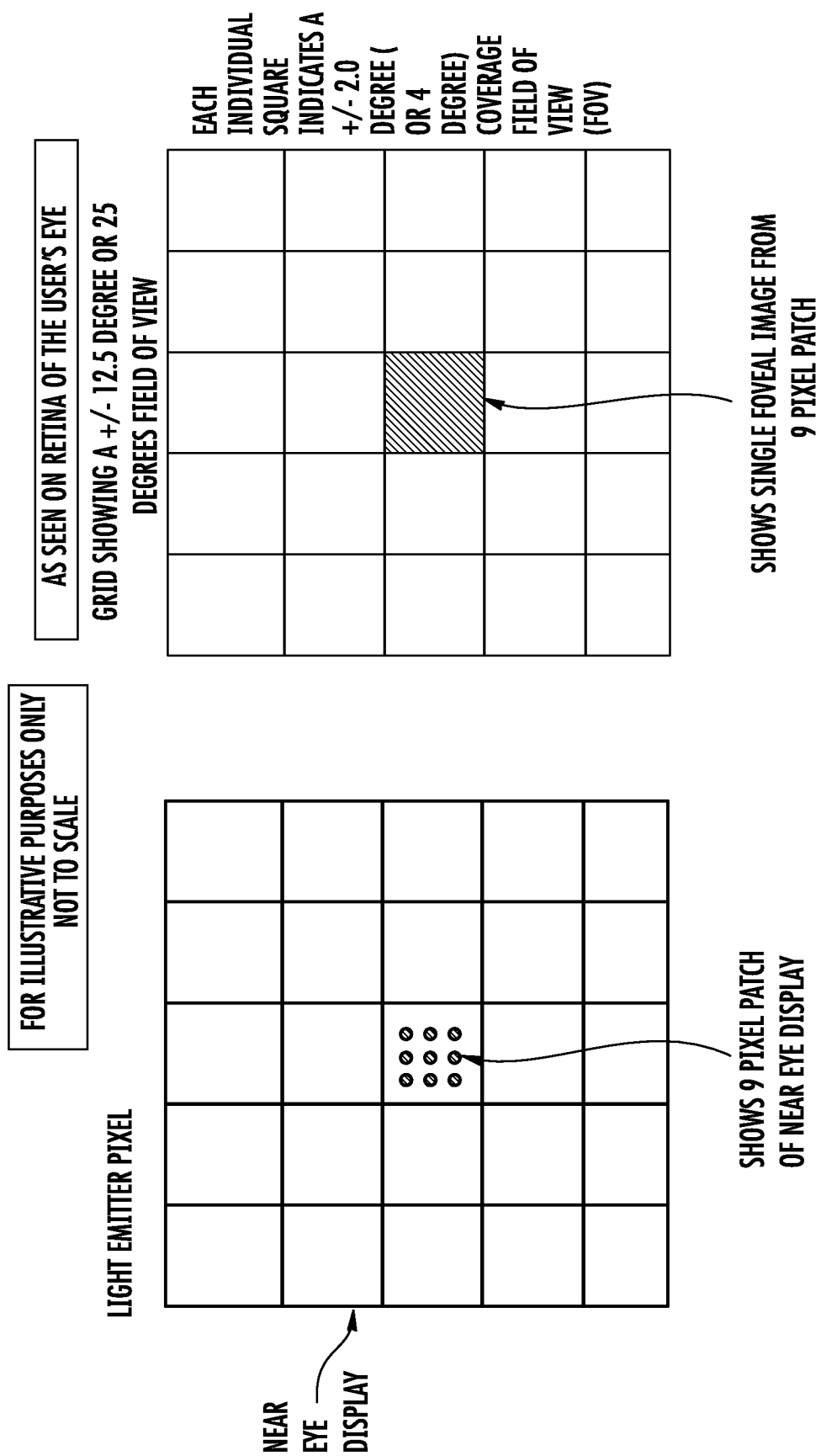
FIG. 13 is a diagram of an embodiment of one tile having 9-pixel patches and showing how an image from the 9-pixel patches after passing through a micro-lens array will cover +/−2 degrees or 4 degrees of the fovea.

FIGS. 12a, 12b, and 13 show how light from the near eye display (represented by the grid on the left side) can form an image on the retina (represented by the grid on the right side) of the user. In particular, the grid representation of the retina on the right side of the figures shows a +/−12.5-degree (or 25 degrees) field of view. Each individual square of the grid indicates a +/−2.0-degree (or 4 degree) coverage field of view. FIG. 12a shows an embodiment with a single light source (single pixel) of the sparsely populated transparent near eye display on the left, which results in a magnified image of the single pixel on the retina on the right due to image magnification by the micro-lens. FIG. 13 shows a 9-pixel patch of the sparsely populated transparent near eye display on the left, which results in a single foveal image from the 9-pixel patch on the right due to magnification by the micro-lens. FIG. 12b shows sparsely populated 9-pixel patches replicated across the sparsely populated transparent near eye display on the left, which results in pixel patches images replicated across+/−12.5 degrees or 25 degrees of retina covering the entire fovea and part of macula on the right.

Tables and illustrations showing exemplary specifications of the transparent near eye optical module are shown in FIGS. 24-34. The tables are intended to show additional examples of ways the transparent near eye optical module can be implemented and are not intended to be limiting. FIG. 24 is a table showing various properties and values of an OLED display, MLA optics, and retinal image according to an embodiment. FIG. 25 provides certain example values of various properties. FIG. 26 is examples of various light emitters and/or display types that could be used. FIG. 27 shows example lenslets (or micro-lenses) that could be used individually or in combination. FIG. 28 shows various example combinations of the near eye display and micro-lens arrays. FIG. 29 shows examples of switchable optics (switchable optical power on and off). FIG. 30 is a table showing example characteristics and ranges according to various embodiments. FIG. 31 is a table showing ranges of modulation and duty cycle of a transparent near eye display and micro-lens array according to embodiments. FIG. 32 is a listing of examples of various transparent near eye display optical modules comprising different components. FIG. 33 is an illustration showing dimensions of the fovea, parafovea and macular region of the human retina. FIG. 34 is an illustration of cone density as a function of angular separation from the foveola.

According to embodiments, the modulation of the transparent near eye display and that of the MLA can be the same and synchronized. The modulation of the near eye display and the MLA can be different. The duty cycle of the transparent near eye display and the MLA can be the same and synchronized. The duty cycle of the transparent near eye display and the MLA can be different. In a preferred embodiment the duty cycle of the transparent near eye display and the MLA is the same and is synchronized.

An embodiment is that of a see-through transparent or semi-transparent near eye optical module comprising a see-through transparent or semi-transparent near eye display comprising pixels or patches of pixels and a micro-lens array comprising micro-lenses, wherein the see-through transparent or semi-transparent near eye display and the micro-lens array are aligned and distance separated, wherein the see-through transparent or semi-transparent near eye optical module is sealed and wherein the see-through transparent near eye optical module comprises an electrical connector.

An embodiment is that of a see-through transparent or semi-transparent near eye optical module comprising a see-through transparent or semi-transparent near eye display comprising pixels or patches of pixels and a micro-lens array comprising micro-lenses, wherein the see-through transparent or semi-transparent near eye display and the micro-lens array are aligned and distance separated, wherein the see-through transparent or semi-transparent transparent near eye optical module comprises a plurality of light blocks, wherein the see-through transparent or semi-transparent near eye optical module is sealed and wherein the see-through transparent near eye optical module comprises an electrical connector.

An embodiment is that of a see-through transparent or semi-transparent near eye optical module comprising a see-through transparent or semi-transparent near eye display comprising pixels or patches of pixels and a micro-lens array comprising micro-lenses, wherein the see-through transparent or semi-transparent near eye display and the micro-lens array are aligned and distance separated, wherein the see-through transparent or semi-transparent transparent near eye optical module comprises a plurality of light blocks, wherein a light block is distant separated from the adjacent light block, wherein the see-through transparent or semi-transparent near eye optical module is sealed, and wherein the see-through transparent or semi-transparent near eye optical module comprises an electrical connector.

The transparent near eye display can be comprised of patches of pixels providing a field of view of +/−2.5 degrees (5 degrees or less) or tiles providing a field of view of +/−12.5 degrees or less. The transparent near eye display can be comprised of tiles of pixels or tiles of pixel patches comprising a plurality of pixels. In certain embodiment the patches of pixels provide for foveal coverage by the virtual image. In certain embodiments the tiles of pixel patches or pixels provide for central and peripheral vision of the virtual image.

In certain embodiments the transparent near eye optical module is located directly in front of the eye of the user while the user is looking straight ahead with normal gaze. In other embodiments the transparent near eye optical module is located slightly removed from the line of sight of the eye of the user while the user is looking straight ahead with normal gaze and can be accessed by the user moving their eyes less than 10 degrees. In still other embodiments the transparent near eye optical module is located removed from the line of sight of the eye of the user while the user is looking straight ahead with normal gaze and can be accessed by the user moving their eyes more than 10 degrees. And in still other embodiments the transparent near eye optical module is located slightly removed from the line of sight of the eye of the user while the user is looking straight ahead with normal gaze and can be accessed by the user by tilting their chin 10 degrees or less.

In aspects, the transparent near eye display has a transparency of 80% or greater. The pixels each comprise an opaque light block behind each pixel that reduces light from being directed forward away from the eye of the user. The transparent near eye display is sparsely populated with pixels. The transparent near eye display has a pixel fill factor of the transparent near eye display of 10% or less, in aspects. The transparent near eye display has a pixel fill factor of the transparent near eye display that is 5% or less, in aspects. The micro-lens array is a sparsely populated with micro-lenses. The micro-lens array has a micro-lens fill factor of the micro-lens array that is 50% or less, in aspects. The micro-lens array can have a micro-lens fill factor of the micro-lens array that is 40% or less, in aspects. The micro-lens array has a plurality of micro-lenses of the micro-lens array that are bi-convex, in aspects. The micro-lens array can have a plurality of micro-lenses of the micro-lens array that are aspheric, in aspects. The micro-lenses are each aligned with a plurality of pixels of the transparent near eye display. A plurality of micro-lenses are each aligned with a corresponding pixel patch of the plurality of pixel patches of the transparent near eye display. An individual micro-lens is larger than the size of the aligned pixel patch, in aspects. The transparent near eye display is aligned and distant separated from that of the micro-lens array and is directly or indirectly attached thereto. The pixels of the transparent near eye display are comprised of one or more of; OLEDs, iLEDs (micro-LEDs), or TOLEDs. The transparent near eye display modulates between 30 Hz and 100 Hz and has a duty cycle of on that is 50% or less. The sealing of the transparent near eye optical modules is that of a hermetic seal.

The pixels of the transparent near eye display can be contained within pixel patches. A plurality of pixel patches are contained within a tile. The tiles are faceted across a section of the lens for the eye of a user providing a curvature to the transparent near eye optical module. The transparent near eye display optical module can be embedded within the front surface of one of; an eyewear lens, visor, or face shield. The transparent near eye optical module comprises a space located between the transparent near eye display and the micro-lens array and wherein the space is that of an air gap or a material spacer. The pixel size is between 1.5 microns and 8 microns. The transparent near eye optical module passes light from the real-world to the eye of a user to form a real image and wherein the transparent near eye optical module gives off light generated within the transparent near eye optical module to the eye of the user to form a virtual image.

The transparent optical module magnifies the image that is seen by the eye of the user. Such magnification is within the range of 2× and 8× that of the original image generated by the transparent near eye display of the transparent near eye optical module. The pixel patches have a size within the range of 15 microns×15 microns and 750 microns×750 microns. The number of pixels in a pixel patch is within the range of 3 pixels×3 pixels and 64 pixels×64 pixels. The size of the micro-lens is within the range of 50 microns and 800 microns. The distance separation space between the transparent near eye display and the micro-lens array is between 25 microns and 2 mm.

Non-limiting examples of implementations of the transparent near eye display are provided in Examples 1-3 below.

Example 1: Specifications

Transparent AMOLED display (sparsely populated OLED display having sections between pixels or pixel patches that are transparent or semitransparent)
  Resolution: QVGA (400×300 pixels)
  Size: 16 mm×12 mm (so 40 um×40 um pixel) (size can be as little as 6 mm×6 mm or any size up to as large as 60 mm×60 mm)
  Sub-pixel emission area (referred herein as pixel size)=5 um×5 um (1.51% of display area emits light)
  Emission profile: cavity with most of the energy focused in forward direction (preferably 60%+, 75%+, 85%+, etc.)
  Display Transparency: >60% (preferably greater than 70%, more preferably greater than 80%)
  Color: green (530-550 nm) or full color display
  Brightness=10,000 cd/m$^2$ at active area or greater
  Frame rate: 90 Hz; should be able to overdrive to achieve sharp cut off.
  Packaged thickness, including electrical connection <0.5 mm: Physical Distance from the emitting pixels to their outer barrier layer should be minimal—preferable 50-100 um, no more
  Substrate: plastic or glass
  Flexibility: Display bendable in one direction to radius of curvature of at least 150 mm
  Curvature: In most but not all cases the curvature is that of the base curve of the eyeglass lens
  Package: Hermetically sealed by conformal barrier coating
  Thickness: Less than 1.0 mm, and more preferably 0.50 mm or less Example 2: Specifications Transparent iLED (micro-LED) display sparsely populated micro-LED display having sections between pixels or pixel patches that are transparent or semitransparent
  Resolution: QVGA (400×300 pixels)
  Size: 16 mm×12 mm (so 40 um×40 um pixels) (size can be as little as 6 mm×6 mm or any size up to as large as 60 mm×60 mm)
  Sub-pixel emission area (referred herein as pixel size)=2 um or less×2 um or less (1.51% or less of display area emits light)
  Emission profile: cavity with most of the energy focused in forward direction (preferably 60%+, 75%+, 85%+, etc.)
  Display Transparency: >60% (preferably greater than 70%, more preferably greater than 80%)
  Color: green (535-550 nm) or full color display
  Brightness=up to 100,000 cd/m$^2$ at active area
  Frame rate: 90 Hz; should be able to overdrive to achieve sharp cut off.
  Packaged thickness, including electrical connection <0.5 mm: Physical Distance from the emitting pixels to their outer barrier layer should be minimal—preferable 50-100 um, no more
  Substrate: plastic or glass
  Flexibility: Display bendable in one direction to radius of curvature of at least 150 mm Curvature: In most but not all cases the curvature is that of the base curve of the eyeglass lens Package: Hermetically sealed by conformal barrier coating Thickness: Less than 1.0 mm, and more preferably 0.50 mm or less Example 3: Specifications Transparent TOLED display, TOLED display having transparent pixels that are not lighted to provide appropriate transparency Resolution: QVGA (400×300 pixels)

Size: 16 mm×12 mm (so 40 um×40 um pixels) (size can be as little as 6 mm×6 mm or any size up to as large as 60 mm×60 mm)

Sub-pixel emission area (referred herein as pixel size)=2 um or less×2 um or less (1.51% or less of display area emits light)

Emission profile: cavity with most of the energy focused in forward direction (preferably 60%+, 75%+, 85%+, etc.)

Display Transparency: >60% (preferably greater than 70%, more preferably greater than 80%)

Color: green (535-550 nm) or full color display

Brightness=up to 100,000 cd/m$^2$ at active area

Frame rate: 90 Hz; should be able to overdrive to achieve sharp cut off.

Packaged thickness, including electrical connection <0.5 mm: Physical Distance from the emitting pixels to their outer barrier layer should be minimal—preferable 50-100 um, no more Substrate: plastic or glass Flexibility: Display bendable in one direction to radius of curvature of at least 150 mm Curvature: In most but not all cases the curvature is that of the base curve of the eyeglass lens Package: Hermetically sealed by conformal barrier coating Thickness: Less than 1.0 mm, and more preferably 0.50 mm or less The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A hermetically sealed optical module, the optical module comprising an eye-facing side and a real world-facing side connected by sides or edges to create a sealed interior cavity, wherein the sealed interior cavity of the optical module encloses a see-through near eye display, the enclosed see-through near eye display comprising (a) a plurality of patches of pixels populating a transparent or semi-transparent substrate, and (b) a microlens array comprising a plurality of microlenses;

wherein spaces between the plurality of patches of pixels and spaces between the plurality of microlenses allow real world light to pass therebetween, allowing the see-through near eye display to provide a perception of augmented reality to a user of the hermetically sealed optical module;

wherein one or more wire or flex cable connects the enclosed see-through near eye display to a power source and/or a processor, and wherein a location where the one or more wire or flex cable enters the optical module is hermetically sealed;

wherein where the sides or edges of the optical module meet the eye-facing side and the real-world facing side are hermetically sealed; and wherein the optical module is at least one of supported by, attached to, or embedded in, an optic or an optic frame.

2. The see-through near eye display of claim 1, wherein the see-though near eye display is incorporated in an optical module, wherein the optical module is optionally attached to an eyewear lens or a substrate.

3. The see-through near eye display of claim 1, wherein the see-through near eye display is located peripheral to a line of sight of the user when the user is looking straight ahead with normal gaze.

4. The see-through near eye display of claim 1, wherein an angle where the see-through near eye display meets an eyewear lens or a substrate is about 80 to 100 degrees.

5. The see-through near eye display of claim 1, wherein the electrical bus is connected to a flex cable.

6. The see-through near eye display of claim 1, wherein the electrical bus is connected to a circuit.

7. The see-through near eye display of claim 1, wherein the electrical bus is located peripheral to the user's pupil when the user is looking through the see-through near eye display.

8. The see-through near eye display of claim 1, wherein the see-through near eye display is supported by a see-through near eye optical module.

9. The see-through near eye display of claim 1, wherein the see-through near eye display is aligned with and distance spaced from a micro-lens array.

10. The hermetically sealed optical module of claim 1, wherein the plurality of patches of pixels comprise micro-Light Emitting Diodes (iLight Emitting Diodes).

11. The hermetically sealed optical module of claim 1, wherein the plurality of patches of pixels comprise Organic Light Emitting Diodes.

12. The hermetically sealed optical module of claim 1, wherein the plurality of patches of pixels comprise Transparent Organic Light Emitting Diodes.

13. The hermetically sealed optical module of claim 1, wherein pixels in the patches of pixels of the plurality of patches of pixels have a size of 5 microns or less.

14. The hermetically sealed optical module of claim 1, wherein the plurality of patches of pixels are arranged as tiles of patches of pixels.

15. The hermetically sealed optical module of claim 1, wherein the enclosed see-through near eye display further includes a light blocking element aligned on a side of a patch of pixels of the plurality of patches of pixels farthest away from an eye of the user of the hermetically sealed optical module.

16. The hermetically sealed optical module of claim 1, wherein the enclosed see-through near eye display further includes a light intensity reducing filter located on a side of the enclosed see-through near eye display closest to an eye of the user of the hermetically sealed optical module.

17. The optical module of claim 1, wherein the see-through near eye display further includes a light intensity reducing filter located between the see-through near eye display and the microlens array.

18. The hermetically sealed optical module of claim 1, wherein the enclosed see-through near eye display further includes a light intensity reducing filter located between the enclosed see-through near eye display and an eye of the user of the hermetically sealed optical module.

19. The see-through near eye display of claim 1, further comprising an electrical connector, wherein a portion of the electrical connector is located superior to the see-through near eye display.

20. The see-through near eye display of claim 1, further comprising an electrical connector, wherein a portion of the electrical connector is located temporal to the see-through near eye display.

21. The hermetically sealed optical module of claim 1, wherein light emitting from the enclosed see-through near eye display to an eye of the user of the hermetically sealed optical module is filtered by a blue light filter.

22. The hermetically sealed optical module of claim 1, wherein the optic is one or more of a lens, an eyewear lens, a corrective lens, a non-corrective lens, a protective lens, a visor lens, a helmet lens, a transparent or semi-transparent shield, and a transparent or semi-transparent see-through material.

* * * * *